(12) United States Patent
Kim et al.

(10) Patent No.: US 12,219,585 B2
(45) Date of Patent: Feb. 4, 2025

(54) METHOD FOR TRANSMITTING DATA OR CONTROL INFORMATION HAVING HIGH RELIABILITY CONDITIONS, AND DEVICE THEREFOR

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Seung Kwon Baek, Daejeon (KR); Gi Yoon Park, Daejeon (KR); Ok Sun Park, Daejeon (KR); Jae Su Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/414,798

(22) Filed: Jan. 17, 2024

(65) Prior Publication Data
US 2024/0284494 A1 Aug. 22, 2024

Related U.S. Application Data

(63) Continuation of application No. 17/284,971, filed as application No. PCT/KR2019/014936 on Nov. 6, 2019, now Pat. No. 11,917,651.

(30) Foreign Application Priority Data

| Nov. 9, 2018 | (KR) | 10-2018-0137633 |
|---|---|---|
| Jan. 11, 2019 | (KR) | 10-2019-0004048 |

(Continued)

(51) Int. Cl.
*H04W 72/51* (2023.01)
*H04W 72/02* (2009.01)
(Continued)

(52) U.S. Cl.
CPC .......... *H04W 72/51* (2023.01); *H04W 72/02* (2013.01); *H04W 72/0446* (2013.01);
(Continued)

(58) Field of Classification Search
CPC ... H04W 72/51; H04W 72/569; H04W 72/23; H04W 72/02; H04W 72/0446; H04W 72/1268
See application file for complete search history.

(56) References Cited

U.S. PATENT DOCUMENTS

| 2011/0130149 A1* | 6/2011 | Yao ...................... H04W 48/12 |
|---|---|---|
| | | 455/453 |
| 2017/0086081 A1 | 3/2017 | Kim et al. |

(Continued)

OTHER PUBLICATIONS

Institute for Information Industry (III), "On eMBB and URLLC multiplexing in uplink", R1-1702295, 3GPP TSG-RAN WG1 Meeting #88, Athens, Greece, Feb. 6, 2017.

(Continued)

*Primary Examiner* — Mewale A Ambaye
(74) *Attorney, Agent, or Firm* — LRK PATENT LAW FIRM

(57) ABSTRACT

Disclosed are various methods for transmitting or receiving data or control information having high reliability conditions. A method for operating a terminal which transmits uplink control information (UCI) includes: a step of generating UCI; a step of comparing the priority of an uplink (UL) control channel for the transmission of the UCI with the priority of a UL data channel when some symbols of the UL control channel and the UL data channel overlap; and a step of selecting the UL channel having a higher priority among the UL control channel and the UL data channel, and transmitting the UCI to a base station through the selected UL channel.

12 Claims, 26 Drawing Sheets

(30) Foreign Application Priority Data

| Date | Country | Number |
|---|---|---|
| Jan. 25, 2019 | (KR) | 10-2019-0009926 |
| Feb. 15, 2019 | (KR) | 10-2019-0017724 |
| Jul. 26, 2019 | (KR) | 10-2019-0091094 |
| Aug. 9, 2019 | (KR) | 10-2019-0097782 |
| Aug. 16, 2019 | (KR) | 10-2019-0100492 |
| Sep. 11, 2019 | (KR) | 10-2019-0112954 |
| Sep. 19, 2019 | (KR) | 10-2019-0115678 |
| Oct. 2, 2019 | (KR) | 10-2019-0122540 |
| Oct. 15, 2019 | (KR) | 10-2019-0127590 |
| Oct. 18, 2019 | (KR) | 10-2019-0130086 |
| Nov. 5, 2019 | (KR) | 10-2019-0140505 |

(51) Int. Cl.
*H04W 72/0446* (2023.01)
*H04W 72/1268* (2023.01)
*H04W 72/23* (2023.01)
*H04W 72/566* (2023.01)

(52) U.S. Cl.
CPC ....... *H04W 72/1268* (2013.01); *H04W 72/23* (2023.01); *H04W 72/569* (2023.01)

(56) References Cited

U.S. PATENT DOCUMENTS

| | | |
|---|---|---|
| 2017/0135098 A1 | 5/2017 | Kang et al. |
| 2018/0131430 A1 | 5/2018 | Gao et al. |
| 2018/0278380 A1 | 9/2018 | Kim et al. |
| 2018/0316467 A1 | 11/2018 | Zhu et al. |
| 2019/0356446 A1 | 11/2019 | Kim et al. |
| 2020/0037345 A1 | 1/2020 | Ryoo et al. |
| 2020/0163112 A1 | 5/2020 | Lee et al. |
| 2020/0260486 A1* | 8/2020 | Zhou ................. H04L 1/1835 |
| 2020/0314889 A1* | 10/2020 | Cirik ................. H04W 72/23 |
| 2021/0366088 A1* | 11/2021 | Chae ................. G06T 5/90 |
| 2022/0124740 A1* | 4/2022 | Ji ................. H04L 1/06 |
| 2023/0413258 A1* | 12/2023 | Yoon ................. H04L 1/1812 |

OTHER PUBLICATIONS

Huawei et al., "Link adaption and CSI reporting for URLLC transmission", R1-1717093, 3GPP TSG RAN WG1 Meeting #90bis, Prague, Czech Republic. Oct. 2, 2017.

Huawei et al., "UCI piggyback on PUSCH for URLLC", R1-1801357, 3GPP TSG RAN WG1 Meeting #92, Athens, Greece, Feb. 17, 2018.

Samsung, "Multiplexing of UL Transmissions with Different Reliability Requirements", R1-1802002, 3GPP TSG RAN WG1 Meeting #92, Athens, Greece, Feb. 16, 2018.

NTT Docomo, Inc., "Uplink transmission prioritization/multiplexing for NR URLLC", R1-1809164, 3GPP TSG RAN WG1 Meeting #94, Gothenburg, Sweden, Aug. 11, 2018.

Search Report, mailed Feb. 24, 2020, for International Application No. PCT/KR2019/014936.

Written Opinion, mailed Feb. 24, 2020, for International Application No. PCT/KR2019/014936.

* cited by examiner (a) case of consecutively arranging UCI from DL assignment #1

(b) case of arranging UCI from DL assignment #1 at equal intervals (a) case of consecutively arranging UCI from DL assignment #1

(b) case of arranging UCI from DL assignment #1 at equal intervals (a) example of a UL data channel or a first hop of a UL data channel (b) example of a second hop of UL data channel
(when frequency hopping is configured)

METHOD FOR TRANSMITTING DATA OR CONTROL INFORMATION HAVING HIGH RELIABILITY CONDITIONS, AND DEVICE THEREFOR

CROSS-REFERENCE TO RELATED APPLICATIONS

The present application is a continuation of U.S. patent application Ser. No. 17/284,971, filed Apr. 13, 2021, which is a U.S. National Phase entry from International Application No. PCT/KR2019/014936, filed Nov. 6, 2019, which claims priority to Korean Patent Application Nos. 10-2018-0137633, filed Nov. 9, 2018, 10-2019-0004048, Jan. 11, 2019, 10-2019-0009926, filed Jan. 25, 2019, 10-2019-0017724, filed Feb. 15, 2019, 10-2019-0091094, Jul. 26, 2019, 10-2019-0097782, filed Aug. 9, 2019, 10-2019-0100492, Aug. 16, 2019, 10-2019-0112954, filed Sep. 11, 2019, 10-2019-0115678, filed Sep. 19, 2019, 10-2019-0122540, Oct. 2, 2019, 10-2019-0127590, filed Oct. 15, 2019, 10-2019-0130086, Oct. 18, 2019, 10-2019-0140505, filed Nov. 5, 2019, the disclosure of which is incorporated by reference herein in their entirety.

TECHNICAL FIELD

The present invention relates to a data transmission method, and more specifically, to methods of transmitting data or control information for satisfying high reliability and low latency requirements, and apparatuses for the same.

BACKGROUND ART

The 3GPP is currently discussing frame structures, modulation and coding schemes (MCS), waveform and multiple access scheme, and the like for New Radio (NR) for study of the next generation/5G radio access technology. The NR requires a design that can satisfy various conditions including an improved data rate compared to the LTE/LTE-Advanced. In particular, as the representative scenarios of the NR, enhancement Mobile BroadBand (eMBB), massive MTC (MMTC), and Ultra Reliable and Low Latency Communication (URLLC) are raised, and in order to satisfy the requirements of each scenario, it is necessary to design a flexible frame structure compared to that of the LTE/LTE-Advanced.

In order to support the URLLC service, a terminal requests scheduling from a serving base station, receives an uplink (UL) grant, and transmits a UL data channel. Alternatively, the terminal receives downlink (DL) assignment information, and receives a DL data channel. The terminal processes a transport block based on a code rate and a modulation rate indicated by the DL assignment information or the UL grant. If a quality of radio channel experienced by the terminal is not sufficient, a capacity of the radio channel may be exceeded even when the lowest code rate supported by a technical specification is indicated. In such the case, an error may occur even when a receiving end (i.e., serving base station in case of UL) decodes the transport block. Therefore, it is preferable to indicating a lower code rate to a transmitting end (i.e., terminal in case of UL).

DISCLOSURE

Technical Problem

An objective of the present invention for solving the above-described problem is directed to providing methods for transmitting and receiving data or control information having high reliability requirements.

An objective of the present invention for solving the above-described problem is directed to providing apparatuses for transmitting data or control information having high reliability requirements.

An objective of the present invention for solving the above-described problem is directed to providing apparatuses for receiving data or control information having high reliability requirements.

Technical Solution

An exemplary embodiment of the present invention for achieving the above-described objective, as an operation method of a terminal for transmitting uplink control information (UCI), may comprise generating a UCI; when an uplink (UL) control channel for transmission of the UCI overlaps a UL data channel in some symbols, comparing a priority of the UL control channel with a priority of the UL data channel; and selecting a UL channel having a higher priority among the UL control channel and the UL data channel, and transmitting the UCI to a base station through the selected UL channel.

When the UCI is transmitted through the UL control channel instead of the UL data channel, the UL data channel may be re-granted by the base station or transmitted in another transmission instance of a UL channel occasion including the UL data channel.

When the UCI is transmitted through the UL data channel instead of the UL control channel, an amount of resource elements occupied by the UCI in the UL data channel may be determined according to a value of a specific field included in an UL grant for the UL data channel.

The specific field may have a different value depending on whether the UL data channel corresponds to ultra-reliability low-latency communication (URLLC) traffic or enhanced mobile broadband (eMBB) traffic.

The URLLC traffic or the eMBB traffic may be identified by a radio network temporary identifier (RNTI) that scrambles downlink control information (DCI) of the UL grant, an index of a search space in which the UL grant is received, or a specific field included in the UL grant.

When the UCI is transmitted through the UL data channel instead of the UL control channel, the UL data channel may be an earliest transmission instance of transmission instances overlapping with the UL control channel among transmission instances belonging to a UL data channel occasion including the UL data channel.

When the UCI is transmitted through the UL data channel instead of the UL control channel, and a frequency hopping is performed within the UL data channel, the UCI may be transmitted only in one specific frequency hop of the UL data channel.

When the UCI is transmitted through the UL data channel instead of the UL control channel, the UCI may be transmitted as being rate-matched to resource elements of the UL data channel or transmitted by puncturing a resource block mapped to resource elements of the UL data channel.

Another exemplary embodiment of the present invention for achieving the above-described objective, as an operation method of a terminal for receiving a data channel, may comprise receiving a first downlink (DL) control channel indicating transmission of a first uplink (UL) data channel; receiving a second DL control channel indicating a second UL data channel; and canceling transmission of all or part of the first UL data channel, and transmitting the second UL data channel.

When the second DL control channel is received and decoded during transmission of the first UL data channel according to the first DL control channel, the transmission of part of the first UL data channel may be canceled.

When the first UL data channel includes uplink control information (UCI), and start symbols of the first UL data channel and the second UL data channel are same, the second UL data channel may also include the UCI.

When the first UL data channel includes UCI and a start symbol of the second UL data channel is later than a start symbol of the first UL data channel, the UCI may be transmitted through a UL control channel instead of the second UL data channel.

A resource of the UL control channel may be determined by a combination of an index of a control channel element (CCE) or a UL control channel resource index (PUCCH resource index (PRI)) included in a DL control channel most recently received by the terminal and information configured through higher layer signaling, or by information configured through higher layer signaling.

Yet another exemplary embodiment of the present invention for achieving the above-described objective, as an operation method of a terminal for performing a 2-step random access procedure, may comprise transmitting a message A composed of a physical random access channel (PRACH) preamble and at least one physical uplink shared channel (PUSCH) to a base station; and receiving a message B composed of a physical downlink shared channel (PDSCH) as a response to the message A from the base station, wherein the transmission of the PRACH preamble and/or the transmission of the at least one PUSCH can be canceled by reception of an uplink preemption indicator (UL PI) from the base station.

When the transmission of the PRACH preamble constituting the message A is canceled by the UL PI, the PRACH preamble may be retransmitted using a transmission power used immediately before.

When transmission of one PUSCH of the at least one PUSCH constituting the message A is canceled, all remaining PUSCHs after the canceled PUSCH may be canceled, or all the remaining PUSCHs after the canceled PUSCH may be normally transmitted.

When all the remaining PUSCHs after the canceled PUSCH are canceled, the terminal may select a PUSCH resource associated with the PRACH preamble and retransmit the at least one PUSCH constituting the message A, perform the 2-step random access procedure again by transmitting a new PRACH preamble, or perform a four-step random access procedure.

A time interval for receiving the message B may start from a slot in which the terminal receives the UL PI or a slot in which the terminal transmits the PRACH preamble.

The reception of the message B can be canceled by reception of a DL preemption indicator (DL PI) from the base station.

The UL PI may be a specific format of a physical downlink control channel (PDCCH).

Advantageous Effects

According to the exemplary embodiments of the present invention, the reliability of data transmission can be improved by repeatedly transmitting the data channel. In addition, when transmission resources of signals and/or channels overlap in time, a selection or multiplexing procedure for the signals and/or channels can be performed based on priorities, thereby increasing reliability of the data transmission and reducing latency thereof. Also, the efficiency of radio resources can be improved.

MODES OF THE INVENTION

Figure 1:
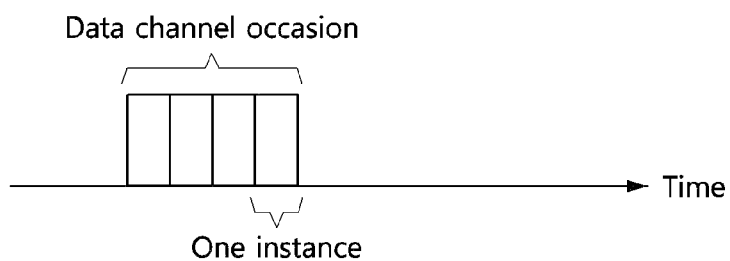
FIGS. 1 and 2 are conceptual diagrams for explaining a periodicity (i.e., the second periodicity) of transmission instances.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferable exemplary embodiments of the present invention will be described in detail with reference to the accompanying drawings.

In the following description, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Repeated Transmission of Data Channel

The base station or the terminal may repeatedly transmit a downlink (DL) data channel (e.g., physical downlink shared channel (PDSCH)) or an uplink (UL) data channel (e.g., physical uplink shared channel (PUSCH)). In the following description, DL data channels or UL data channels that are repeatedly transmitted are referred to as an occasion. The DL data channel occasion or the UL data channel occasion may consist of one or more transmission instances. If a transport block is transmitted two or more times, a code rate may be reduced by the number of times the transport block is transmitted, and thus, an arbitrary code rate other than a code rate presented by a technical specification may be expressed.

(1) Allocation and Indication of Time Domain Resources

The terminal may obtain scheduling information for transmitting a UL data channel through a DL control channel, higher layer signaling, or a combination of higher layer signaling and a DL control channel. For example, in the NR system, a dynamically assigned UL data channel may be assigned using a DL control channel (i.e., downlink control information (DCI)), and a semi-statically assigned UL data channel may be indicated by a radio resource control (RRC) message (i.e., type 1 configured grant (CG) PUSCH) or may be indicated using an RRC message and a DCI (i.e., type 2 CG PUSCH).

Meanwhile, the number of times the terminal repeatedly transmits the data channel may be explicitly indicated by a DL control channel, or may be configured using higher layer signaling.

A proposed method for dynamically indicating the number of repeated transmissions is to indicate the number of repeated transmissions in a field indicating a time domain among fields for allocating a resource in a DL control channel. The serving base station may configure a list representing time domains to the terminal through higher layer signaling. One unit constituting the list may include offsets of slots and symbols at which transmission of the data channel starts, the number of symbols, and the number of times the data channel is transmitted. Then, a field included in the DL control channel may indicate one unit in the list. Therefore, even when only the existing DL control channel is used without introducing a new DL control channel, the new method of allocating a time-domain resource to the terminal may be applied.

Within one data channel occasion, a periodicity at which the terminal repeatedly transmits the data channel (i.e., periodicity of transmission instances) may be given in units of a slot or may be shorter than one slot. As an example, the terminal may transmit the data channel only once in one slot. As another example, the terminal may transmit the data channel two or more times in one slot.

When transmitting a data channel only once in one slot, the terminal may apply the same symbol offset and the same number of symbols (i.e., SLIV) to all slots in which the data channel is transmitted, thereby determining a time resource for transmitting the data channel in each slot. This may be expressed as a case in which a second periodicity $T_2$, which means the periodicity of data transmission instances in one data channel occasion, is one slot.

Figure 2:
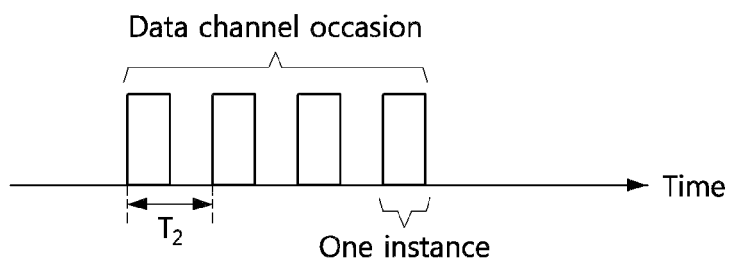

FIGS. 1 and 2 are conceptual diagrams for explaining a periodicity (i.e., the second periodicity) of transmission instances.

FIG. 1 illustrates a case where transmission instances exist consecutively within a data channel occasion, and FIG. 2 illustrates a case where transmission instances exist at intervals within a data channel occasion.

In FIGS. 1 and 2, the terminal may configure each transmission instance in the data channel occasion with adjacent symbols, and may configure one data channel occasion with four transmission instances.

Since each transmission instance has a time interval equal to the second periodicity, and is composed of adjacent symbols in FIG. 1, the second periodicity is equal to the number of symbols of the transmission instance of the data channel. In FIG. 2, the second periodicity may be greater than the number of symbols that the transmission instance of the data channel has. If the second periodicity is equal to the number of symbols that the transmission instance of the data channel has, the serving base station may not separately signal the second periodicity to the terminal.

The terminal may transmit the data channel in a dynamically allocated resource, in a preconfigured resource, or in an activated resource among preconfigured resources, based on the assignment information of the DL control channel, higher layer signaling, or a combination of higher layer signaling and the assignment information of the DL control channel.

In an exemplary embodiment, a transmission instance of one data channel may belong to only one slot without crossing a boundary of the slot.

Figure 3:
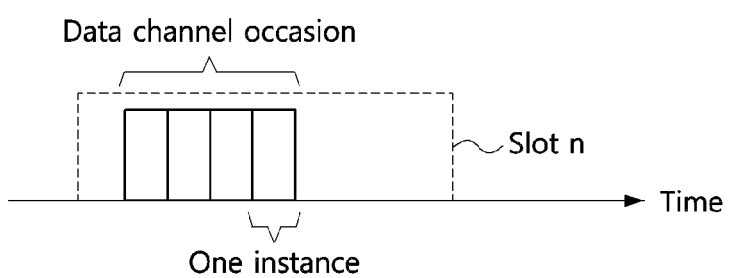
FIG. 3 illustrates an exemplary embodiment of a data channel occasion transmitted consecutively within one slot.
Figure 4:
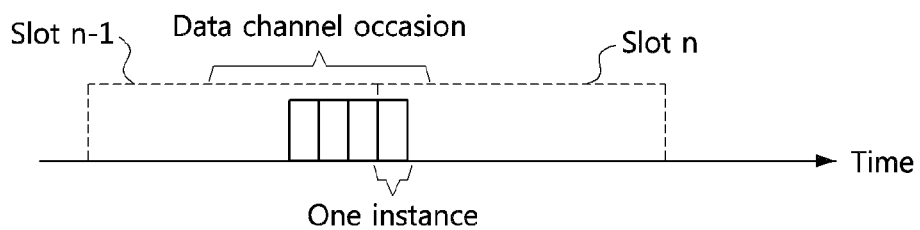
FIG. 4 illustrates an exemplary embodiment of a data channel occasion transmitted consecutively within two or more slots.

FIG. 3 illustrates an exemplary embodiment of a data channel occasion transmitted consecutively within one slot, and FIG. 4 illustrates an exemplary embodiment of a data channel occasion transmitted consecutively within two or more slots.

Referring to FIG. 3, transmission instances of a data channel occasion may all belong to the same slot. Alternatively, referring to FIG. 4, some of transmission instances of a data channel occasion may cross a slot boundary. Even beyond the slot boundary, the transmission instances of one data channel occasion may consist of adjacent symbols.

The serving base station may indicate a time resource of the repeatedly transmitted data channel by a resource assignment for the first transmission instance of the data channel and the number of repetitions (V) of the transmission instance (V). The terminal may be indicated with an index (S) of a symbol at which the first transmission instance of the data channel starts and the number (L) of symbols constituting the first transmission instance. The values of S and L may be indicated by a combination of a UL grant belonging to a DL control channel and higher layer signaling.

The terminal may utilize symbols as many as a product of L and V when transmitting the data channel occasion. If the data channel occasion does not cross the slot boundary, a transmission instance occupying L symbols among L×V consecutive symbols may be transmitted V times. On the other hand, when the data channel occasion crosses the slot boundary, according to the type of symbols (i.e., DL symbol, flexible (FL) symbol, or UL symbol) constituting the next slot (i.e., depending on a format of the next slot), a manner in which the transmission instances of the data channel are mapped may vary.

In an exemplary embodiment, the transmission instances of the data channel may be mapped to the L×V symbols, regardless of the format of the slot. For example, when transmitting a UL data channel occasion, even if DL symbols (or DL symbols and FL symbols) are present, they are considered to be included in the L×V symbols. Since the UL data channel cannot be transmitted in DL symbols (or DL symbols and FL symbols), the terminal should select some symbols that can be used for actual transmission among the L×V symbols according to the format of the slot.

In another exemplary embodiment, the L×V may be the number of symbols to which the data channel is actually mapped. For example, when transmitting a UL data channel occasion, if DL symbols (or DL symbols and FL symbols) are present, they are considered not to be included in the L×V symbols. Since the UL data channel cannot be transmitted in DL symbols (or DL symbols and FL symbols), the terminal should select the L×V symbols that can be used for actual transmission according to the format of the slot. In this case, the terminal should know the format (e.g., slot format indicator (SFI)) of the slot(s) to perform such the selection.

Method for Determining a Start Symbol of UL Data Channel in Next Slot

In case of a dynamic TDD system, in order to repeatedly transmit a data channel beyond a slot boundary, a position of a symbol at which the transmission instance of the corresponding data starts may depend on the format of the slot. As shown in the example of FIG. 4, the serving base station may configure a slot n in a form in which DL symbols, FL symbols, and UL symbols exist sequentially, or in a form in which DL symbol, FL symbol, and UL symbol exist repeatedly. Since the terminal cannot transmit a UL data channel in DL symbols, the terminal may wait for FL symbols or UL symbols in the next slot n, which are not DL symbols, and when they are a sufficient number of symbols to allocate a transmission instance of the UL data channel, the terminal may transmit the UL data channel. Here, the FL symbol refers to an FL symbol indicated to the terminal in form of a slot format by higher layer signaling.

In an exemplary embodiment, the terminal may transmit the transmission instance of the UL data channel in the first FL symbol of the next slot n. In this case, a time required to transmit the entire data channel occasion may be reduced to the minimum.

Figure 5:
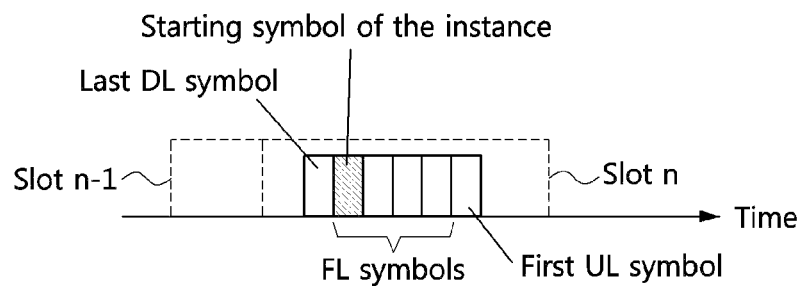
FIG. 5 is a conceptual diagram illustrating an exemplary embodiment in which a transmission instance of a UL data channel starts in a first FL symbol in a dynamic TDD system.

FIG. 5 is a conceptual diagram illustrating an exemplary embodiment in which a transmission instance of a UL data channel starts in a first FL symbol in a dynamic TDD system.

Referring to FIG. 5, a slot n has consecutive DL symbols, consecutive FL symbols, and consecutive UL symbols. The terminal may transmit a data channel in the first FL symbol among four FL symbols.

Meanwhile, the serving base station may use the first FL symbol as a guard period to secure a propagation distance between the DL symbols and the UL symbols. In this case, according to a proposed method, the terminal transmits a UL data channel in advance (i.e., timing advance) so that the UL data channel is transmitted in the first FL symbol, and thus the UL data channel transmitted by the terminal may act as an interference to a DL channel and a DL signal that other terminals receive from the base station.

In order to solve this disadvantage, in another exemplary embodiment, the terminal may transmit the UL data channel in a FL symbol other than the first FL symbol among the FL symbols of the next slot n. The serving base station may allocate a predetermined number of FL symbols as a guard period according to a cell size (defined by a DL propagation time and a UL propagation time (or a round-trip-delay to a cell boundary). The FL symbols corresponding to half of the FL symbols allocated as the guard period may be interpreted as a propagation delay to a DL boundary, and the remaining FL symbols may be interpreted as a propagation delay to a UL boundary. Therefore, when the serving base station allocates two or more FL symbols in the slot n, if some of these FL symbols are not used for UL transmission, under another assumption that the serving base station does not allocate a DL data channel in the FL symbol, a time when UL and DL overlap between terminals can be avoided.

Figure 6:
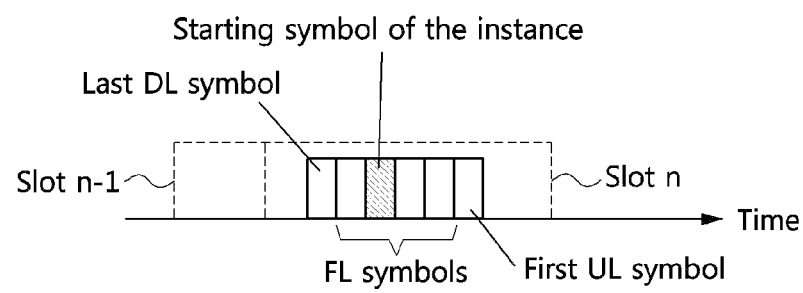
FIG. 6 is a conceptual diagram illustrating an exemplary embodiment in which a transmission instance of a UL data channel starts in a second FL symbol in a dynamic TDD system.

FIG. 6 is a conceptual diagram illustrating an exemplary embodiment in which a transmission instance of a UL data channel starts in a second FL symbol in a dynamic TDD system.

Referring to FIG. 6, as an example of another exemplary embodiment, the terminal may transmit a UL data channel in a second FL symbol among consecutive FL symbols. In order to maximize reliability and minimize latency while repeatedly transmitting the UL data channel, a timing advance (TA) of the corresponding terminal may not be so large. Therefore, when the terminal transmits the UL data channel in advance, interference to other terminals located at the cell boundary may not be large. In FIG. 6, FL symbols are consecutively located, and the terminal may transmit the data channel from the second FL symbol among them.

As another example, when the terminal knows the number L of consecutive FL symbols from the format of the slot, the terminal may transmit the UL data channel in a symbol after (L/2) FL symbols or no more than (L/2) (e.g., floor (L/2) (i.e., [L/2])) FL symbols from the first FL symbol of the L FL symbols. For example, if L is an even number, the terminal may transmit the UL data channel in the (L/2)-th or ((L/2)+1)-th symbol. Alternatively, if L is an odd number, the terminal may transmit the UL data channel in the [L/2]-th FL symbol.

Figure 7:
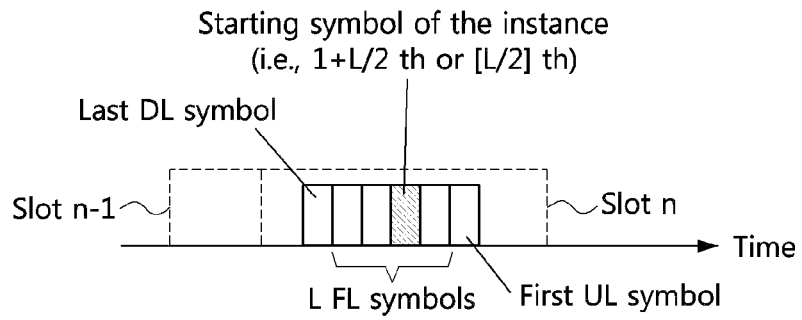
FIG. 7 is a conceptual diagram illustrating an exemplary embodiment in which a transmission instance of a UL data channel starts in an FL symbol located in a middle of FL symbols in a dynamic TDD system.

FIG. 7 is a conceptual diagram illustrating an exemplary embodiment in which a transmission instance of a UL data channel starts in an FL symbol located in a middle of FL symbols in a dynamic TDD system.

Referring to FIG. 7, since there are four consecutive FL symbols (L=4), the terminal may transmit a UL data channel from the third (i.e., 4/2+1) FL symbol.

As another example, the terminal may transmit the UL data channel in the last FL symbol among consecutive FL symbols. In order to reduce inter-terminal interference due to the timing advance, FL symbols may not be used for UL transmission. However, at least one FL symbol may be used for UL transmission as a method of using some of the FL symbols, so that the transmission instance of the UL data channel can start earlier.

Figure 8:
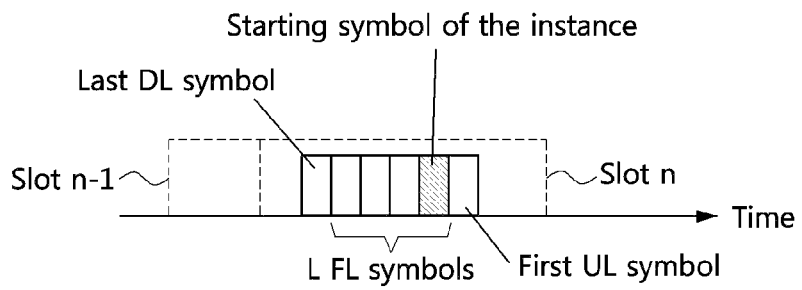
FIG. 8 is a conceptual diagram illustrating an exemplary embodiment in which a transmission instance of a UL data channel starts in a last FL symbol among FL symbols in a dynamic TDD system.

FIG. 8 is a conceptual diagram illustrating an exemplary embodiment in which a transmission instance of a UL data channel starts in a last FL symbol among FL symbols in a dynamic TDD system.

Referring to FIG. 8, four FL symbols are consecutive, and the terminal may transmit a UL data channel from the fourth FL symbol.

In another proposed method, the terminal may transmit a UL data channel in the first UL symbol of the next slot n. In this case, since the terminal transmits the UL data channel by avoiding the guard period composed of FL symbols, the delay time of the corresponding transmission instance is slightly increased, but the UL data channel does not interfere with other terminals.

Figure 9:
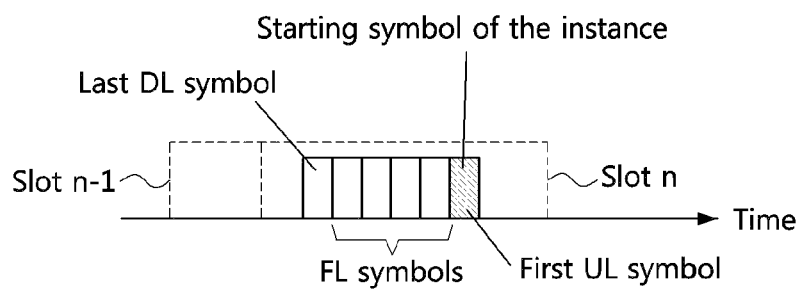
FIG. 9 is a conceptual diagram illustrating an exemplary embodiment in which a transmission instance of a UL data channel starts in a UL symbol located after FL symbols in a dynamic TDD system.

FIG. 9 is a conceptual diagram illustrating an exemplary embodiment in which a transmission instance of a UL data channel starts in a UL symbol located after FL symbols in a dynamic TDD system.

Referring to FIG. 9, the terminal may transmit a UL data channel in UL symbols located after all FL symbols. In particular, the terminal may transmit the UL data channel in the first UL symbol.

When a UL data channel occasion is transmitted in two or more slots beyond one slot, it may be determined whether the terminal determines the symbol in which the transmission instance of the UL data channel starts as a FL symbol or a UL symbol according to signaling of the serving base station, or as defined in a technical specification.

In an exemplary embodiment, the serving base station may use higher layer signaling to inform the terminal which symbol among the FL symbols or the UL symbols to transmit the transmission instance of the UL data channel. The higher layer signaling is information from which the terminal can infer an index of the symbol, and through the higher layer signaling, the terminal may identify one value among the first FL symbol, the last FL symbol, the middle FL symbol, and the first UL symbol. Based on this value, the terminal may derive a time resource for transmitting the transmission instance of the UL data channel. The above scheme may be applied both in case of dynamic scheduling in which the serving base station assigns a UL grant to the terminal through a DCI and in case of semi-static scheduling (e.g., configured grant type 1 and configured grant type 2). Meanwhile, even in the method of semi-static scheduling of the DL data channel, it is possible to inform from which FL symbol among the FL symbols to transmit the DL data channel.

In another exemplary embodiment, if one time resource is determined in the technical specification, signaling between the serving base station and the terminal is unnecessary. For example, the terminal may transmit the transmission instance of the UL data channel from the first UL symbol. This method may increase latency because it does not use the FL symbol, but it may be applied regardless of the method for the serving station to assign the UL data channel occasion (e.g., dynamic scheduling in which the serving base station performs assignment through a DCI or semi-static scheduling (e.g., CG type 1, CG type 2)). Meanwhile, even in the method of semi-static scheduling of the DL data channel, it may be determined from which FL symbol among FL symbols to transmit the DL data channel according to the technical specification.

According to the conventional method, when the data channel occasion is dynamically assigned, the transmission instance is transmitted from the first symbol of the FL symbols, and when the UL data channel occasion is semi-statically assigned, the transmission instance is transmitted from the first symbol of the UL symbols. However, according to the proposed method, regardless of whether the data channel occasion is dynamically assigned or semi-statically assigned, the position of the symbol at which the transmission instance of the data channel is started may be determined according to higher layer signaling.

Methods of Transmitting a Transmission Instance in a Slot with an Insufficient Number of Symbols If the number of symbols is insufficient to transmit a data channel without crossing a slot boundary, all of one transmission instance of the data channel may not be transmitted in the corresponding slot. In this case, the transmitter may map only a demodulation reference signal (DM-RS) of the data channel to the corresponding slot, and may not map data or a part of the data to the corresponding slot. Since the receiver cannot successfully decode a transport block by receiving only such the transmission instance of the data channel, the receiver should also receive other transmission instances to decode the transport block.

In an exemplary embodiment, if the number of symbols is insufficient to transmit the transmission instance, the transmitter may transmit the data channel from the earliest symbol that can be transmitted in the next slot without transmitting the data channel in the corresponding slot. Here, the earliest symbol may be determined by applying the methods described above, and the transmitter and the receiver may share this. Therefore, even if the first transmission instance of the data channel occasion cannot be fully mapped in the corresponding slot, the transmitter may map the transmission instance of the data channel to the next slot, and the receiver may know the position of the corresponding symbol. If the second or subsequent transmission instance of the data channel cannot be fully mapped in the corresponding slot, the transmitter may map the transmission instance of the data channel to the next slot, and the receiver may also know the position of the corresponding symbol. In the above-described exemplary embodiment, since the next slot is used when the slot does not have a sufficient number of symbols, the time delay experienced by the transport block may be increased. In addition, this delay may increase as the transmission instance of the data channel has a large number of symbols.

Therefore, in another exemplary embodiment proposed to reduce the delay, the transmitter may transmit the data channel even in a slot with an insufficient number of symbols. The transmitter may map the transport block (or codeword) to resource elements even when the corresponding slot has an insufficient number of symbols. If the transmitter can map only the DM-RS to the resource elements of the corresponding slot and cannot map the transport block to the resource elements, the transmitter may not transmit the UL data channel in the corresponding slot. For example, even when the data channel is mapped, the transport block may not be mapped in the slot in which only a number or fewer symbols required for transmission of the DM-RS are left. Therefore, in this case, the transmitter may not map both the DM-RS and the transport block to the corresponding slot, and may transmit the transmission instance of the corresponding data channel in the next slot. Here, the symbol at which the transmission instance of the corresponding data channel starts in the next slot may be determined by applying the above-described methods.

Here, a transport block size (TBS) calculated by the transmitter and the receiver may be based on one transmission instance transmitted in a sufficient number of symbols or all transmission instances belonging to the data channel occasion.

In another exemplary embodiment, the above scheme may be applied only to the second or subsequent transmission instance. The transmitter may transmit the data channel in a slot with fewer symbols than the number of symbols required to transmit the transmission instance of the data channel. However, in a slot with fewer symbols than the number of symbols required to transmit the transmission instance, the transmitter may transmit only the second or subsequent transmission instance of the data channel, without transmitting the first transmission instance of the data channel. Since the first transmission instance has the most information bits among redundancy versions of the transport block, if the first transmission instance is transmitted with insufficient symbols, the receiver may interpret the information bits in a state in which a lot of the information bits are lost. Since the receiver combines the insufficient first redundancy version with the remaining redundancy versions obtained from the subsequent transmission instances, a probability of successful decoding may not be greatly improved.

Meanwhile, in case of UL transmission, the transmission instance of the UL data channel may be multiplexed with uplink control information (UCI). However, if the corresponding slot has an insufficient number of symbols to transmit the UL data channel, it is desirable not to multiplex the UCI with the UL data channel. Therefore, in this case, the terminal may not multiplex the UL data channel and the UCI even when the time resource of the UL control channel overlaps with the time resource of the transmission instance of the UL data channel.

Number (V) of Repetitions Signaling

One data channel occasion may have one or more transmission instances (i.e., number of repetitions (V)). The serving base station may use higher layer signaling, a DL control channel, or a combination of higher layer signaling and a DL control channel to inform V to the terminal.

In a proposed method, the base station may configure various combinations of the length (L) and number (V) of repeated transmissions of the transmission instance, each of which is represented by a slot offset (e.g., K2 for UL, K0 for DL), a symbol offset (S), and number of symbols, to the terminal, and transmit a value indicating one of the combinations to the terminal through a DL control channel. Through this, the terminal may be informed of a time resource of the first transmission instance of the data channel and the number (V) of transmission instances of the data channel occasion. This is as shown in Table 1 and Table 2.

TABLE 1

| Row Index | $K_2$ | S | L | V |
|---|---|---|---|---|
| — | — | — | — | v |

TABLE 2

| Row Index | dmrs-TypeA-Position | $K_0$ | S | L | V |
|---|---|---|---|---|---|
| — | — | — | — | — | v |

According to the examples of Table 1 and Table 2, the number of data channel transmissions (i.e., the number of transmission instances) may be represented by V. Since the second periodicity is equal to the length (L) of the data channel transmission instance, the second periodicity may not be defined separately, or the terminal may not have separate signaling for the second periodicity.

In another exemplary embodiment, the serving base station may configure the number (V) of transmission instances of the data channel occasion and the time resource for the first transmission instance of the data channel as separate fields in a DL control channel, and transmit them to the terminal. In this case, the time resource for the first transmission instance of the data channel may be indicated to the terminal in the same manner as the conventional method (i.e., the dynamic scheduling scheme). However, there is a difference from the conventional method in that the number of transmission instances is dynamically informed to the terminal through the DL control channel.

Signaling of Second Periodicity

In an exemplary embodiment, the serving base station may indicate a value of the second periodicity by the number of symbols of the transmission instance of the data channel among the combinations of time resources of the transmission instance of the data channel indicated by the higher layer signaling described above, or may indicate the value of the second periodicity separately from the number of the symbols.

That is, when the value of the second periodicity is equal to the number of symbols of the transmission instance of the data channel (e.g., the case in FIG. 1), the serving base station may not separately indicate the value of the second periodicity to the terminal. Therefore, in this case, the combination of time resources of the transmission instance of the data channel indicated through higher layer signaling may not include the value of the second periodicity.

On the other hand, when the value of the second periodicity is larger than the number of symbols of the transmission instance of the data channel (e.g., the case in FIG. 2), the serving base station may separately indicate the value of the second periodicity to the terminal. The terminal may derive the time resource that the transmission instance of the data channel should have by using resource allocation information of a DL control channel, higher layer signaling, or a combination of resource allocation information of the DL control channel and higher layer signaling. The resource allocation information of the DL control channel or higher layer signaling may indicate information of Table 3 below. Information unnecessary for the description is omitted by using (-).

TABLE 3

| Row Index | $K_2$ | S | L | V | $T_2$ |
|---|---|---|---|---|---|
| — | — | — | — | v | $t_2$ |

According to Table 3, the number of transmissions of the UL data channel (i.e., the number of transmission instances) is represented by V and may have a value of v. The second periodicity is represented by $T_2$ and may have a value of t2. The terminal may transmit the UL data channel for every $t_2$ symbols. The terminal may determine a time resource for the transmission instance of the UL data channel by using the values of S and L with respect to a slot or a unit having a predetermined time length (e.g., a subslot to be described later). In Table 3, since the third periodicity ($T_3$, which will be described later) is not indicated, the terminal assumes the third periodicity as a value configured by the serving base station through higher layer signaling or a value defined in the technical specification. The third periodicity may have a value of one slot or a half slot.

In another exemplary embodiment, the terminal may divide one slot into two or more subslots by dividing the slot according to a predetermined periodicity, and interpret the time resource received by the UL grant or higher layer signaling on a subslot basis. For example, in case of a normal cyclic prefix (CP), the subslot may be interpreted as 7 symbols, or in case of an extended CP, the subslot may be interpreted as 6 symbols. In another example, the subslot may be interpreted as two symbols. The symbol offset and the number of symbols for the transmission instance of the UL data channel are interpreted on the subslot basis. In this case, if only the second periodicity is indicated to the terminal, the UL data channel is transmitted once per subslot and repeated v times.

On the other hand, the above-described method and example may also be applied to a DL data channel. DL assignment or higher layer signaling may indicate information of Table 4 below. Information unnecessary for the description is omitted by using (-).

TABLE 4

| Row Index | dmrs-TypeA-Position | $K_0$ | S | L | V | $T_2$ |
|---|---|---|---|---|---|---|
| — | — | — | — | — | v | $t_2$ |

Definition of Third Periodicity

According to the above-described methods, the data channel may be repeatedly transmitted a large number of times within a short time. However, there may be a situation in which the UL data channel cannot be transmitted. For example, the UL data channel may not be transmitted in a DL symbol, an FL symbol, a UL symbol in which a sounding reference signal (SRS) is transmitted, a UL symbol in which a UL control channel is transmitted, and the like. When the UL data channel and other UL channels or UL signals (e.g., SRS or UL control channel) are difficult to multiplex, the UL data channels may not always be repeatedly transmitted in consecutively located symbols. The same situation exists for DL data channels, and the DL data channels may not always be repeatedly transmitted in consecutively located symbols.

In an exemplary embodiment of the present invention, the transmitter may transmit some transmission instances of the data channel occasion and then transmit the remaining transmission instances of the data channel occasion after a predetermined interval. Here, the predetermined interval may be referred to as a third periodicity $T_3$. The proposed method may be applied even when the transmission instance of the data channel cannot be transmitted according to the format of the slot, or when symbols are not given enough to transmit the data channel multiple times in the slot to be considered.

Figure 10:
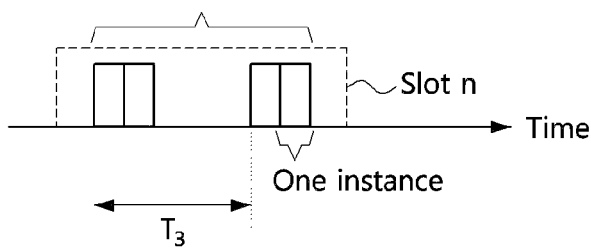
FIG. 10 is a conceptual diagram illustrating a first exemplary embodiment in which a transmission instance is determined by applying a third periodicity.

FIG. 10 is a conceptual diagram illustrating a first exemplary embodiment in which a transmission instance is determined by applying a third periodicity.

In the case illustrated in FIG. 10, it may be assumed that transmission instances of one data channel occasion belong to only one slot without crossing a slot boundary.

Referring to FIG. 10, a data channel occasion consisting of four transmission instances in one slot is shown. The terminal may transmit two transmission instances, and then transmit the remaining two transmission instances after the third periodicity $T_2$ elapses without successively transmitting the transmission instances of the data channel occasion. Here, the first two transmission instances and the remaining two transmission instances may be determined through the format of the slot, configuration of the serving base station, or a combination of the configuration and dynamic signaling, and may be inform to the terminal in advance.

Figure 11:
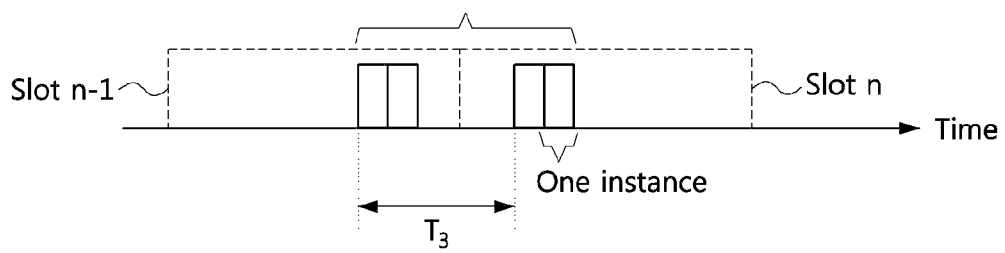
FIG. 11 is a conceptual diagram illustrating a second exemplary embodiment in which a transmission instance is determined by applying a third periodicity.

FIG. 11 is a conceptual diagram illustrating a second exemplary embodiment in which a transmission instance is determined by applying a third periodicity.

In the case illustrated in FIG. 11, it may be assumed that transmission instances of one data channel occasion may belong to different slots beyond a slot boundary.

Referring to FIG. 11, a data channel occasion consisting of four transmission instances in two slots is shown. The case of FIG. 11 is the same as that of FIG. 10 in that transmission instances are separated in time by the third periodicity, but the case of FIG. 11 is different from the case of FIG. 10 in that slots in which transmission instances are located are different.

Figure 12:
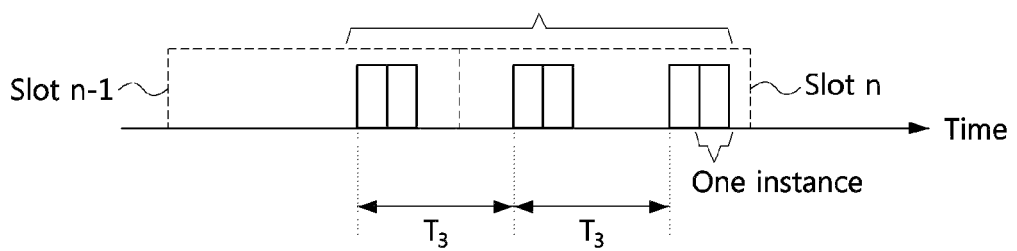
FIG. 12 is a conceptual diagram illustrating a third exemplary embodiment in which a transmission instance is determined by applying a third periodicity.

FIG. 12 is a conceptual diagram illustrating a third exemplary embodiment in which a transmission instance is determined by applying a third periodicity.

The case illustrated in FIG. 12 further extends the case illustrated in FIG. 11.

Referring to FIG. 12, in case of a data channel occasion consisting of six transmission instances, a group of two transmission instances may occur three time, which may be transmitted in two or more slots. These groups of transmission instances may have time intervals according to the third periodicity.

Signaling of Third Periodicity

The terminal may transmit a data channel once or more in accordance with the third periodicity described above. The terminal may sequentially transmit one or more transmission instances of the data channel by applying the same symbol offset (S) and the same number (L) of symbols based on the third periodicity.

The value of the third periodicity may be defined in the technical specification, and in this case, signaling is unnecessary for the terminal. The value of the third periodicity may correspond to one slot or a half of one slot. For example, in case of a normal CP, the third periodicity may indicate a length of time corresponding to seven symbols. In case of an extended CP, the third periodicity may indicate a length of time corresponding to six symbols. Alternatively, the value of the third periodicity may indicate a length of time corresponding to two symbols.

Meanwhile, when the serving base station explicitly informs the value of the third periodicity by higher layer signaling, in the list of configuring the time resources by the higher layer signaling at the serving base station, the value of the third periodicity may be included in addition to the number of symbols of the transmission instance of the data channel and the number of transmissions of the data channel. The terminal may derive a time resource that the transmission instance of the data channel should have by using resource allocation information of a DL control channel, higher layer signaling, or a combination of resource allocation information of a DL control channel and higher layer signaling. A UL grant or higher layer signaling may indicate information of Table 5 below. Information unnecessary for the description is omitted by using (-).

TABLE 5

| Row Index | $K_2$ | S | L | V | $T_3$ |
|---|---|---|---|---|---|
| — | — | — | — | v | Half Slot |
| — | — | — | — | v | One Slot |

In Table 5, the number of transmissions of the UL data channel may be represented by V, and the third periodicity may be represented by 'half slot' or 'one slot'. The terminal transmits the UL data channel at the third periodicity and transmits the UL data channel V times.

On the other hand, the above-described method and example may be equally applied to a DL data channel. DL assignment or higher layer signaling may indicate information of Table 6 below. Information unnecessary for the description is omitted by using (-).

TABLE 6

| Row Index | dmrs-TypeA-Position | $K_0$ | S | L | V | $T_3$ |
|---|---|---|---|---|---|---|
| — | — | — | — | — | v | Half Slot |

Signaling of Second Periodicity/Third Periodicity

In the list of configuring time resources by higher layer signaling at the serving base station, the values of the second periodicity and the third periodicity may be included in addition to the number L of symbols of the transmission instance of the data channel and the start symbol S. The terminal may derive a time resource that the transmission instance of the data channel should have by using resource allocation information of a DL control channel, higher layer signaling, or a combination of resource allocation information of a DL control channel and higher layer signaling. Resource allocation information included in the DL control channel or higher layer signaling may indicate information of Table 7 below. Information unnecessary for the description is omitted by using (-).

TABLE 7

| Row Index | $K_2$ | S | L | W | V | $T_2$ | $T_3$ |
|---|---|---|---|---|---|---|---|
| — | — | — | — | w | v | $t_2$ | $t_3$ |

In Table 7, the number of times of transmitting the UL data channel may be represented by W and V. According to an example, the terminal may transmit the UL data channel W times with the second periodicity, and thus, the transmission instances of UL data repeatedly transmitted W times may be repeated V times with the third periodicity. Therefore, the terminal may repeatedly transmit the UL data channel (W×V) times. According to another example, the terminal may transmit the UL data channel W times with the second periodicity, and thus, the transmission instances of UL data repeatedly transmitted W times may be repeated V/W times with the third periodicity. Therefore, the terminal may repeatedly transmit the UL data channel V times.

TABLE 8

| Row Index | $K_2$ | S | L | W | $T_2$ | $T_3$ |
|---|---|---|---|---|---|---|
| — | — | — | — | w | $t_2$ | $t_3$ |

In Table 8, the number of times of transmitting the UL data channel may be represented by higher layer signaling and W. Information unnecessary for the description is omitted by using (-).

As an example, the terminal may transmit the UL data channel W times with the second periodicity. The transmission instances of the UL data channel repeatedly transmitted W times may be transmitted according to the third periodicity, and the number of repetitions may follow a value X received through higher layer signaling. That is, W transmission instances for the UL data channel configures a set of UL data channels, and the terminal may repeat the set X times to transmit the UL data channel occasion. Therefore, the number of times that the terminal transmits the UL data channel may be given as a product of X and W, which are received through higher layer signaling.

As another example, the terminal may transmit the UL data channel W times with the second periodicity. The transmission instances of the UL data channel repeatedly transmitted W times may be transmitted according to the third periodicity, and the number of repetitions may follow a value obtained by dividing the value X received by higher layer signaling by W. Therefore, the terminal repeats the UL data channel X times.

Meanwhile, the proposed method may also be applied to a DL data channel. DL assignment or higher layer signaling may indicate information of Table 9 or Table 10 below. Information unnecessary for the description is omitted by using (-).

TABLE 9

| Row Index | dmrs-TypeA-Position | $K_0$ | S | L | W | V | $T_2$ | $T_3$ |
|---|---|---|---|---|---|---|---|---|
| — | — | — | — | — | w | v | $t_2$ | $t_3$ |

TABLE 10

| Row Index | dmrs-TypeA-Position | $K_0$ | S | L | W | $T_2$ | $T_3$ |
|---|---|---|---|---|---|---|---|
| — | — | — | — | — | w | $t_2$ | $t_3$ |

Configured Grant Transmission

The above-described methods may also be applied when the terminal repeatedly transmits a data channel configured only by higher layer signaling without assignment information of a DL control channel (e.g., type 1 configured grant PUSCH transmission) or when the terminal repeatedly transmits a data channel configured by higher signaling based on an activation signal through a DL control channel (e.g., type 2 configured grant PUSCH transmission or semi-statically scheduled PDSCH).

Figure 13:
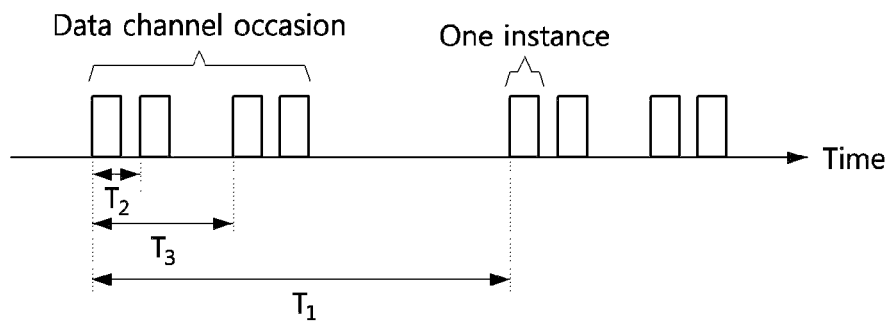
FIG. 13 is a conceptual diagram for explaining periodicities of a data channel occasion and a data channel transmission instance configured through higher layer signaling.

FIG. 13 is a conceptual diagram for explaining periodicities of a data channel occasion and a data channel transmission instance configured through higher layer signaling.

Referring to FIG. 13, the periodicity of the data channel occasion may be represented by the first periodicity, transmission instances of the data channel may be transmitted according to the second periodicity, and in some cases, sets of data channels may have a time interval according to the third periodicity. When the terminal transmits a transport block, the terminal may transmit the transport block in the first transmission instance included in the data channel occasion.

Meanwhile, the above-described methods may also be applied to a case where the data channel is repeatedly transmitted without separate configuration of the second periodicity and the third periodicity for the data channel transmission instances.

Figure 14:
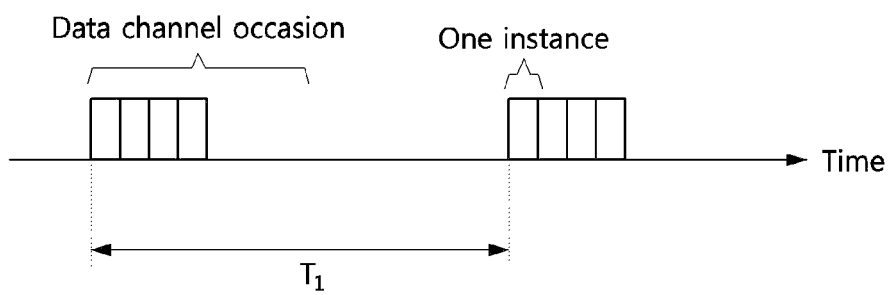
FIG. 14 is a conceptual diagram for explaining a periodicity of a data channel occasion configured through higher layer signaling.

FIG. 14 is a conceptual diagram for explaining a periodicity of a data channel occasion configured through higher layer signaling.

According to FIG. 14, when there is no separate configuration for the second periodicity and the third periodicity, the periodicity of the data channel occasion may be expressed as the first periodicity. When the terminal transmits a transport block, the terminal may transmit the transport block in the first transmission instance included in the data channel occasion.

(2) Allocation and Indication of Frequency Domain Resources

When transmitting a data channel in a given slot, frequency hopping may be considered for each transmission instance of the data channel. The serving base station may instruct the terminal with higher layer signaling to enable or disable the frequency hopping.

As an example, when determining a frequency resource of the data channel, the terminal may perform frequency hopping for each transmission instance of the data channel within the same slot. One or two frequency resources may be configured for this purpose. When the serving base station configures the terminal through the higher layer signaling to perform frequency hopping, the serving base station may configure a hopping bandwidth to the terminal through higher layer signaling. The terminal may identify allocation of the frequency resources, that is, a location of a resource block in which the data channel starts, from allocation information of a DL control channel or a UL grant, and may derive a location of frequency hopping by applying the hopping bandwidth.

As another example, the serving base station may configure the terminal through higher layer signaling so that the terminal does not perform frequency hopping for the transmission instance of the data channel. The terminal may identify allocation of frequency resources, that is, a location of a resource block in which the data channel starts, from allocation information of a DL control channel or a UL grant.

When the terminal transmits the data channel K times (K≥2), the number of frequency resources used by the data channel occasion may be two or more. When the terminal performs frequency hopping while transmitting the data channel once, frequency resources used while transmitting the data channel by repeating K times are the same. That is, the frequency resource of the first hop and the frequency resource of the second hop are the same as the frequency resource of the first hop and the second hop of the data channel repeatedly transmitted K times, respectively.

Figure 15:
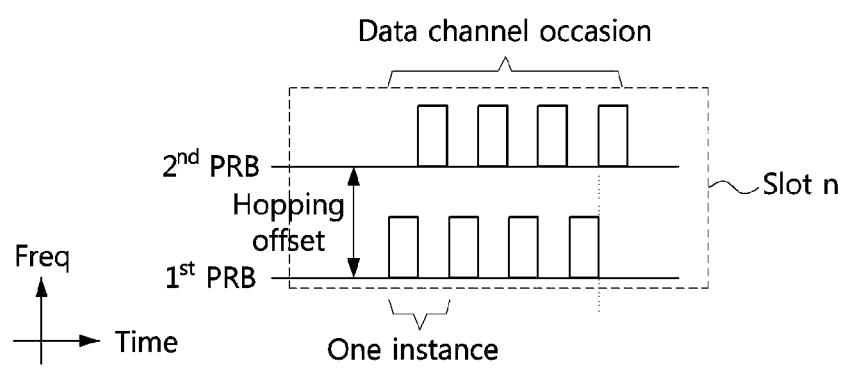
FIG. 15 is a conceptual diagram illustrating an exemplary embodiment in which transmission instances are successively assigned while performing frequency hopping within a transmission instance of a data channel within one slot.

FIG. 15 is a conceptual diagram illustrating an exemplary embodiment in which transmission instances are successively assigned while performing frequency hopping within a transmission instance of a data channel within one slot.

In FIG. 15, a case where a data channel is repeatedly transmitted four times, two frequency resources are used, and transmission instances of the data channel are arranged in succession is illustrated. According to FIG. 15, the transmission instances of the data channel may be separated in time by the second periodicity, and a value of the second periodicity is equal to the number of symbols that the transmission instance of the data channel has. Meanwhile, in a frequency division duplex (FDD) system, the data channel occasion may be allocated as shown in FIG. 15. However, when operating based on dynamic time division duplex (dynamic TDD) in a time division duplex (TDD) system, unlike in FIG. 15, since the data channel may use only some symbols of the slot, some of the transmission instances of the data channel may not be arranged consecutively in the slot. Therefore, the method of time domain resource allocation described above may be used.

On the other hand, the transmission instances of the data channel constituting the data channel occasion may cross a slot boundary.

Figure 16:
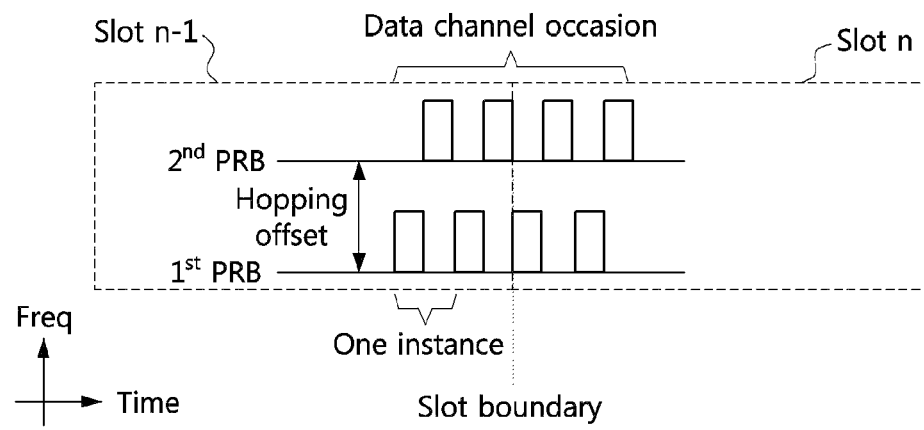
FIG. 16 is a conceptual diagram illustrating an exemplary embodiment in which transmission instances are successively assigned while performing frequency hopping within a transmission instance of a data channel in two or more slots.

FIG. 16 is a conceptual diagram illustrating an exemplary embodiment in which transmission instances are successively assigned while performing frequency hopping within a transmission instance of a data channel in two or more slots.

In FIG. 16, when transmission instances of the data channel are arranged consecutively, the slot boundary may be crossed. Such the data channel occasion may be transmitted in an FDD system, but such the data channel occasion may not be transmitted in a TDD system depending on the slot format. In this case, the third periodicity described above may be introduced to transmit the UL data channel occasion so that respective transmission instances are not arranged in succession.

If the terminal is instructed not to perform frequency hopping within the data channel while repeatedly transmitting the data channel, frequency resources of transmissions of the data channel may be different, and the frequency resources may be given as two or less values. That is, odd-numbered transmission and even-numbered transmission for transmitting the data channel may have different frequency resources.

Figure 17:
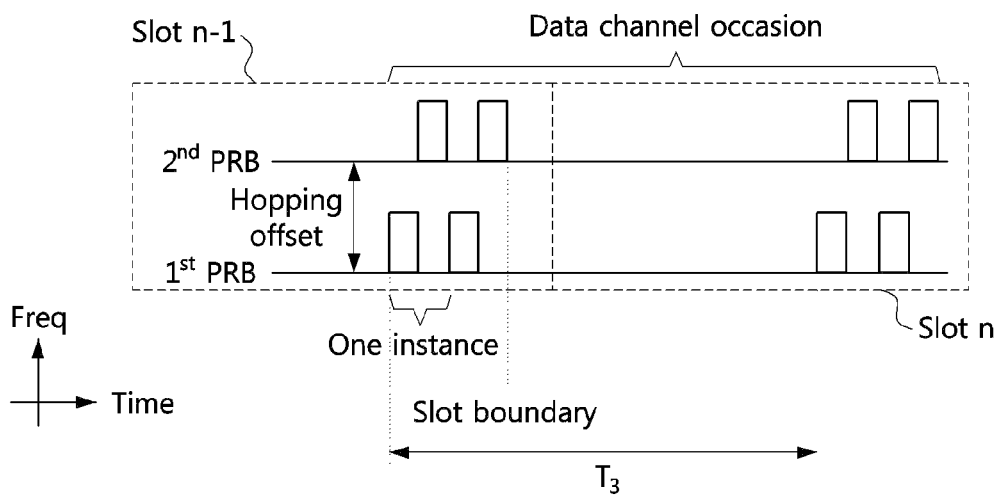
FIG. 17 is a conceptual diagram illustrating an exemplary embodiment in which a third periodicity is applied to transmission instances while performing frequency hopping within a transmission instance of a data channel in two or more slots.

FIG. 17 is a conceptual diagram illustrating an exemplary embodiment in which a third periodicity is applied to transmission instances while performing frequency hopping within a transmission instance of a data channel in two or more slots.

In FIG. 17, a data channel occasion consists of four transmission instances. The transmission instances of the data channel may be separated in time according to the second periodicity and the third periodicity. Transmission instances of the data channel, which are consecutively arranged, have the second periodicity, but transmission instances of the data channel, which are not consecutively arranged, have the third periodicity. In FIG. 17, the third periodicity is illustrated as a value corresponding to one slot, but is not limited thereto. The value of the third periodicity may have a value corresponding to a half of a slot.

When the terminal does not perform frequency hopping within the transmission instance of the data channel and the terminal repeatedly transmits the UL data channel K times, a frequency resource used for each transmission instance of the UL data channel may be different. That is, the frequency resource of the even-numbered transmission and the frequency resource of the odd-numbered transmission may be different. Therefore, the frequency resource of the first transmission and the frequency resource of the second transmission may be different.

Figure 18:
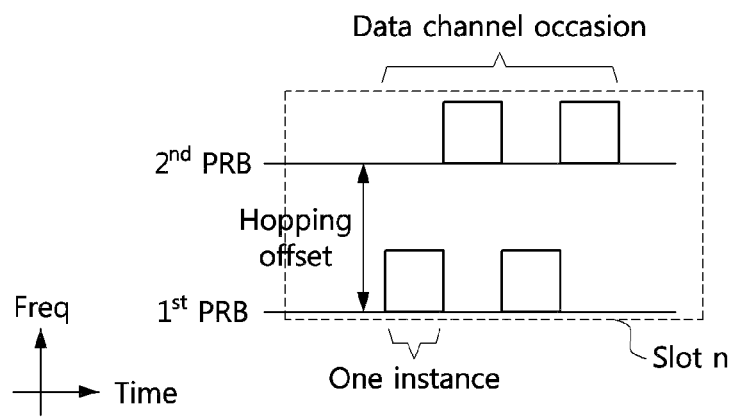
FIG. 18 is a conceptual diagram illustrating an exemplary embodiment in which transmission instances are successively allocated without performing frequency hopping within a transmission instance of a data channel within one or more slots.

FIG. 18 is a conceptual diagram illustrating an exemplary embodiment in which transmission instances are successively allocated without performing frequency hopping within a transmission instance of a data channel within one or more slots.

In FIG. 18, a case where one data channel occasion has four transmission instances and uses two frequency resources is illustrated assuming an FDD system. Referring to FIG. 18, transmission instances of the data channel are separated in time according to the second periodicity, and a value of the second periodicity is equal to the number of symbols that the transmission instance of the data channel has. When dynamic time division duplex (dynamic TDD) is applied in a TDD system, unlike in FIG. 18, some of the transmission instances of the data channel may not be arranged consecutively in the slot since the data channel may use only some symbols of the slot.

Meanwhile, the transmission instances of the data channel constituting the data channel occasion may cross the slot boundary.

Figure 19:
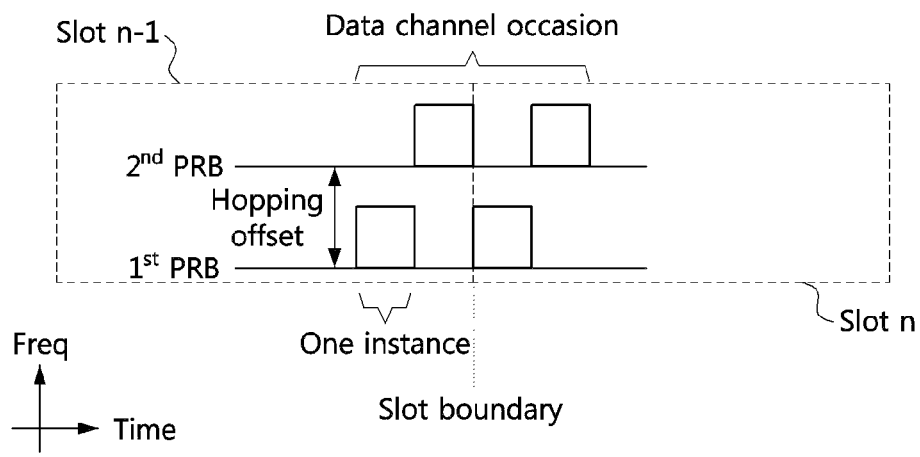
FIG. 19 is a conceptual diagram illustrating an exemplary embodiment in which transmission instances are successively allocated without performing frequency hopping within a transmission instance of a data channel in two or more slots.

FIG. 19 is a conceptual diagram illustrating an exemplary embodiment in which transmission instances are successively allocated without performing frequency hopping within a transmission instance of a data channel in two or more slots.

In FIG. 19, when transmission instances of the data channel are arranged consecutively, the boundary of the slot may be crossed. Such the data channel occasion may be transmitted in an FDD system, but such the data channel occasion may not be transmitted in a TDD system depending on the slot format. In this case, the third periodicity described above may be introduced to transmit the UL data channel occasion so that the respective transmission instances are not arranged in succession.

Figure 20:
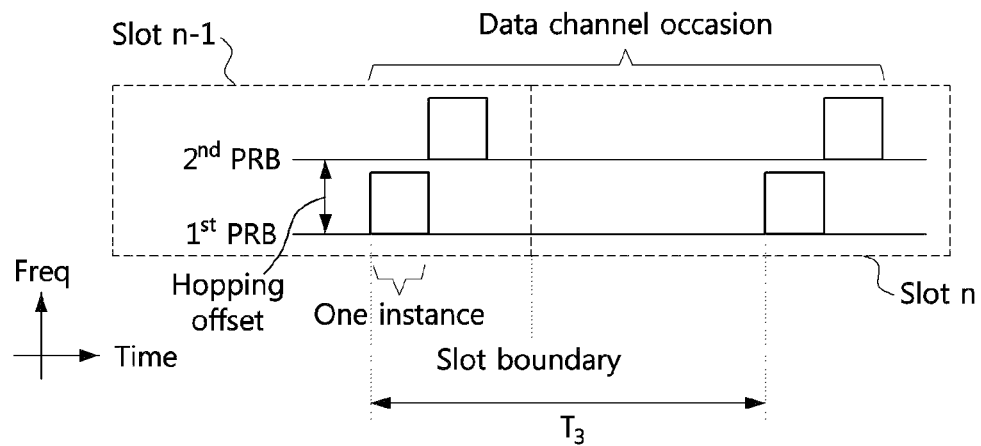
FIG. 20 is a conceptual diagram illustrating an exemplary embodiment in which a third periodicity is applied to transmission instances without performing frequency hopping within a transmission instance of a data channel in two or more slots.

FIG. 20 is a conceptual diagram illustrating an exemplary embodiment in which a third periodicity is applied to transmission instances without performing frequency hopping within a transmission instance of a data channel in two or more slots.

In FIG. 20, a data channel occasion may consist of four transmission instances. The transmission instances of the data channel may be separated in time according to the second periodicity and the third periodicity. Transmission instances of the data channel, which are consecutively arranged, have the second periodicity, but transmission instances of the data channel, which are not consecutively arranged, have the third periodicity. In FIG. 20, the third periodicity is illustrated as a value corresponding to one slot, but is not limited thereto. The value of the third periodicity may have a value corresponding to a half of a slot.

In case that the terminal moves slowly, the radio environment hardly changes in time. Although frequency hopping can be used to obtain frequency multiplexing gain, if the transmission instance of the data channel contains only a few symbols, it is rather more preferable to arrange one or more transmission instances of the UL data channel consecutively in time so that the serving base station performs channel estimation more accurately.

Figure 21:
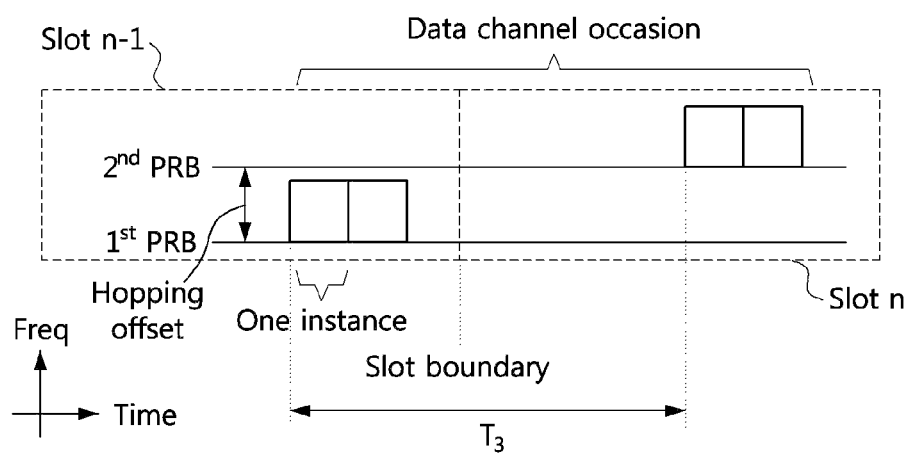
FIG. 21 is a conceptual diagram illustrating an exemplary embodiment in which a third periodicity is applied to transmission instances without performing frequency hopping within a set of data channels in two or more slots.

FIG. 21 is a conceptual diagram illustrating an exemplary embodiment in which a third periodicity is applied to transmission instances without performing frequency hopping within a set of data channels in two or more slots.

In an exemplary embodiment, the unit for performing frequency hopping may be determined as one set in which data channels are aggregated, not a data channel.

According to the aggregation of the data channels described above, transmission instances of the data channel form one set, and there are N such sets, and the terminal may transmit the transmission instances belonging to one set to the serving base station successively in time. Each set may consist of a different number of transmission instances.

The data channels of the even-numbered set and the data channels of the odd-numbered set may use different frequency resources. The data channels in the same set use the same frequency resource, and frequency hopping may not be performed within the same set.

An index of a resource block from which the frequency resource used by the data channels of the even-numbered set starts may be indicated by the serving base station to the terminal through higher layer signaling, a UL grant (or DL resource allocation), or a combination of higher layer signaling and a UL grant (or DL resource allocation). On the other hand, an index of a resource block from which the frequency resource used by the data channels of the odd-numbered set starts may be determined by adding a hopping offset to the above-described value indicated by the serving base station through the higher layer signaling, the UL grant (or DL resource allocation), or the combination of higher layer signaling and the UL grant (or DL resource allocation). The hopping offset may be indicated by the serving base station to the terminal through higher layer signaling or a combination of higher layer signaling and a UL grant (or DL resource allocation). In the case shown in FIG. 21, the value of N corresponds to two.

(3) Redundancy Versions (RVs) of Transmission Instances

The transmission instances of the data channel may have different RVs. As an example, the transmission instance of the data channel may have an RV in the order of being located in the data channel occasion. The RV may have one of four values represented by 0, 1, 2, and 3. When a codeword is stored in a soft buffer, the RV refers to a start position for performing RE mapping for the transmission instance of the data channel in a circular buffer. The RV includes information bits and parity.

The terminal may be indicated of a scheme of assigning RVs to the respective transmission instances of the data channel according to higher layer signaling. In an example, the RV may be cycled in the order of (0,3,0,3) according to first configuration of the serving base station, the RV may be cycled in the order of (0,2,3,1) according to second configuration thereof, and the RV may be cycled in the order of (0,0,0,0) according to third configuration thereof.

(4) Method of Sharing DM-RS in a Data Channel Occasion

The radio channel may hardly change while the terminal transmits a data channel occasion. In this case, when a demodulation reference signal (DM-RS) is included in each data channel constituting the data channel occasion, an unnecessarily large amount of resource elements may be allocated to the reference signal to increase a code rate of the transport block. Therefore, a method for reducing the amount of demodulation reference signal when transmitting the data channel occasion is proposed.

Figure 22:
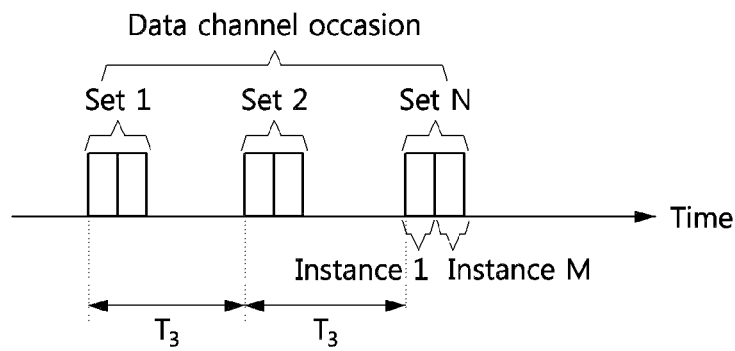
FIG. 22 is a conceptual diagram illustrating an exemplary embodiment of configuring a data channel occasion with N data channel sets each composed of M transmission instances.

FIG. 22 is a conceptual diagram illustrating an exemplary embodiment of configuring a data channel occasion with N data channel sets each composed of M transmission instances.

In an exemplary embodiment, a data channel may be repeatedly transmitted, but two or more data channels may be configured as one set, and the configured set may be repeated according to the third periodicity. When repeatedly transmitting the data channel K times, N data channel sets may be respectively configured with M transmission instances, and transmission instances of the data channel, which belong to the same data channel set, are repeated according to the second periodicity. Thus, M×N is equal to K. Here, a value of M may vary according to the second periodicity, and the terminal may transmit the data channel M times in one slot, a half slot, or other unit of time. In case of a data channel occasion defined by only the second periodicity without the third periodicity, the M transmission instances may form one set, and N sets may be transmitted in succession (K=M×N).

In this case, when the second periodicity $T_2$ means the number of symbols of each transmission instance of the data channel, the serving base station may not separately indicate $T_2$ to the terminal, and the number of symbols of the transmission instance of the data channel may be considered as the value of $T_2$.

In FIG. 22, a case where a data channel occasion having six transmission instances are configured into three sets (N=3) each having two transmission instances (M=2) is shown.

Since M data channels are consecutively located in one data channel set, the M data channels may share reference signals. Since the data channels share the DM-RS, the M data channels may not have the respective DM-RSs and may not transmit some DM-RSs. Accordingly, the terminal may map the encoded transport block to more resource elements while reducing the total amount of DM-RSs. For example, the serving base station may estimate an uplink channel only in the first transmission instance of the data channel set, and utilize the result of estimation for demodulation and decoding for all the transmission instances belonging to the corresponding data channel set.

Figure 23:
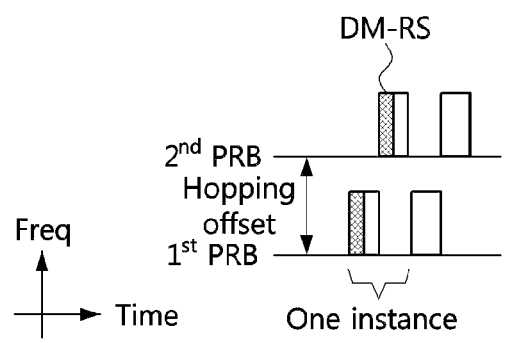
FIG. 23 is a conceptual diagram illustrating an exemplary embodiment in which DM-RSs are shared in a data channel set when frequency hopping is performed within a transmission instance of a data channel.
Figure 24:
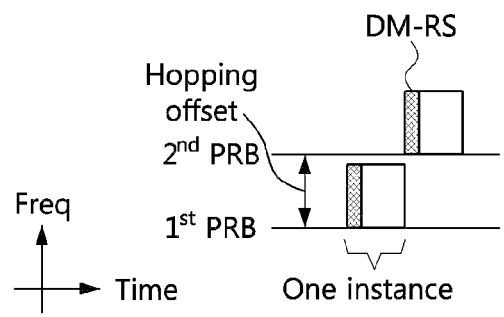
FIG. 24 is a conceptual diagram illustrating an exemplary embodiment in which DM-RSs are shared in a data channel set when frequency hopping is not performed within a transmission instance of a data channel.

FIG. 23 is a conceptual diagram illustrating an exemplary embodiment in which DM-RSs are shared in a data channel set when frequency hopping is performed within a transmission instance of a data channel, and FIG. 24 is a conceptual diagram illustrating an exemplary embodiment in which DM-RSs are shared in a data channel set when frequency hopping is not performed within a transmission instance of a data channel.

In FIG. 23, two transmission instances of the data channel may constitute one set. The second data channel located in the set may not have a DM-RS.

When frequency hopping is performed within the transmission instance of the data channel, there may be a first hop and a second hop for the first data channel belonging to the data channel set. When the DM-RS is transmitted in the first hop of the first data channel, the DM-RS may not be transmitted in the first hop of the second or subsequent data channel. Similarly, if the DM-RS is transmitted in the second hop of the first data channel, the DM-RS may not be transmitted in the second hop of the second or subsequent data channel.

In FIG. 24, two transmission instances of the data channel may constitute one set. Unlike the case of FIG. 23, the second data channel located in the data channel set may also have a DM-RS.

When frequency hopping is not performed within the data channel transmission instance, the first data channel belonging to the data channel set should have a DM-RS, and the second data channel should also have a DM-RS. When a third or subsequent data channel exists, the corresponding data channel may not include a DM-RS.

Figure 25:
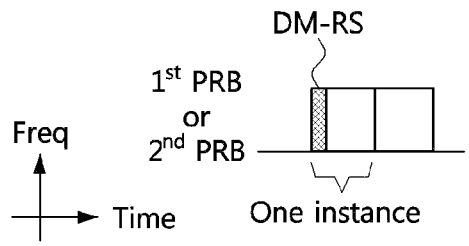
FIG. 25 is a conceptual diagram illustrating an exemplary embodiment in which a DM-RS is shared in a data channel set when frequency hopping is not performed within the data channel set.

FIG. 25 is a conceptual diagram illustrating an exemplary embodiment in which a DM-RS is shared in a data channel set when frequency hopping is not performed within the data channel set.

Referring to FIG. 25, frequency hopping may not be performed on data channels belonging to a data channel set. Therefore, the first data channel belonging to the data channel set has a DM-RS, and if there is a second or sequent data channel, it may not include a DM-RS.

In addition to the DM-RS, the UL data channels may share a phase-tracking reference signal (PT-RS). That is, M data channels belonging to the same set may not have their respective PT-RSs and may not transmit some PT-RSs. While reducing the amount of PT-RS, the terminal may map the encoded transport block to more resource elements. Meanwhile, the above method may also be applied to a DL data channel.

There may be a case where there are only a few UL symbols in a specific format of a slot in a TDD system or a case where there are a plurality of FL symbols and a few DL symbols or UL symbols in an FDD system. In order to allocate a UL data channel for a small number of UL symbols, a DM-RS and a transport block should be mapped, and in order for the mapping of the UL data channel not to cross the slot boundary, a fairly high code rate is required. Accordingly, the terminal may not allocate a UL data channel to such a small number of UL symbols or configure a UL data channel bundle to transmit the UL data channel in two or more adjacent slots. In this case, when allocating a UL data channel bundle having two or more transmission instances in two or more slots, the DM-RS may not be transmitted in one slot.

For example, if a slot n−1 and a slot n are considered, a UL data channel without DM-RS may be mapped in the slot n−1, and a UL data channel with DM-RS may be mapped in the slot n. Alternatively, the UL data channel with DM-RS may be mapped in the slot n−1, and the UL data channel without DM-RS may be mapped in the slot n. Meanwhile, the above-described scheme may be equally applied to a DL data channel and a sidelink (SL) data channel.

The transmitter may transmit a transmission instance of a data channel even in a slot having an insufficient number of symbols. In this case, a DM-RS and a part of a transport block may be mapped to the data channel at the corresponding transmission instance. If the DM-RS can be mapped to the data channel but the transport block cannot be mapped, the transmitter cannot transmit the transmission instance of the data channel in the corresponding slot. For example, if the transmitter maps the DM-RS to one symbol in a slot in which only the one symbol remains, the receiver cannot decode even a part of the transport block because there are no more symbols to map the transport block.

In an exemplary embodiment, the transmitter may configure a transmission instance of a data channel by mapping only the transport block without mapping the DM-RS. Since the receiver cannot estimate a channel only with the corresponding transmission instance, it may receive the DM-RS from another transmission instance belonging to the data channel occasion. Here, another transmission instance may be a transmission instance transmitted earlier or later than the corresponding transmission instance. When frequency hopping is performed, the DM-RS may be shared between transmission instances transmitted in the same frequency resource.

If the corresponding transmission instance and the previously transmitted transmission instance share the DM-RS, it may be interpreted that two or more transmission instances belonging to the same slot share the DM-RS to transmit the data channel occasion. If the transmission instance of the data channel under consideration is not the first (i.e., if the transmission instance of the data channel under consideration is the second or later transmission instance), the DM-RS may be shared because two or more transmission instances occur in the slot.

If the corresponding transmission instance and the late transmission instance share the DM-RS, it may be interpreted that two or more transmission instances adjacent to each other and belonging to different slots share the DM-RS to transmit the data channel occasion. This corresponds to a case where the number of symbols is insufficient although the transmission instance of the data channel under consideration is the first, and the transmitter may map only the transport block to the transmission instance without the DM-RS. The receiver should wait until the next slot or subsequent slot to which the DM-RS is mapped to obtain the channel estimation required for decoding. In a TDD system, when adjacent symbols belonging to adjacent slots are not UL symbols or DL symbols, the transmission instances of the data channel may not be consecutively located in time. Therefore, in this case, even if the DM-RS is shared between the transmission instances of the data channel at the transmitter and the receiver, the radio channel environment may be varied.

(5) Method of Multiplexing UCI in a Data Channel Occasion

In a radio communication system, various types of UCI may be defined. The acknowledgment (ACK) or negative ACK (NACK) for a result of decoding the DL data channel may be referred to as 'HARQ-ACK', information generated about a channel state after estimating the channel state may be referred to as channel state information (CSI), and information for requesting scheduling may be referred to as 'SR'.

The terminal may use a UL control channel or a UL data channel to transmit the UCI. When symbols of a UL control channel transmitted by the terminal and symbols of a UL data channel transmitted by the terminal partially overlap, the UCI may be mapped to the UL data channel. When the terminal maps the UCI to a UL data channel, mapping methods defined in the technical specification may be applied. According to the type of UCI, the number of resource elements occupied by each UCI, the order and location of mapping to a resource grid, etc. are different.

Priority varies according to the type of UCI, and the priorities may be defined in the order of HARQ-ACK> (or ≥) SR>CSI or SR> (or ≥) HARQ-ACK>CSI. The priorities may be applied when multiplexing the UL control channel or when selecting and transmitting only a part of UCIs. The conventional technical specification proposes multiplexing or selection methods of a UL control channel for a case of transmitting a UL data channel once or repeatedly and a case of transmitting a UL control channel once or repeatedly.

In case that the terminal is configured through higher layer signaling to transmit a UL control channel once and repeatedly transmit a UL data channel two or more times, they overlap in some symbols in one slot, and the terminal has a sufficient processing time, the terminal may multiplex both the UCI and the transport block, and map them to the UL data channel. In the remaining slots, the terminal transmits the UL data channel as it is.

The above-described drawings and proposed methods provide examples of configuring a UL data channel occasion using $T_1$, $T_2$, and $T_3$. However, without being limited to these, in various exemplary embodiments, only some of $T_1$, $T_2$, and $T_3$ may exist or all of them may not exist.

UL Subslot and HARQ Response Feedback Timing

According to the conventional method, a time for feedback of an HARQ response for a DL data channel may be indicated by a DL control channel (i.e., DL-DCI). The HARQ response is transmitted using a UL control channel or a UL data channel, and the feedback time of the HARQ response is defined using a parameter (numerology) of a UL bandwidth part. That is, when K1 is indicated to the terminal by a DL control channel, K1 is interpreted as the numbers of subslots or an index meaning the number of subslots defined based on the parameter of the UL bandwidth part. Here, the subslot is composed of consecutive UL symbols (or FL symbols and UL symbols) and is indicated to the terminal using higher layer signaling. Therefore, the terminal may know a pattern of the subslots configured in a given slot. The terminal may derive an interval between a subslot including the last symbol of the DL data channel and a subslot including the first symbol of the UL control channel on which the HARQ response for the DL data channel is transmitted as the value indicated by K1.

In case of feeding back the HARQ response on the UL data channel, since the UL data channel may be transmitted as included in a data channel occasion, a multiplexing scheme or a priority determination scheme in consideration thereof is required.

The terminal preferably performs UL transmission on only one signal or one channel. Therefore, a UL control channel and a UL data channel transmitted in a subslot should be multiplexed or only one of them should be selected by priorities.

The terminal may transmit the HARQ response for the DL data channel on the UL control channel. A resource used by the UL control channel is indicated in units of subslots by a DCI of the DL control channel assigning the DL data channel. The subslot is composed of consecutive FL symbols or UL symbols, and one slot may be composed of several subslots. The serving base station may indicate a pattern of the subslots to the terminal through higher layer signaling or may indicate information (e.g., the number of subslots) for deriving the pattern of the subslots.

The UL control channel may be limited to one of the subslots or may be included in two or more subslots because a large number of symbols of the UL control channel may cross the boundary of the subslot.

When the terminal transmits a UL data channel occasion, since each transmission instance is not transmitted on a subslot basis, each transmission instance of the UL data channel may be limited to one of the subslots, but each transmission instance of the UL data channel may be included in two or more subslots.

UCI Transmission on PUSCH

When the terminal generates an HARQ-ACK for a DL data channel, the terminal may transmit a UL control channel. In this case, when the UL control channel overlaps with the UL data channel in some symbols, only one UL channel may be transmitted in consideration of the priorities of the UL control channel and the UL data channel. Alternatively, when a UL data channel occasion is being transmitted, the terminal may map UCI to one or more UL data channels.

In an exemplary embodiment, the terminal may generate a UL data channel by mapping only an encoded transport block without UCI. That is, the terminal may assume that a UL data channel has a higher priority than a UL control channel, and thus may not transmit the UL control channel and the UCI. However, in this method, since an HARQ- ACK for a DL data channel is not transmitted, the serving base station should later reassign a DL data channel to the terminal. The terminal may transmit the data at every transmission instance of the UL data channel.

In another exemplary embodiment, the terminal may transmit the UCI by mapping the UCI to a UL control channel without transmitting the encoded transport block. That is, the terminal may not transmit the UL data channel and the transport block under assumption that the UL control channel has a higher priority than the UL data channel. However, in this method, since UL data for a UL grant is not transmitted, the serving base station should later reassign a UL data channel to the terminal. In addition, when a UL data channel occasion is being transmitted, the terminal may transmit a UL control channel at some transmission instances. Therefore, based on information other than the UL grant, the terminal needs to determine at which transmission instance to transmit the UL control channel instead of the UL data channel. The terminal may transmit the UL data channel at other transmission instances. In this case, the number of transmissions may be counted regardless of whether the UL data channel is transmitted.

Figure 26:
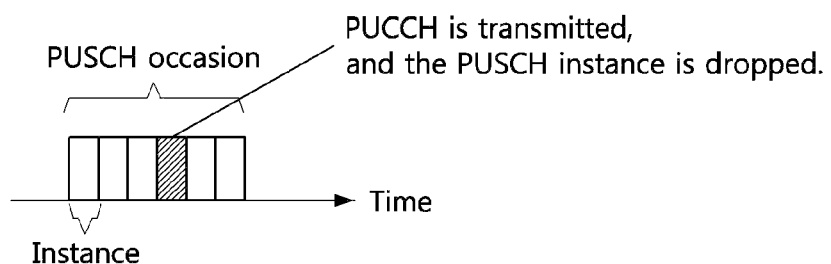
FIG. 26 is a conceptual diagram illustrating a concept in which a UL control channel is transmitted instead of a UL data channel in a transmission instance belonging to a UL data channel occasion.

FIG. 26 is a conceptual diagram illustrating a concept in which a UL control channel is transmitted instead of a UL data channel in a transmission instance belonging to a UL data channel occasion.

In FIG. 26, transmission instances of a UL data channel may be arranged consecutively in time to constitute a UL data channel occasion. Referring to FIG. 26, the terminal may be instructed to transmit the UCI at the fourth transmission instance among six transmission instances. By the proposed method, the terminal may transmit the UL control channel without transmitting the UL data channel at the corresponding transmission instance. In addition, although the terminal has been instructed to repeatedly transmit the UL data channel six times, the terminal may repeatedly transmit the UL data channel only five times and stop the transmission of the UL data channel occasion.

Figure 27:
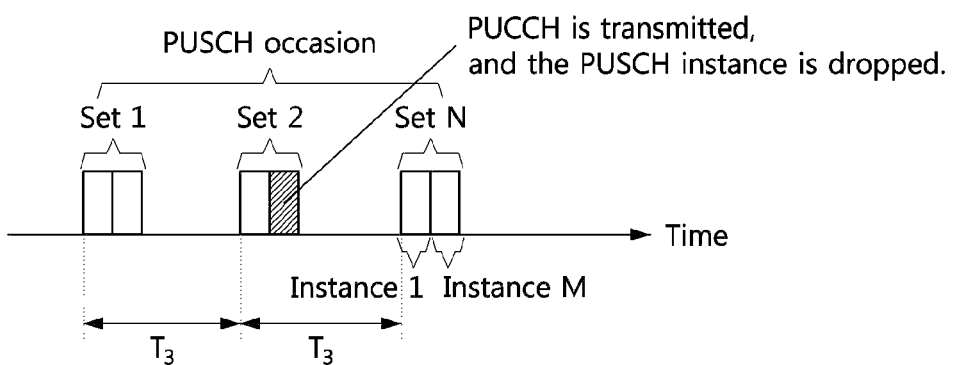
FIG. 27 is a conceptual diagram illustrating another concept in which a UL control channel is transmitted instead of a UL data channel in a transmission instance belonging to a UL data channel occasion.

FIG. 27 is a conceptual diagram illustrating another concept in which a UL control channel is transmitted instead of a UL data channel in a transmission instance belonging to a UL data channel occasion.

FIG. 27 illustrates a case in which the second periodicity $T_2$ and the third periodicity $T_3$ of the data channel occasion are known to the terminal. As described above, the terminal may transmit the UL control channel instead of the UL data channel in one transmission instance belonging to the UL data channel occasion. Referring to FIG. 27, the terminal may be instructed to transmit the UCI in the second transmission instance of the second set of UL data channels. By the proposed method, the terminal may transmit the UL control channel without transmitting the UL data channel at the corresponding transmission instance. In addition, although the terminal has been instructed to repeatedly transmit the UL data channel six times, the terminal may repeatedly transmit the UL data channel only five times and stop the transmission of the UL data channel occasion.

Hereinafter, methods for adjusting UCI piggyback for a UL data channel will be described.

Signaling with DAI and Beta Offset

The terminal may determine whether to multiplex UCI with a transport block based on information received through a UL grant. A case in which a specific field included in the UL grant has a predetermined value may be considered.

For example, when the UCI is an HARQ-ACK, if values of downlink assignment indexes (DAIs) indicate specific values (e.g., if a value of a total DAI is 0 and a value of a counter DAI is 0), the terminal may transmit only the transport block without the UCI. When the values of the DAIs indicate other values, the terminal may multiplex the UCI with the transport block.

As another example, when an index of a beta offset is given, and means the value of beta is 0, the terminal may not transmit the UCI. Here, the UCI may be HARQ-ACK, SR, or CSI. In another example, a value indicated by the beta offset for the type of UCI may be set to zero. In this case, the terminal may not transmit the type of UCI whose beta offset is indicated as zero. In yet another example, when the type of UCI is an HARQ-ACK, the value of the DAI indicates a specific value (e.g., 0), and the value of the beta offset for the HARQ-ACK indicates a specific value (e.g., 0), the terminal may not transmit the HARQ-ACK by not multiplexing with the transport block. Similarly, when the type of UCI is a CSI, a trigger field of the UL grant indicates a specific value (e.g., a bit string consisting of only zeros), and the value of the beta offset for the CSI indicates a specific value (e.g., 0), the terminal may not transmit the CSI by not multiplexing the CSI with the transport block.

Here, a beta ratio may have a different value depending on the type of UCI and the service supported by the UCI.

Signaling with Alpha Scaling

When the transport block and the UCI are multiplexed in the UL data channel, depending on the value of the beta offset, the UCI may occupy too many resource elements, so that an actual code rate may increase because the number of resource elements to which the transport block can be mapped is insufficient. In order to prevent this, in the conventional technical specification, the base station indicates an alpha scaling to the terminal through higher layer signaling, thereby providing an upper limit on the number of resource elements that can be occupied by the encoded UCI. This alpha scaling has a value less than 1 and is chosen from values of 0.5, 0.65, 0.8, and 1.0 for the NR system. When the transport block for the URLLC and the UCI are multiplexed, it is preferable that the resource elements that the transport block should have occupy more than a half of allocated entire resource elements.

In an exemplary embodiment, a value of less than 0.5 may be included in the values of the alpha scaling that can be selected. The serving base station may adjust the actual code rate that a UL-SCH can have using the alpha scaling.

In another exemplary embodiment, the value of the alpha scaling may be indicated as zero. That is, when the value of the alpha scaling is indicated as zero, since the upper limit for the amount of UCI to be multiplexed is 0, the terminal does not multiplex the UCI and the UL-SCH in the UL data channel. That is, the UL data channel is configured only by the UL-SCH. Accordingly, the base station may use the alpha scaling so that the UCI is always not multiplexed with the UL-SCH.

Here, the serving base station may preferably configure to the terminal different alpha scaling for a URLLC UL data channel and an eMBB UL data channel.

The terminal may multiplex the UCI and the transport block, map them in a UL data channel, and transmit the same to the serving base station. Hereinafter, methods for multiplexing UCI when the terminal transmits a UL data channel occasion will be proposed.

Multiplexing UCI on a Specific Transmission Instance in a Data Channel Occasion

In an exemplary embodiment, transmission instances of a UL data channel, through which the UCI is transmitted, and transmission instances without the UCI may be distinguished. Both the transport block and the UCI may be mapped to the transmission instances of the UL data channel, through which the UCI is transmitted, and only the transport block may be mapped to transmission instances of the UL data channel, through which the UCI is not transmitted. Thus, the transmission instances of the UL data channel may have different code rates. A method of identifying transmission instances of the UL data channel, through which the UCI is transmitted, will be described. Assuming the UCI is transmitted on the UL control channel, the transmission instance(s), in which some symbols overlap with the assumed UL control channel, may be selected.

For example, when transmitting a UL data channel occasion, some symbols of the UL data channel may be shared with the assumed UL control channel in one or more transmission instances. In such the case, the UCI may be multiplexed with the transport block in the corresponding transmission instances. When there is no transmission instance of the UL data channel, which temporally overlaps with the assumed UL control channel, the UCI may not be multiplexed with the UL data channel in the corresponding data channel occasion.

Alternatively, the UCI may be multiplexed only in the transmission instance that is the earliest in time among transmission instances that overlap in time with the assumed UL control channel.

Alternatively, when there are transmission instances overlapping in time with the assumed UL control channel, the UCI may be multiplexed in the transmission instance that is the earliest in time among the transmission instances constituting the UL data channel occasion. Here, the transmission instance in which the UCI is multiplexed may not overlap in time with the assumed UL control channel. In this method, since the terminal multiplexes the UCI in the first transmission instance transmitted by the terminal, a time for processing the UCI and the UL data may be reduced.

Meanwhile, the UCI may be transmitted several times at different times. For example, the terminal may be instructed to transmit an HARQ-ACK in an UL control channel transmitted in a specific subslot and may be instructed to transmit CSI in an UL control channel transmitted in another subslot. These UL control channels may overlap in time in one UL data channel occasion. In the following, the above-described method may be extended to be applied.

Each UCI may be assumed to be transmitted on the assumed UL control channel, and may be multiplexed in some transmission instances because it may overlap in time with a UL data channel occasion. All of the UCIs may be multiplexed in the earliest transmission instance in time among the transmission instances constituting the UL data channel occasion (i.e., in the first transmission instance constituting the UL data channel occasion). Here, the transmission instance in which the UCI is multiplexed may not overlap in time with the assumed UL control channel.

Alternatively, the UCI may be multiplexed only in transmission instances that overlap in time. That is, all of the UCIs may be multiplexed in the earliest transmission instance in time among transmission instances that overlap in time with the UCI. When the serving base station instructs the terminal to transmit the UL data channel occasion, the serving base station may indicate the total amount of the UCI, so that the terminal can apply it in one transmission instance to encode the transmission instance.

For UCI and a UL control channel that are assumed to be transmitted as separated in time, the UCI may be multiplexed in different transmission instances. That is, transmission instances that overlap in time may be transmitted by multiplexing the respective UCIs. For example, if the assumed UL control channel is assumed to be transmitted in a different subslot, the first transmission instances among the transmission instances corresponding to the respective subslots multiplex the respective UCIs. Since the terminal generates each UCI and multiplexes it in the transmission instance, it requires less processing time than the method of multiplexing the UCI at once. This is because, for some UCIs, a case in which the time of transmission becomes earlier does not occur. This may allow more flexible scheduling for the serving base station.

In another exemplary embodiment, when it is assumed that the UCI is transmitted on the UL control channel, the UCI may be mapped only to a frequency hop of the UL data channel transmission instance that overlaps in time with the assumed UL control channel. When frequency hopping is performed within the transmission instance of the UL data channel, the UCI may be limitedly mapped to either the first frequency hop or the second frequency hop that overlaps in time with the assumed UL control channel. The specific frequency hop of the transmission instance, to which the UCI is mapped, may be determined as the first frequency hop among the first hop and the second hop of the UL data channel transmission instance that overlaps in time with the assumed UL control channel. When frequency hopping is not performed within the transmission instance of the UL data channel, the UCI may be mapped to the transmission instance of the UL data channel. The transmission instance to which the UCI is mapped may be determined as the first transmission instance that overlaps in time with the assumed UL control channel in the data channel occasion.

In order to apply the above-described methods, the number Q' of resource elements occupied by the UCI may be determined by Equation 1 below.

$$Q' = \min\left\{\left\lceil \frac{(O+L) \cdot \beta_{offset}^{PUSCH} \cdot \Sigma_{l=0}^{N_{symb,hop}^{PUSCH}-1} M_{sc}^{UCI}(l)}{\Sigma_{r=0}^{C_{UL-SCH\,hop}-1} K_r} \right\rceil, \left\lceil \alpha \cdot \sum_{l=0}^{N_{symb,hop}^{PUSCH}-1} M_{sc}^{UCI}(l) \right\rceil - Q''\right\}$$ [Equation 1]

Here, $N_{symb,hop}^{PUSCH}$ denotes the number of symbols belonging to the frequency hop to which the UCI is mapped in the UL data channel. $C_{UL-SCH\,hop}$ denotes the number of code blocks belonging to the frequency hop to which the UCI is mapped in the UL data channel.

Meanwhile, the alpha scaling (a) is a variable that the serving base station configures to the terminal through higher layer signaling, and represents the maximum ratio that the coded UCI can occupy when the UCI is mapped to the UL data channel. However, since the serving base station indicates only one a value, one value should be reused in various scenarios of the UL data channel (i.e., eMBB or URLLC). However, the value of α applied to a high capacity scenario (e.g., eMBB) and the value of α applied to a low-latency ultra-reliability scenario (e.g., URLLC) may be different. The reason is that in order for the UL data channel to have higher reliability, the UCI needs to occupy a smaller amount of resource elements and the transport block needs to occupy a larger amount of resource elements.

In an exemplary embodiment, the serving base station may configure two or more values of a to the terminal through higher layer signaling, and indicate one of the configured two or more values of α through dynamic signaling. The serving base station may indicate different UL grants for the high capacity scenario and the low-latency ultra-reliability scenario to the terminal, and the terminal may also distinguish scenarios supported by the UL data channel according to the type of the UL grant. As such, the value of α may be implicitly distinguished, but according to another example, the value of α may be explicitly distinguished. In the field indicating the beta offset ($\beta_{offset}^{PUSCH}$) in the UL grant (i.e., DL control channel), the value of α may be indicated to the terminal in form of an index. For example, the terminal may be indicated as an index of a value of (α, $\beta_{offset}^{PUSCH}$) which is a combination of a value of α and a beta offset ($\beta_{offset}^{PUSCH}$). Alternatively, the value of α may be indicated to the terminal in form of an index by using a field separate from the field indicating the beta offset ($\beta_{offset}^{PUSCH}$) in the UL grant (i.e., DL control channel).

Multiplexing UCI on a Specific Set of Transmission Instances of a Data Channel Occasion In an exemplary embodiment, a set of transmission instances (i.e., UL data channel set) through which UCI is transmitted may be distinguished from a set of transmission instances through which UCI is not transmitted. Here, the set of transmission instances may be a set of transmission instances allocated consecutively in time. Alternatively, the set of transmission instances may be a set of transmission instances that share a DM-RS.

Alternatively, assuming that UCI is transmitted through the UL control channel, for the subslot to which the assumed UL control channel belongs, transmission instance(s) of the UL data channel including the corresponding subslot may be selected. The minimum number of such the transmission instance(s) of the UL data channel may be selected. In this case, the UCI may be multiplexed in the earliest transmission instance or in all transmission instance(s) that overlap in time with the subslot (i.e., the subslot to which the assumed UL control channel belongs).

In another exemplary embodiment, the UCI may be limitedly mapped only to a frequency hop of a set of UL data channels that overlap in time with the assumed UL control channel. A difference from the method described above (i.e., method of multiplexing UCI in a specific transmission instance) is that a time resource to which the UCI is mapped is determined not by a frequency hop unit of the transmission instance but by a frequency hop unit of the UL data channel set. When frequency hopping is performed within the set of UL data channels, the UCI may be limitedly mapped to the first hop or the second hop of the set of UL data channels that overlaps in time with the assumed UL control channel. Alternatively, the specific frequency hop of the UL data channel set to which the UCI is mapped may be determined as the first frequency hop among the first hop or the second of the UL data channel set that overlaps in time with the assumed UL control channel. When frequency hopping is not performed within the set of UL data channels, the UCI may be mapped to the set of UL data channels. The set of UL data channels to which the UCI is mapped may be determined as the first UL data channel set that overlaps in time with the assumed UL control channel.

Segmentation of Transmission Instance at a Slot Boundary

According to the indication of the serving base station, a case where a UL data channel occasion crosses a slot boundary may occur. When a transmission instance of the UL data channel crosses a slot boundary, the terminal may divide the transmission instance into two parts and transmit the same. That is, a part of the transmission instance of the UL data channel may be transmitted in the first slot, and all of the remaining part of the transmission instance of the UL data channel may be transmitted in the second slot.

The symbol(s) to which all of the remaining part of the transmission instance of the UL data channel are mapped in the second slot may follow a format of the second slot. When the format of the second slot is configured with only UL symbols (i.e., semi-static UL), the terminal may map all the remaining part of the transmission instance of the UL data channel from the first symbol of the second slot. However, when the format of the second slot has DL/FL symbols (i.e., semi-static DL, semi-static FL, dynamic DL, dynamic FL), the terminal may map all the remaining part of the transmission instance of the UL data channel not from the first symbol of the second slot but from the FL symbol or UL symbol of the second slot.

When the transmission instance of the UL data channel is divided into two or more parts, the DM-RS may be mapped for each divided transmission instance. Therefore, even when the DL/FL symbol is not arranged at the slot boundary, the DM-RS of the UL data channel may be remapped. That is, the number of symbols to which the transport block is mapped may be reduced in the transmission instance of the UL data channel.

When the divided transmission instance consists of only a few symbols, if the data cannot be mapped after the DM-RS is mapped, or if even the DM-RS cannot be mapped (e.g., when the DM-RS is mapped to two symbols and the divided transmission instance consists of only one symbol), the UL data channel may not be transmitted in the corresponding transmission instance.

In an exemplary embodiment, the UCI may not be mapped to each divided transmission instance of the UL data channel. The terminal may predict that the UCI will not be mapped to any divided transmission instance of the UL data channel. Alternatively, the serving base station may schedule the UL slot (or UL subslot) in which the HARQ-ACK response is transmitted to overlap in time with an undivided transmission instance of the UL data channel.

In another exemplary embodiment, the UCI may also be mapped to the divided transmission instance of the UL data channel. In this case, the number of resource elements that can be occupied by the UCI may be determined from an equation of the technical specification. However, in the divided transmission instance of the UL data channel, since the number of resource elements that can be allocated to the transport block is reduced, the upper limit value (i.e., alpha scaling) may be newly configured. This new upper limit value (alpha scaling) may be indicated to the terminal by higher layer signaling. Therefore, the alpha scaling applied by the terminal may be two or more values, the first value of the alpha scaling may be a value applied when the transmission instance of the UL data channel is not divided, and another value of the alpha scaling (e.g., the second value) may be a value applied when the transmission instance of the UL data channel is divided. In order to reduce the amount of signaling, the serving base station indicates the terminal only one index of the alpha scaling, but the terminal may derive the value of the alpha scaling applied to the divided transmission instance based on this.

In another exemplary embodiment, when the number of symbols of each divided transmission instance of the UL data channel exceeds a predetermined number, the UCI may be mapped to an arbitrary divided transmission instance. On the other hand, when the number of symbols of each divided transmission instance is less than a predetermined number, the UCI may not be mapped to any of the divided transmission instances. When the UL data channel is divided, a part which is composed of a small number of symbols and has only a few symbols allocated to the data may exist among the divided parts. In this case, the terminal may not map the UCI to the divided transmission instance composed of a few symbols.

In yet another exemplary embodiment, in order to transmit the UCI in the divided transmission instance of the UL data channel, the terminal may cancel transmission of the UL data channel and transmit the UCI through a UL control channel. In this case, the terminal may not transmit a part overlapping the UL control channel among the parts of the divided transmission instance of the UL data channel, or may not transmit both parts (i.e., the corresponding transmission instance of the UL data channel).

HARQ-ACK Mapping on PUSCH

① A Case of Receiving a DL Assignment after a UL Grant

A case in which a UL data channel or each transmission instance constituting a UL data channel occasion overlaps with a UL control channel in some symbols, or a UL data channel or a transmission instance of a UL data channel is assumed to be transmitted in a subslot to which a UL data channel belongs is considered.

Figure 28:
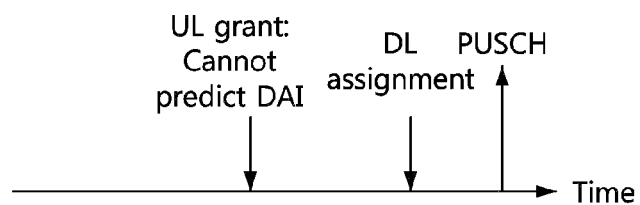
FIG. 28 is a conceptual diagram illustrating UCI mapping when a DL assignment is received after receiving a UL grant.

FIG. 28 is a conceptual diagram illustrating UCI mapping when a DL assignment is received after receiving a UL grant.

In an exemplary embodiment, the terminal may transmit a UL control channel without transmitting a UL data channel or a transmission instance of a UL data channel occasion, which overlaps with a UL control channel in time. Although the serving base station transmits a UL grant and then a DL assignment, the serving base station may assign a UL control channel and a time resource of a UL data channel or a UL data channel occasion to the terminal so that the time resource of the UL data channel or the UL data channel occasion overlap with a time resource of the UL control channel. This situation may occur when the serving base station determines that the DL data channel and the UL control channel by the DL assignment are more important, and the terminal should transmit the UL control channel rather than the UL data channel. Accordingly, according to a proposed method, the terminal may follow the DL control channel (DL assignment) received last in time among UL grants and DL assignments.

In another exemplary embodiment, the terminal may transmit a UL data channel or a transmission instance of a UL data channel occasion that overlaps in time with a UL control channel, and may not transmit the UL control channel. The terminal may receive a DL assignment after receiving a UL grant. The terminal may transmit a UL data channel or a UL data channel occasion according to the UL grant. For the DL data channel received from the DL assignment, an HARQ-ACK may be derived, and this may be overlapped with the UL data channel or the UL data channel occasion in the assumed UL control channel. However, it is preferable that the serving base station does not transmit the UL grant and the DL assignment having such the time relationship to the terminal. The reason is that when the terminal generates the UL data channel and the UL data channel occasion, it should reflect not only the UL grant but also the DL assignment. That is, when such the time relationship is given, the terminal may use only the UL grant to encode the transport block and map it to the UL data channel or the UL data channel occasion without mapping the UCI to the UL data channel or the UL data channel occasion.

On the other hand, since the UCI is transmitted in the UL data channel or the UL data channel occasion, the amount of downlink transmission may increase. In yet another exemplary embodiment, the terminal may transmit a UL data channel in which the transport block and the UCI are multiplexed in a UL data channel or a transmission instance of a UL data channel occasion that overlaps in time with a UL control channel (or, a first transmission instance or all transmission instances of the UL data channel (occasion), that includes a subslot overlapping with the UL control channel in time). Here, the UL data channel or transmission instance, in which the UCI is multiplexed, may include a subslot in which the assumed UL control channel is transmitted. If there are multiple such UL data channels or transmission instances, the UCI may be multiplexed on the first UL data channel or transmission instance. Alternatively, without being limited to the first UL data channel or transmission instance, the UCI may be multiplexed in all the UL data channels or transmission instances. Since the DL assignment is received after receiving the UL grant, the terminal cannot predict what amount of UCI is assumed to map the transport block when mapping the UL data channel.

Therefore, the amount of UCI to be assumed by the terminal may be defined in the technical specification, or the amount of UCI to be assumed by the terminal may be configured by the serving base station through higher layer signaling. Alternatively, the serving base station may configure a list of various amounts of UCI to the terminal through higher layer signaling, and indicate one value belonging to the list in a field belonging to a UL grant. For example, the terminal can transmit only UCI of at most k bits.

Thereafter, puncturing may be applied as a method in which the terminal maps the transport block. When a UCI of k bits or less is generated, the UCI may be mapped to a predetermined position of a resource grid according to a predetermined rule.

In another exemplary embodiment, the terminal may refer to a DAI included in the DL assignment while transmitting the UL data channel. In this case, the terminal may know the number of UCI bits. For example, the DAI included in the DL assignment is represented by K bits, and the terminal may receive the DAI and determine the amount of UCI. Accordingly, the terminal may know the amount of resource elements occupied by the UCI using the offset 3 configured by the serving base station through higher layer signaling. Accordingly, the terminal may adjust the code rate of the transport block (i.e., rate matching), and may multiplex the UCI and the resource block, and map them to the UL data channel in the resource grid.

② a Case of Receiving a UL Grant after a DL Assignment

A case where a UL data channel or each transmission instance of a UL control channel occasion overlaps a UL control channel in some symbols is considered.

Figure 29:
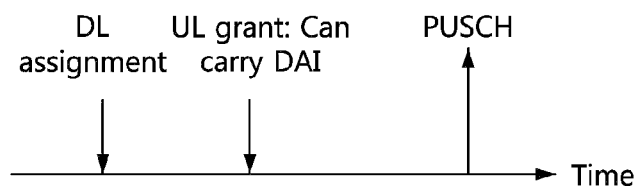
FIG. 29 is a conceptual diagram illustrating UCI mapping when a UL grant is received after receiving a DL assignment.

FIG. 29 is a conceptual diagram illustrating UCI mapping when a UL grant is received after receiving a DL assignment.

Since the serving base station transmits the UL grant with knowledge of the amount of UCI for the DL assignment, the serving base station may include a specific field into the UL grant to inform the terminal of the information about the amount of UCI. The DAI may be included in a specific format of the UL grant and may not be included in other formats of the UL grant. In addition, the UL grant may include a field indicating an offset (RE offset) of the resource elements. The terminal may be configured with a list of the offsets of resource elements through higher layer signaling, and select one offset based on a field indicated by the UL grant. The terminal may calculate the number of resource elements occupied by the UCI using the offset according to an equation defined in the technical specification.

In an exemplary embodiment, the terminal may transmit a UL control channel without transmitting a UL data channel or a transmission instance of a UL data channel occasion, which overlaps in time with the UL control channel (or, transmission instance(s) belonging to a subslot overlapping in time with the UL control channel).

In another exemplary embodiment, the terminal may transmit a UL data channel or a transmission instance of a UL data channel, which overlaps in time with a UL control channel (or, transmission instance(s) belonging to a subslot overlapping in time with the UL control channel), without transmitting the UL control channel.

In yet another exemplary embodiment, the terminal may transmit a UL data channel in which the transport block and the UCI are multiplexed in a UL data channel or a transmission instance of a UL data channel occasion, which overlaps in time with a UL control channel (or, transmission instance(s) belonging to a subslot overlapping in time with the UL control channel). The operation of the terminal will be described by classifying a case where the UL grant includes the DAI and a case where the UL grant does not include the DAI.

When the UL grant includes the DAI (e.g., DCI format 0_1 of the NR specification), since the terminal knows the amount of UCI, the terminal can predict the amount of resource elements occupied by the UCI. Therefore, the code rate of the transport block may be adjusted while encoding the transport block and mapping the encoded transport block to the UL data channel.

When the UL grant does not include the DAI (e.g., DCI format 0_0 of the NR specification), the technical specification may define the amount of UCI that the terminal should assume, the serving base station may determine the amount of UCI by using the DAI included in a DL control channel assigning a DL data channel, or the serving base station may configure the amount of UCI that the terminal should assume through higher layer signaling. For example, the terminal can transmit only UCI of at most 2 bits. Therefore, the terminal may derive the amount of resource elements occupied by the UCI, based on the amount of UCI. Thereafter, rate matching or puncturing may be applied as a method of mapping the transport block. When 1 or 2 bits of UCI are generated, the UCI may be mapped to a predetermined position of the resource grid according to a predetermined rule.

On the other hand, when three or more bits of UCI is generated and code rate adjustment is applied, the transport block may be mapped using only resource elements that are not occupied by the UCI. When the puncturing is applied, the transport block may be mapped to resource elements regardless of the UCI, and then the UCI may be mapped to a predetermine position of resource elements regardless of the transport block.

③ Application of an Offset in UCI Mapping

Figure 30:
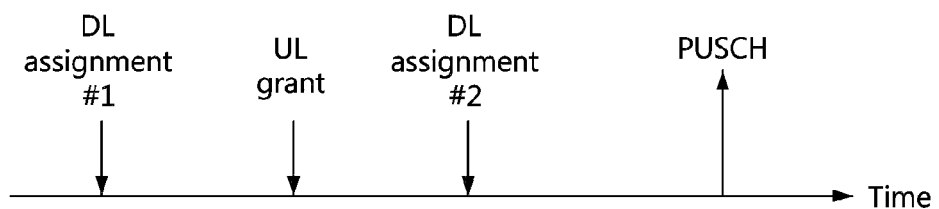
FIG. 30 is a conceptual diagram illustrating UCI mapping when DL assignments exist before and after an UL grant.

FIG. 30 is a conceptual diagram illustrating UCI mapping when DL assignments exist before and after an UL grant.

As shown in FIG. 30, there may be DL assignments before and after a UL grant assigning a UL data channel. In the fields included in the UL grant, an offset β indicating the amount of resource elements that the UCI has and a DAI indicating the number of bits of the UCI may be indicated. Therefore, the serving base station may inform the terminal of the number of bits of the UCI for a DL assignment #1 occurring before the UL grant. Since the terminal knows the number of bits of the UCI and the amount of resource elements occupied by the UCI, the terminal may adjust the code rate of the transport block (i.e., rate matching).

Meanwhile, since the serving base station cannot predict the number of bits of UCI and the amount of resource elements occupied by the UCI for a DL assignment #2 occurring after the UL grant, the serving base station cannot inform the terminal of them. The terminal may predict the number of bits of the UCI by decoding the DAI of the DL assignment #2, and accordingly may adjust the code rate of the transport block (i.e., rate matching).

Figure 31:
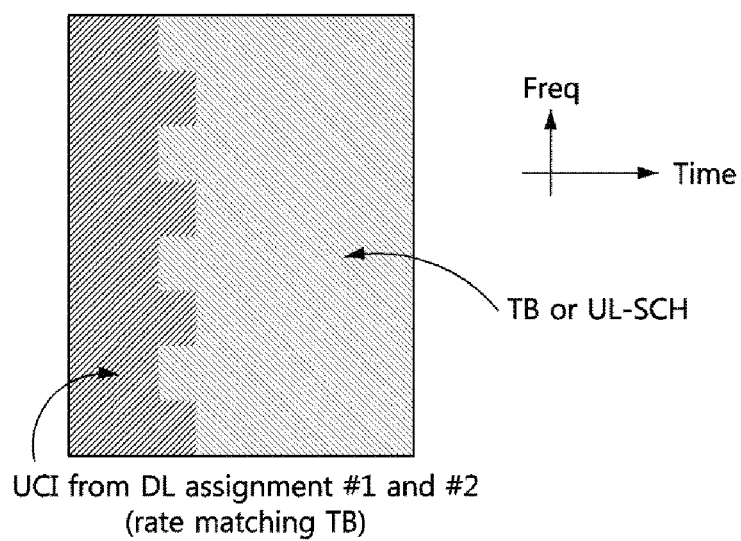
FIG. 31 is a conceptual diagram illustrating UCI mapping in which UCI for DL assignment #1 occurring before a UL grant and UCI for DL assignment #2 occurring after a UL grant are coded together and rate matched to a UL data channel.

FIG. 31 is a conceptual diagram illustrating UCI mapping in which UCI for DL assignment #1 occurring before a UL grant and UCI for DL assignment #2 occurring after a UL grant are coded together and rate matched to a UL data channel.

Figure 32:
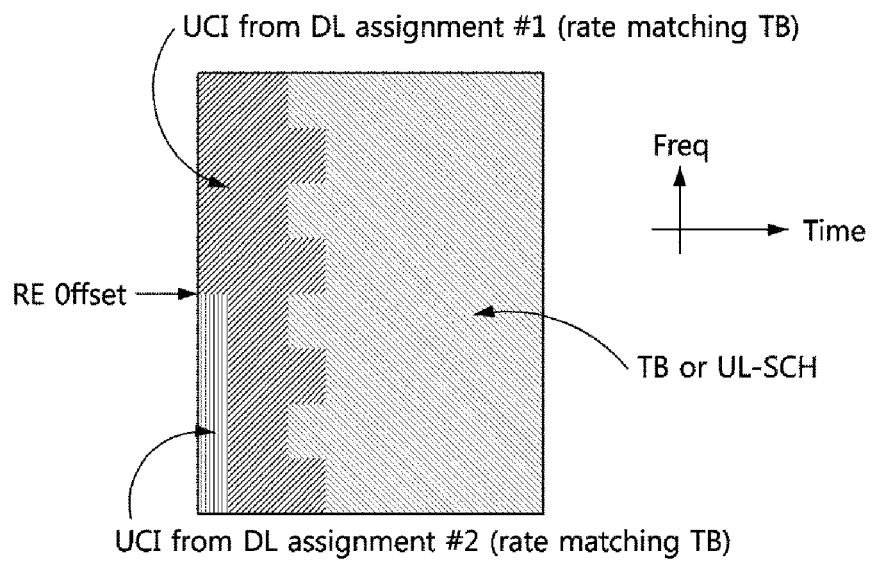
FIG. 32 is a conceptual diagram illustrating an exemplary embodiment in which an RE offset is introduced, only rate matching is considered, and a DM-RS is omitted.
Figure 32:
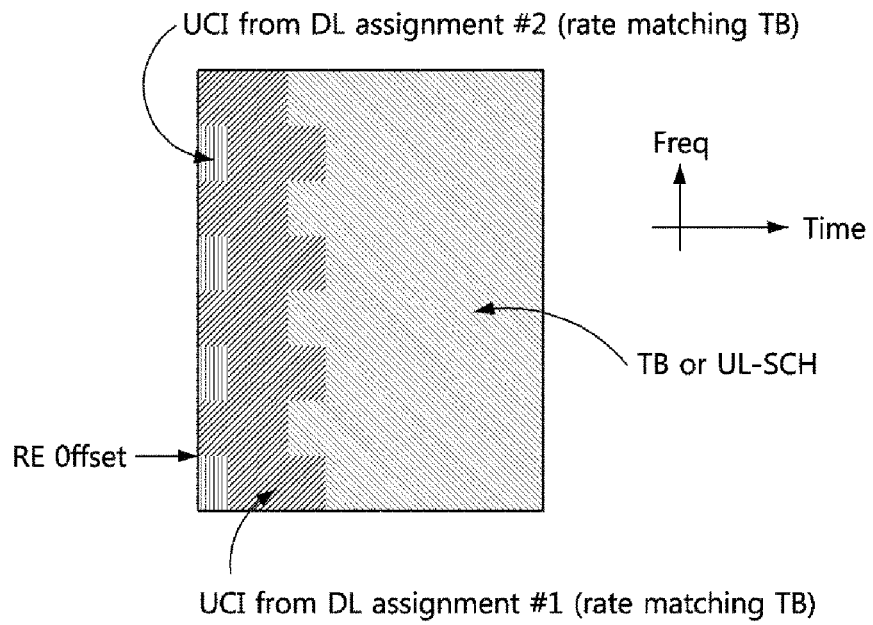

A case (a) of FIG. 32 shows a UCI mapping in which the UCI for the DL assignment #1 occurring before the UL grant and the UCI for the DL assignment #2 occurring after the UL grant are independently encoded, and the UCI for the DL assignment #1 occurring before the UL grant and the UCI for the DL assignment #2 occurring after the UL grant are rate-matched to the resource elements of the UL data channel. A case (b) of FIG. 32 shows a UCI mapping in which the UCI for the DL assignment #1 occurring before the UL grant and the UCI for the DL assignment #2 occurring after the UL grant are independently encoded, and the UCI for the DL assignment #1 occurring before the UL grant and the UCI for the DL assignment #2 occurring after the UL grant are rate-matched to the resource elements of the UL data channel.

The case (a) of FIG. 32 illustrates a case where the UCI for the DL assignment #2 occurring after the UL grant is arranged on successive subcarriers, and the case (b) of FIG. 32 illustrates a case where the UCI for the DL assignment #2 occurring after the UL grant is arranged on equally-spaced subcarriers. The case (b) of FIG. 32 may obtain frequency diversity gain. In the case (a) of FIG. 32, the RE offset may indicate a start position of subcarriers to which the UCI for the DL assignment #2 occurring after the UL grant is mapped among the successive subcarriers. In the case (b) of FIG. 32, the RE offset may indicate a start position from which the UCI for the DL assignment #2 occurring after the UL grant starts to be arranged at an equal interval, or the equal interval.

On the other hand, when the terminal maps the UL data channel with only the UL grant, the number of UCI cannot be predicted and code rate adjustment is not performed for the transport block. In this case, the terminal may change the position of the resource elements from which the mapping of the UCI for the DL assignment #1 received before the UL grant starts by introducing a specific RE offset, so that the UCI for the DL assignment #2 received after the UL grant can puncture the transport block.

Figure 33:
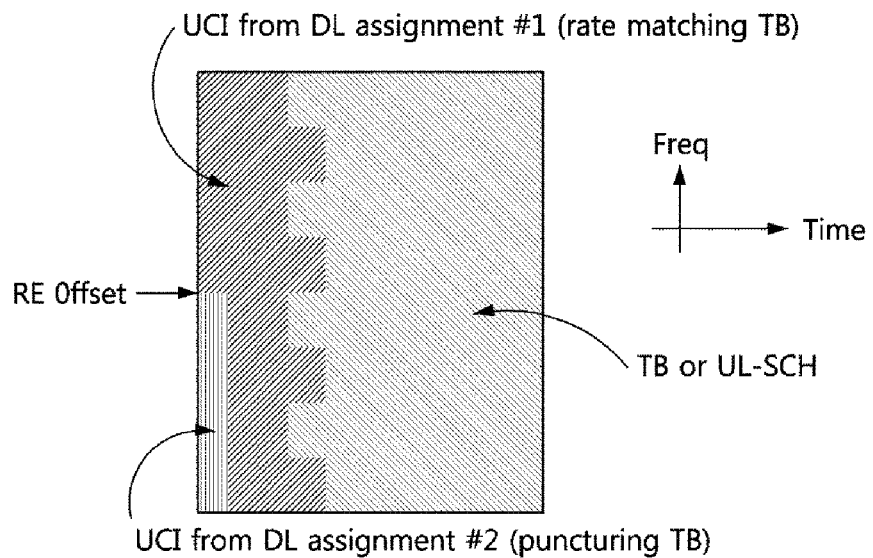
FIG. 33 is a conceptual diagram illustrating an exemplary embodiment in which an RE offset is introduced, both of rate matching and puncturing are considered, and a DM-RS is omitted.
Figure 33:
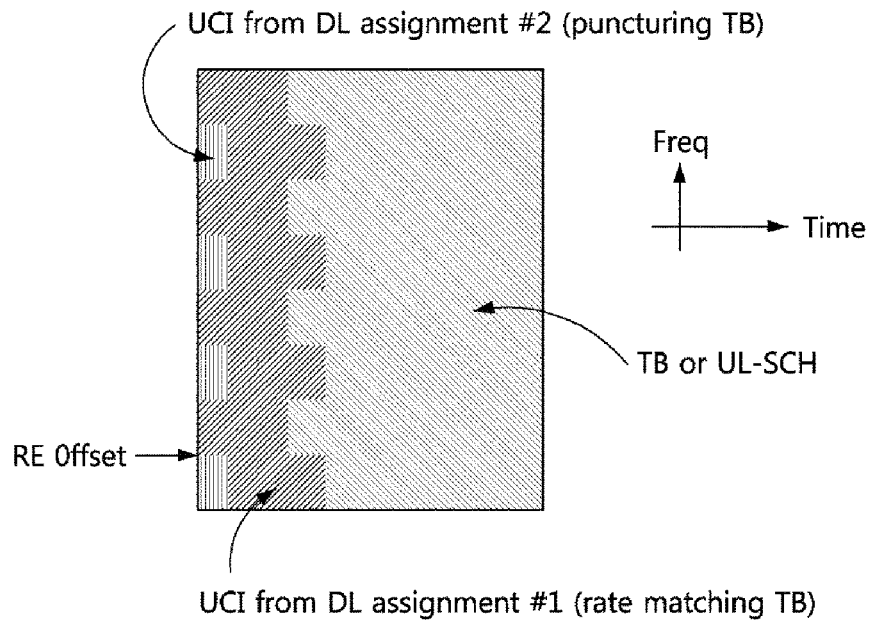

A case (a) of FIG. 33 shows UCI mapping in which the UCI for DL assignment #1 occurring before the UL grant and the UCI for DL assignment #2 occurring after the UL grant are independently encoded, the UCI for the DL assignment #1 occurring before the UL grant is rate-matched to resource elements of the UL data channel, and the UCI for the DL assignment #2 occurring after the UL grant is punctured to resource elements of the UL data channel. A case (b) of FIG. 33 shows UCI mapping in which the UCI for DL assignment #1 occurring before the UL grant and the UCI for DL assignment #2 occurring after the UL grant are independently encoded, the UCI for the DL assignment #1 occurring before the UL grant is punctured to resource elements of the UL data channel, and the UCI for the DL assignment #2 occurring after the UL grant is rate-matched to resource elements of the UL data channel.

The case (a) of FIG. 33 illustrates a case where the UCI for the DL assignment #2 occurring after the UL grant is arranged on successive subcarriers, and the case (b) of FIG. 33 illustrates a case where the UCI for the DL assignment #2 occurring after the UL grant is arranged on equally-spaced subcarriers. The case (b) of FIG. 33 may obtain frequency diversity gain. In the case (a) of FIG. 33, the RE offset may indicate a start position of subcarriers to which the UCI for the DL assignment #2 occurring after the UL grant is mapped among the successive subcarriers. In the case (b) of FIG. 33, the RE offset may indicate a start position from which the UCI for the DL assignment #2 occurring after the UL grant starts to be arranged at an equal interval, or the equal interval.

The mapping shown in FIG. 32 and FIG. 33 is not performed only on resource elements consecutive on the frequency axis. If the UCI cannot be mapped to all subcarriers in a specific symbol, the UCI may occupy only a portion of the subcarriers of the corresponding symbol, and may be arranged at regular intervals. This is advantageous in terms of frequency diversity. In addition, this may be applied to each of the UCI for the DL assignment #1 occurring before the UL grant and the UCI for the DL assignment #2 occurring after the UL grant. For example, when the UCI for the DL assignment #1 received before the UL grant is mapped to resource elements, it may occupy only a portion of subcarriers of the corresponding symbol, and in this case, it may be arranged at regular intervals. Similarly, when the UCI for the DL assignment #2 received after the UL grant is mapped to resource elements, it may occupy only a portion of subcarriers of the corresponding symbol, and in this case, it may be arranged at regular intervals.

④ Prioritization of UCI

When transmitting a UL data channel to support the URLLC service, the UL data channel may not include all types of UCI. When the amount of UCI is large, for example, when the number of HARQ-ACKs is large or the amount of CSI is large, the UCI may occupy many resource elements of the UL data channel. Therefore, the code rate may be increased because the number of resource elements to which a transport block is mapped is reduced.

Since the URLLC service is another name for a quality of traffic defined by a radio bearer or a logical channel group (LCG), the physical layer of the terminal cannot identify whether a specific UL grant is for the URLLC service or for the eMBB service. However, the terminal may perform differential operations according to specific conditions. A method for distinguishing the URLLC traffic from the eMBB traffic by the terminal may consider a case when a UL grant is received using a specific RNTI, a case when a UL grant is received in a specific search space, or a case when a specific field of a UL grant has a specific value. For example, the terminal may decode a DCI scrambled with the MCS-C-RNTI, or may decode a DCI received according to identification information of a search space by using the C-RNTI. In this case, the terminal may perform an operation for supporting the URLLC traffic, but if it is not such a specific condition, the terminal may perform an operation for supporting the eMBB traffic.

The methods to be described later are methods of selecting a portion of UCI when the amount of UCI that the terminal wants to transmit is greater than the maximum amount of UCI that the UL data channel assigned to the terminal can include. The serving base station may configure the maximum amount of UCI to the terminal using higher layer signaling, or the technical specification may directly limit the amount of UCI.

HARQ-ACK Priority Classification

In an exemplary embodiment, when the UCI is configured with only HARQ-ACK, the terminal may map only a portion of the HARQ-ACK to a UL data channel. The terminal may classify a transport block corresponding to the HARQ-ACK (i.e., transport block of a DL data channel) into two types, and the transport block corresponding to the HARQ-ACK may be classified identically to the type of service (or traffic) to which the corresponding DL data channel belongs. For example, in order to distinguish between the eMBB traffic and the URLLC traffic, the terminal may identify the priority of the corresponding HARQ-ACK based on a specific RNTI, an index of a specific search space, or a specific field of a DCI. The terminal may map only HARQ-ACK determined to have a higher priority to the UL data channel. On the other hand, the terminal may not map the HARQ-ACK determined to have a lower priority to the UL data channel.

CSI Priority Classification

According to a method indicated to the terminal, the CSI may be classified into a periodic CSI (P-CSI) transmitted periodically according to higher layer signaling (e.g., RRC message in case of the NR) from the serving base station, an aperiodic CSI (A-CSI) transmitted according to a dynamic indication of the serving base station, or a semi-periodic CSI (SP-CSI) in which a higher layer message (e.g., MAC CE in case of the NR) can be involved. Also, the CSI may be transmitted from the terminal to the base station on a UL data channel or a UL control channel. For convenience of description, the CSI transmitted on the UL data channel is referred to as a trigger CSI (e.g., aperiodic CSI or triggered CSI), and the CSI transmitted on the UL control channel is referred to as the periodic CSI.

According to the conventional technical specification, the trigger CSI has a higher priority than the periodic CSI. This is because a dynamically scheduled UL data channel has a higher priority than a periodically configured UL control channel. In addition, since the UL data channel that can dynamically reflect a traffic situation is given priority over the UL control channel transmitted periodically, it is preferable that the priority of the trigger CSI is higher than the periodic CSI.

The trigger CSI is indicated by the UL grant (i.e., DL control channel), and the priority of the CSI may be determined according to the priority of the UL grant. For example, when two services (e.g., eMBB service and URLLC service) are supported for the terminal, the terminal may map only the CSI determined to have a higher priority to the UL data channel. Therefore, the CSI determined to have a lower priority may not be mapped to the UL data channel.

Priority Classification by Type of UCI

In an exemplary embodiment, when transmitting UCI on a UL data channel, the terminal may map only UCI corresponding to some types to the UL data channel. For example, when the terminal transmits a transport block determined as the URLLC traffic, a case when both CSI and HARQ-ACK occur is considered. The terminal may map the HARQ-ACK to the UL data channel according to the priority and may not map the CSI.

In another exemplary embodiment, when transmitting UCI on a UL data channel, the terminal may map all types of UCI to the UL data channel. However, the terminal may reduce the amount of UCI of some types. For example, when the terminal transmits a transport block determined as the URLLC traffic, a case when both CSI and HARQ-ACK occur is considered. For example, the terminal may map all HARQ-ACKs to the UL data channel, and may not map other types of UCI to the UL data channel. As another example, the terminal may map all HARQ-ACKs to the UL data channel, and map only a portion of the CSI to the UL data channel. The terminal may generate CSI for two or more serving cells. In this case, the terminal may map only the CSI for the high priority serving cell to the UL data channel, and may not map the CSI for the low priority serving cell to the UL data channel. In addition, even when the CSI is generated for one serving cell, the CSI may be divided into two parts. The CSI part 1 and the CSI part 2 differ in priority. Therefore, since the terminal maps only the CSI part 1 to the UL data channel, the UL data channel may include the HARQ-ACK and the CSI part 1.

⑤ Determination of Whether to Multiplex UCI and Transport Block According to a Decision of Terminal In an exemplary embodiment, the terminal may determine whether at least one specific condition is satisfied, and according to the determination result, the terminal may transmit UCI and a transport block together on a UL data channel, or selectively transmit one of the UCI or the transport block on the UL data channel. The specific condition is defined in the technical specification, and in this case, separate signaling for the terminal may be unnecessary. Alternatively, the specific condition may be configured by the base station to the terminal through higher layer signaling.

One example of the at least one condition may be a code rate configured to the terminal through higher layer signaling. The terminal may be configured with a code rate for each type of UCI. The terminal may calculate whether the UCI can satisfy the configured code rate under assumption that the UCI and the transport block are mapped together to the UL data channel. Although the transport block does not satisfy the code rate indicated by DL assignment information (e.g., DCI) received by the terminal, the terminal may transmit the same or different redundancy versions (RVs) of the transport block in a UL data channel occasion, and thus the terminal may determine only the code rate of the UCI as a reference. If the terminal can secure resource elements in a transmission instance (or a set of transmission instances) of a UL data channel so that the UCI can satisfy the configured code rate, the terminal may transmit both the UCI and the transport block in the corresponding transmission instance (or, set of transmission instances) of the UL data channel. On the other hand, if the UCI cannot satisfy the configured code rate, the terminal may transmit a UL control channel to transmit the UCI, and may not transmit the corresponding transmission instance of the UL data channel.

As other examples of the at least one condition, both a code rate configured to the terminal through higher layer signaling and an order that a UL grant and DL assignment information are received may be considered. Although the UCI can secure the amount of resource elements to satisfy the configured code rate, if the DL assignment information is received after receiving the UL grant, the terminal may not multiplex the UCI with the transport block in the transmission instance of the UL data channel. Therefore, in order for the terminal to multiplex the UCI and the transport block, both a condition that the DL assignment information is received before receiving the UL grant and a condition that as many resource elements as possible to satisfy the configured code rate of UCI are secured should be satisfied.

The above-described method may be applied when the terminal considers one type of UCI. However, even for two or more types of UCIs, the above-described method may be applied when all code rates respectively configured for the two or more types of UCIs are satisfied.

Meanwhile, when two or more types of UCIs are considered, the code rate configured for some types of UCIs among the two or more types of UCIs may not be satisfied. The types of UCIs considered are classified according to the priorities of the UCIs, and the same type of UCIs may be classified according to the priorities of traffics. For example, when considering HARQ-ACK and CSI, the priorities of HARQ-ACK and CSI are considered. In addition, in the case of HARQ-ACK, both the priority of traffic and the priority of UCI are applied and classified. The HARQ-ACK is further classified into an HARQ-ACK for a URLLC DL data channel and an HARQ-ACK for an eMBB DL data channel. The CSI is further classified into a URLLC CSI and an eMBB CSI. Among such the UCIs that are considered in detail, for the given amount of resources, there may be some UCIs satisfying the configured code rate, but there may be some UCIs that do not satisfy the configured code rate.

In an exemplary embodiment, the terminal may multiplex only the UCI satisfying the configured code rate with the transport block by mapping only the UCI satisfying the configured code rate to the UL data channel. Such the UCIs may be determined based on the types and priorities of the UCIs. When the UCI is configured with only HARQ-ACKs, since a codebook for the HARQ-ACKs is generated, the terminal may regard them as one type. If the UCIs are configured with HARQ-ACK and CSI report(s), the terminal may classify the UCIs into the HARQ-ACK and each CSI report. The priority of the HARQ-ACK is the highest, and the subsequent priorities may follow the priority of each CSI report. Since such the CSI reports follow the priorities defined in the technical specification, separate signaling from the serving base station may be unnecessary.

In another exemplary embodiment, the terminal may select only UCI of a type corresponding to the highest priority among the types of UCIs, and determine whether to multiplex according to the configured code rate. For example, when the UCI is configured with HARQ-ACKs or when the UCI is configured with HARQ-ACK and CSI report(s), the terminal may select only the HARQ-ACK to determine whether to multiplex according to the code rate. However, when the UCI is configured only with CSI reports, the terminal may select only a part of the CSI reports that satisfy the code rate. The selected CSI reports may be multiplexed with the transport block and mapped to the UL data channel. This is different from the method of mapping only HARQ-ACK to the UL data channel among the above-described methods. The reason is that, when the proposed method is used, the terminal adaptively maps the HARQ-ACK or CSI report to the UL data channel according to a situation.

UCI on a Transmission Instance or a Set of Transmission Instances

If each type of UCI corresponds to the resource of the UL control channel in a one-to-one manner, and a symbol of a resource of the UL control channel overlaps with a UL data channel, the terminal may multiplex the UCI with a transport block and map them to the UL data channel. However, when the number of symbols of the UL data channel is small, multiplexing the UCI with the transport block may deteriorate decoding performance by increasing the code rate of the transport block. Therefore, if the UL data channel consists of a few symbols, it is preferable not to multiplex the UCI with the transport block. Meanwhile, in the case of repeatedly transmitting the UL data channel (i.e., when a UL data channel occasion is transmitted), since two or more UL data channels may be transmitted in succession, a larger number of symbols may be considered. The UL data channel occasion may be configured as one or more sets of UL data channels, and each set of UL data channels may consist of consecutively arranged transmission instances of the UL data channel.

In an exemplary embodiment, in order to map the UCI to the UL data channel, the terminal may map the UCI to the UL data channel in the first transmission instance (and/or subsequent transmission instance) of the UL data channel occasion. The terminal may regard the UL data channel occasion (i.e., all transmission instances) as one virtual UL data channel, and multiplex the UCI. That is, the terminal may use resources (i.e., the number of resource elements) included in all transmission instances of the UL data channel occasion to determine the code rate for the UCI.

However, in this case, a processing time for the terminal to multiplex the UCI may be indicated too early. In addition, the transmission instance of the UL data channel may be earlier than the time resource of the assumed UL control channel.

In another exemplary embodiment, in order to map the UCI to the UL data channel, the terminal may map the UCI to the UL data channel based on the transmission instance of the selected UL data channel. If a UL control channel (i.e., referred to as 'assumed UL control channel' or 'UL control channel corresponding to UCI') through which the serving base station instructs the terminal to transmit the UCI overlaps two or more transmission instances in some symbols, the terminal may map the UCI to the first transmission instance among the transmission instances.

Figure 34:
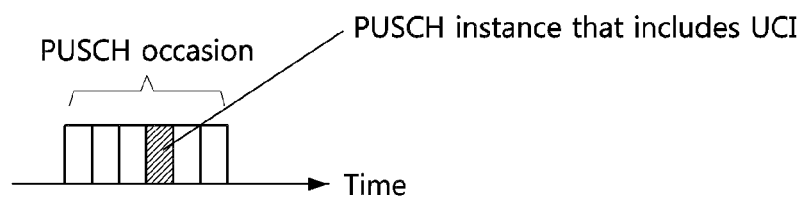
FIG. 34 is a conceptual diagram illustrating an exemplary embodiment in which UCI is mapped to a first transmission instance that overlaps with a PUCCH corresponding to UCI.

FIG. 34 is a conceptual diagram illustrating an exemplary embodiment in which UCI is mapped to a first transmission instance that overlaps with a PUCCH corresponding to UCI.

Referring to FIG. 34, the time resource of the UL control channel through which the serving base station instructs the terminal to transmit the UCI overlaps some or all of the fourth transmission instance of the UL data channel. Therefore, the terminal may map the UCI to the corresponding transmission instance.

Figure 35:
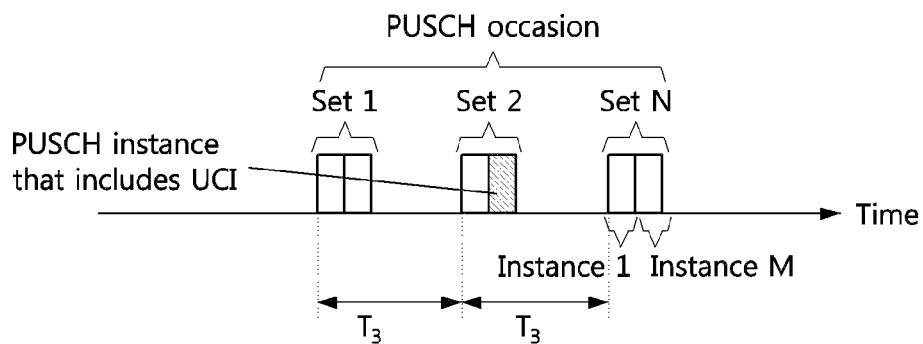
FIG. 35 is a conceptual diagram illustrating another exemplary embodiment in which UCI is mapped to a first transmission instance that overlaps with a PUCCH corresponding to UCI.

FIG. 35 is a conceptual diagram illustrating another exemplary embodiment in which UCI is mapped to a first transmission instance that overlaps with a PUCCH corresponding to UCI.

FIG. 35 shows a case where the third periodicity $T_3$ is applied. The time resource of the UL control channel through which the serving base station instructs the terminal to transmit the UCI overlaps with the second transmission instance of the second set of UL data channels of the UL data channel occasion. Accordingly, the terminal may map the UCI to the corresponding transmission instance.

In another exemplary embodiment, the terminal may map UCI only to a frequency hop of a transmission instance that overlaps in time with the UL control channel corresponding to the UCI. When frequency hopping is performed within the transmission instance of the UL data channel, the terminal may map the UCI to only the first hop or the second hop of the transmission instance. The frequency hop to which the terminal maps the UCI may correspond to a frequency hop of a transmission instance having a first symbol overlapping the UL control channel corresponding to the UCI.

If some transmission instances of a UL data channel share DM-RS while transmitting a UL data channel occasion, the error rate of UCI may increase since the UCI cannot be mapped to resource elements close to the DM-RS. In addition, since the UCI is mapped to only one transmission instance, the error rate of transport block may increase in the corresponding transmission instance. However, other transmission instances of the UL data channel may maintain the error rate of the transport block. On the other hand, the transmission instances of the UL data channel occasion may not share the DM-RS. In this case, the error rate of the corresponding UL data channel may not increase. However, when the transmission instance is composed of only a few symbols, even if the UCI is not multiplexed with the transport block, a situation in which resource elements are insufficient by the UCI alone may occur. In this case, a method of multiplexing the UCI to a UL data channel set may be considered by configuring two or more transmission instances of the UL data channel into a set (i.e., the UL data channel set).

In another exemplary embodiment, in order to map the UCI to the UL data channel, the terminal may multiplex the UCI based on the UL data channel set and map it to the UL data channel. Here, the data channel set may mean a unit in which the belonging transmission instances share the DM-RS. If the belonging transmission instances do not share the DM-RS, the data channel set may mean a unit in which the UCI is multiplexed. A time for multiplexing the UCI to specific transmission instance(s) may depend on a configuration of subslot and signaling indicated by the serving base station to the terminal.

In another exemplary embodiment, the transmission instance to which the UCI is mapped may be limited to the transmission instance located first in the UL data channel set. When the UL control channel corresponding to the UCI and the UL data channel set overlap in some symbols, the terminal may map the UCI to the first transmission instance of the corresponding UL data channel set. If the amount of UCI is large, the corresponding UL data channel lacks resource elements to map the transport block, thereby increasing the error rate of the transport block.

Figure 36:
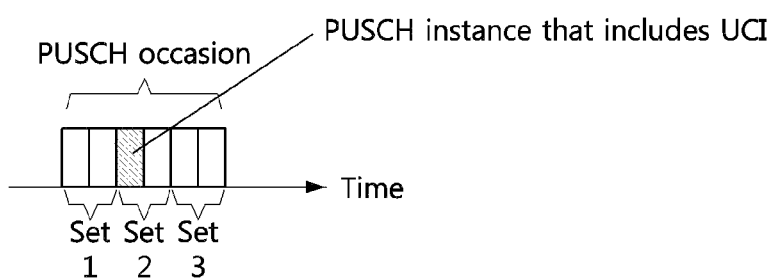
FIG. 36 is a conceptual diagram illustrating an exemplary embodiment in which UCI is mapped to a first UL data channel set that overlaps with a PUCCH corresponding to the UCI.

FIG. 36 is a conceptual diagram illustrating an exemplary embodiment in which UCI is mapped to a first UL data channel set that overlaps with a PUCCH corresponding to the UCI.

Referring to FIG. 36, a UL data channel set may consist of two transmission instances. A time resource of a UL control channel in which the serving base station instructs the terminal to transmit UCI may overlap some or all of the first or second transmission instances belonging to the second UL data channel set of the UL data channel occasion. Accordingly, the terminal may map the UCI to the first transmission instance belonging to the second UL data channel set.

Figure 37:
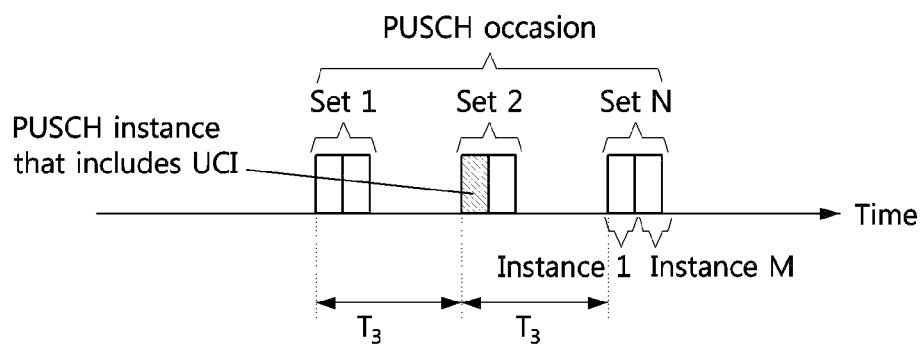
FIG. 37 is a conceptual diagram illustrating another exemplary embodiment in which UCI is mapped to a first UL data channel set that overlaps with a PUCCH corresponding to the UCI.

FIG. 37 is a conceptual diagram illustrating another exemplary embodiment in which UCI is mapped to a first UL data channel set that overlaps with a PUCCH corresponding to the UCI.

FIG. 37 illustrates a case where the third periodicity $T_3$ is applied. A time resource of a UL control channel in which the serving base station instructs the terminal to transmit UCI may overlap some or all of the first or second transmission instance of the second UL data channel set. Accordingly, the terminal may map the UCI to the first transmission instance belonging to the second UL data channel set.

In another exemplary embodiment, the terminal may map the UCI only to a frequency hop of transmission instance that overlaps in time with the UL control channel corresponding to the UCI. A specific transmission instance is determined in the UL data channel set, and the frequency hop to which the terminal maps the UCI may correspond to a frequency hop of the transmission instance having a first symbol overlapping the UL control channel corresponding to the UCI.

In another exemplary embodiment, the terminal may perform UCI multiplexing on a UL data channel set without performing the UCI multiplexing on a transmission instance. When the UL control channel corresponding to the UCI and the UL data channel set overlap in some symbols, the terminal may map the UCI to the corresponding UL data channel set.

Figure 38:
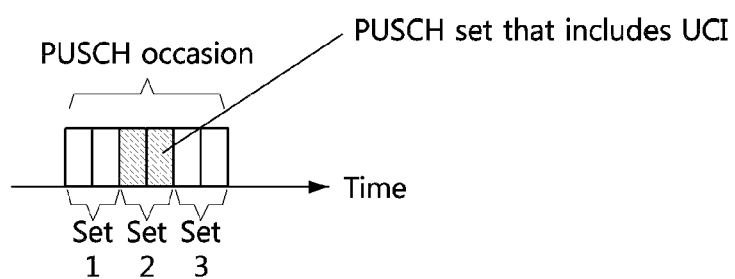
FIG. 38 is a conceptual diagram illustrating an exemplary embodiment in which UCI is mapped to a UL data channel set.

FIG. 38 is a conceptual diagram illustrating an exemplary embodiment in which UCI is mapped to a UL data channel set.

Referring to FIG. 38, a time resource of a UL control channel in which the serving base station instructs the terminal to transmit UCI may overlap all or part of a first or second transmission instance belonging to a second UL data channel set. Accordingly, the terminal may map the UCI to the second UL data channel set. The terminal may map the UCI to the first transmission instance and the second transmission instance belonging to the second UL data channel set. If the amount of UCI is small, the UCI may be mapped only to the first transmission instance, but if the amount of UCI is large, the UCI may be mapped also to the second transmission instance or a subsequent transmission instance of the UL data channel.

Figure 39:
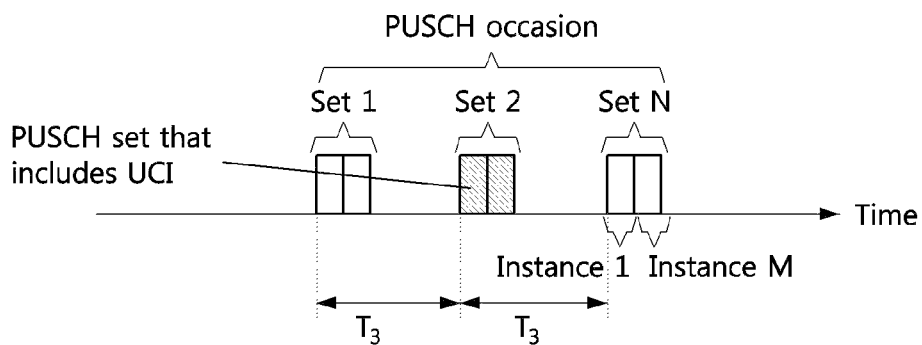
FIG. 39 is a conceptual diagram illustrating an exemplary embodiment in which UCI is mapped to a UL data channel set.

FIG. 39 is a conceptual diagram illustrating an exemplary embodiment in which UCI is mapped to a UL data channel set.

FIG. 39 illustrates a case where the third periodicity $T_3$ is applied. A time resource of a UL control channel in which the serving base station instructs the terminal to transmit UCI may overlap all or part of a first or second transmission instance of a second UL data channel set. Accordingly, the terminal may map the UCI to the second UL data channel set. The terminal may map the UCI to the first transmission instance and the second transmission instance belonging to the second UL data channel set. If the amount of UCI is small, the UCI may be mapped only to the first transmission instance, but if the amount of UCI is large, the UCI may be mapped also to the second transmission instance or a subsequent transmission instance of the UL data channel.

In another exemplary embodiment, the terminal may map the UCI to only a frequency hop of a UL data channel set that overlaps the UL control channel corresponding to the UCI in time. The UL data channel set to which the UCI is mapped is determined, but the frequency hop to which the terminal maps the UCI may correspond to a frequency hop of a UL data channel set having a first symbol overlapping the UL control channel corresponding to the UCI.

Meanwhile, the terminal may be configured with a UL subslot from the serving base station through higher layer signaling. The terminal may identify FL symbols or UL symbols of a slot as the UL subslot. A timing of transmitting a UL control channel as an HARQ response for a DL data channel assigned by a DL control channel may be indicated in units of UL subslots. In this case, based on the subslot, the transmission instances of the UL data channel, each of which has a first symbol in the same subslot, may constitute the same set. The transmission instances of the UL data channel, which belong to one set, may have respective DM-RS resources. In such the case, UCI may be multiplexed in the transmission instance.

In an exemplary embodiment, even when the transmission instance and the UL control channel corresponding to the UCI do not overlap each other in time, a procedure for multiplexing the UL data channel and the UL control channel or determining priorities thereof may be performed when they belong to the same UL subslot.

Therefore, the equation of the technical specification for deriving the number of resource elements occupied by the UCI needs some modification. When deriving the number of resource elements to which the UCI is mapped, unlike the conventional rule using the number of symbols belonging to the UL data channel, an equation to apply the proposed method is as shown in Equations 2 and 3 below.

In an exemplary embodiment, the number (Q') of resource elements to which the UCI is mapped may be derived from the number ($N_{symb,all}^{PUSCH\ set}$) of all symbols belonging to the UL data channel set. In addition, the maximum value for the number of resource elements to which the UCI is mapped may also be derived from the number of all symbols belonging to the UL data channel set. In addition, the number of code blocks obtaining the resource elements to which the UCI is mapped may be determined as the number ($C_{UL-SCH}$) of code blocks belonging to the UL data channel set.

$$Q' = \min\left\{\left\lceil\frac{(O+L)\cdot \beta_{offset}^{PUSCH}\cdot \sum_{l=0}^{N_{symb,all}^{PUSCH\ set}-1} M_{sc}^{UCI}(l)}{\sum_{r=0}^{C_{UL-SCH}-1} K_r}\right\rceil,\right.$$
$$\left.\left\lceil\alpha\cdot \sum_{l=0}^{N_{symb,all}^{PUSCH\ set}-1} M_{sc}^{UCI}(l)\right\rceil - Q''\right\} \quad \text{[Equation 2]}$$

In another exemplary embodiment, the number (Q') of resource elements to which the UCI is mapped may be derived from the number ($N_{symb,hop}^{PUSCH\ set}$) of all symbols belonging to the frequency hops of the UL data channel set. In addition, the maximum value for the number of resource elements to which UCI is mapped may also be derived from the number of all symbols belonging to the UL data channel set. In addition, the number of code blocks obtaining the resource elements to which UCI is mapped may be determined as the number ($C_{UL-SCH\ set\ hop}$) of code blocks belonging to the UL data channel set.

$$Q' = \min\left\{\left\lceil\frac{(O+L)\cdot \beta_{offset}^{PUSCH}\cdot \sum_{l=0}^{N_{symb,hop}^{PUSCH\ set}-1} M_{sc}^{UCI}(l)}{\sum_{r=0}^{C_{UL-SCH\ set\ hop}-1} K_r}\right\rceil,\right.$$
$$\left.\left\lceil\alpha\cdot \sum_{l=0}^{N_{symb,hop}^{PUSCH\ set}-1} M_{sc}^{UCI}(l)\right\rceil - Q''\right\} \quad \text{[Equation 3]}$$

In another exemplary embodiment, all remaining transmission instances from the first transmission instance that overlaps with the UL control channel corresponding to the UCI in time may be included in the number of resource elements.

In yet another exemplary embodiment, for a first subslot to which the UL control channel corresponding to the UCI belongs, a first transmission instance completely belonging to the corresponding subslot and the remaining transmission instances completely belonging to or overlapping in time with the corresponding subslot may be included in the number of resource elements.

Pairwise Priorities for UL Transmissions

The terminal may transmit UCI and a UL-SCH on a UL control channel or a UL data channel, and discriminate priorities of the UL transmissions according to the type of service (or, an RNTI, a search space, or a value of a specific field of DCI). In some cases, the terminal may not perform a UL transmission having a low priority. Here, the UCI may mean SR, HARQ-ACK, or CSI. For convenience of description, the priority of UCI is discriminated according to two services called URLLC and eMBB, but is not necessarily limited thereto.

The priority of HARQ-ACK may be determined by an RNTI of a DL control channel assigning a DL data channel corresponding to the HARQ-ACK. For example, in case of the NR system, the RNTI may be C-RNTI, MCS-C-RNTI, CS-RNTI, or MCS-CS-RNTI. In addition, the priority of HARQ-ACK may be determined by a search space to which a DL control channel assigning a DL data channel corresponding to the HARQ-ACK is mapped. The serving base station may indicate to the terminal what priority the search space has by higher layer signaling. In addition, a value of a specific field of a DL control channel assigning a DL data channel corresponding to the HARQ-ACK may indicate the priority of the HARQ-ACK. The priority of SR may be given as an index of a logical channel group (LCG) corresponding to the SR when the SR is configured by higher layer signaling.

Meanwhile, processing capability of the terminal or information related thereto should be reported to the serving base station through higher layer signaling. Depending on the processing capability of the terminal, a processing time required for multiplexing a certain UCI (or UL-SCH) and another UCI (or UL-SCH) may be determined. For example, such processing time may be expressed by the number of symbols for a predetermined subcarrier spacing. When the terminal cannot be allocated an appropriate processing time, the terminal may select either one UCI (or UL-SCH) or several UCIs. In particular, the terminal may select one UL transmission based on the priority according to the service (eMBB service or URLLC service) and the priority according to the type of UCI.

UCIs having different priorities may be multiplexed in one UL channel. For example, eMBB HARQ-ACK bits and URLLC HARQ-ACK bits may be multiplexed in one UL control channel. Alternatively, URLLC aperiodic CSI and eMBB HARQ-ACK may be multiplexed in one UL data channel. According to the conventional method, the serving base station may indicate sets composed of UL control channel resources (i.e., PUCCH resources) to the terminal through higher layer signaling. The terminal may select one set according to the number of UCI bits. One set may consist of several control channel resources. The serving base station may indicate to the terminal one PUCCH resource by using a specific field of the DL control channel (and/or the smallest index among indexes of control channel elements (CCEs) to which the DL control channel is mapped). In addition, the same code rate is applied to all UCIs in one UL control channel, and the code rate is indicated to the terminal through higher layer signaling. In this case, for UCIs having different priorities, different code rates may be applied and the UCIs may be mapped to one UL control channel. Therefore, the set of PUCCH resources, which is determined according to the amount of UCI in the conventional method, may not be applied as it is.

In an exemplary embodiment, the different code rates may be converted to the amount of UCI as a reference. Assuming a code rate #1 applied to UCI1 and a code rate #2 applied to UCI2 (e.g., code rate #1<code rate #2), the converted amount of UCI may be given as (UCI1+UCI2*(code rate #2/code rate #1)). For example, it is assumed that eMBB HARQ-ACK is given with N1 bits and has a code rate of R1, URLLC HARQ-ACK is given with N2 bits and has a code rate of R2, and they are multiplexed with each other. Applying the proposed method to calculate the converted amount (N) of UCI applied by the terminal to determine the set of PUCCH resources, a value of N may be given as (N1+N2*(R1/R2)) bits. The set to which the resources of the UL control channel belong may be determined according to which range the value of N belongs to among ranges defined by higher layer signaling or the technical specification. Thereafter, when determining one PUCCH resource, the terminal may derive the PUCCH resource from at least a field (e.g., PUCCH resource indicator (PRI)) included in the DL control channel. The terminal may apply different code rates to different UCIs.

In yet another exemplary embodiment, the terminal may first map a UCI having a lower code rate, and then, the terminal may map a UCI having a higher code rate only to the remaining resource elements by performing rate matching.

Hereinafter, priorities may be determined considering both the type of UCI and the type of traffic. For convenience of description, priorities according to the URLLC service and the eMBB service will be described. The eMBB UCI may include HARQ-ACK for an eMBB DL data channel, CSI triggered by an eMBB DL control channel, CSI periodically transmitted, and eMBB SR. The URLLC UCI may include HARQ-ACK ACK for a URLLC DL data channel, CSI triggered by an eMBB DL control channel, and eMBB SR. Alternatively, the CSI may be classified as the eMBB UCI.

a) URLLC SR and URLLC HARQ-ACK

When the respective UL control channels corresponding to the URLLC SR and the URLLC HARQ-ACK overlap each other in time, the terminal may multiplex the URLLC SR and the URLLC HARQ-ACK or select only the URLLC HARQ-ACK to transmit on one UL control channel. The URLLC SR may correspond to one format of a UL control channel, and the URLLC HARQ-ACK may correspond to the same format or another format of a UL control channel. In the NR system, the URLLC SR and the URLLC HARQ-ACK may be transmitted on a UL control channel of the same format.

The URLLC SR may correspond to a format 0 and the URLLC HARQ-ACK may correspond to the format 0. The terminal may discriminate between when the URLLC SR occurs and when the URLLC SR does not occur, and adjust a cyclic shift of a sequence representing the URLLC HARQ-ACK according to the URLLC SR in a resource of a UL control channel on which the URLLC HARQ-ACK is transmitted. The URLLC SR and the URLLC HARQ-ACK may be transmitted on the UL control channel corresponding to the URLLC HARQ-ACK.

The URLLC SR may correspond to a format 1 and the URLLC HARQ-ACK may correspond to the format 1. When the URLLC SR occurs, the terminal may map the URLLC HARQ-ACK as a BPSK/QPSK symbol to a payload in a UL control channel corresponding to the URLLC SR. When the URLLC SR does not occur, the terminal may map the URLLC HARQ-ACK as a BPSK/QPSK symbol to the payload in a UL control channel corresponding to the URLLC HARQ-ACK.

In the NR system, the URLLC SR and the URLLC HARQ-ACK may be transmitted on UL control channels of different formats.

When the URLLC SR corresponds to the format 0 and the URLLC HARQ-ACK corresponds to the format 1, the terminal may transmit only the URLLC HARQ-ACK by using the format 1 (i.e., a UL control channel corresponding to the HARQ-ACK) regardless of the URLLC SR.

When the URLLC SR corresponds to the format 1 and the URLLC HARQ-ACK corresponds to the format 0, the terminal may transmit only the URLLC HARQ-ACK by using the format 0 regardless of the URLLC SR.

When the URLLC SR corresponds to the format 0 or 1 and the URLLC HARQ-ACK corresponds to a format 2, 3, or 4, the terminal may encode the URLLC SR(s) and the URLLC HARQ-ACK as a payload by concatenating the URLLC SR(s) and the URLLC HARQ-ACK, and transmit it on a UL control channel corresponding to the URLLC HARQ-ACK.

b) URLLC SR and CSI

① Selection Scheme According to Priorities

In an exemplary embodiment, depending on the priorities of the URLLC SR and the CSI, the URLLC SR may be transmitted and the CSI may not be transmitted. This is because the URLLC SR is for the terminal to urgently request UL resources to the serving base station, and the CSI is additional information necessary for adaptive scheduling for DL transmission. Therefore, in terms of importance, the URLLC SR may be selected, and the terminal may transmit the URLLC SR on a UL control channel corresponding to the URLLC SR.

② Multiplexing Scheme According to Priorities

In an exemplary embodiment, the URLLC SR and the CSI may be multiplexed, or only the URLLC SR may be transmitted.

The CSI may be classified into a trigger CSI and a periodic CSI according to a scheme of reporting to the serving base station. Since the trigger CSI is indicated to the terminal by a UL grant, the URLLC CSI or the eMBB CSI may be discriminated by the type of the UL grant. When the URLLC CSI is mapped to a UL data channel, a code rate is low enough so that the serving base station can obtain a very low error rate (e.g., $10^{-5 \sim -6}$). On the other hand, when the eMBB CSI is mapped to a UL data channel, a code rate is not low enough so that the serving base station can obtain a moderate error rate (e.g., $10^{-1 \sim -2}$).

When the URLLC CSI is the trigger CSI, the serving base station may request a CSI report to the terminal using a specific field of the UL grant. When a field indicating presence or absence of a transport block in the UL grant indicates to the terminal that there is no transport block, the URLLC CSI and the URLLC SR may multiplexed and mapped to a UL data channel. Channel code rates applied to the URLLC SR and the URLLC CSI may be identified by an index (i.e., beta offset) indicated by a specific field of the UL grant. The index may indicate a beta offset applied to the URLLC SR and a beta offset applied to the URLLC CSI. On the other hand, when the field indicating presence or absence of a transport block in the UL grant indicates to the terminal that there is a transport block, the URLLC CSI and a URLLC UL-SCH (i.e., transport block) may be multiplexed, and the URLLC SR may not be transmitted. This is because the URLLC SR is unnecessary because a buffer status of the terminal can be reported through the URLLC UL-SCH.

When the eMBB CSI is the trigger CSI, the serving base station may request a CSI report to the terminal using a specific field of the UL grant. When the field indicating presence or absence of a transport block in the UL grant indicates to the terminal that there is no transport block, the eMBB CSI and the URLLC SR may be multiplexed and mapped to a UL data channel, or only the URLLC SR may be transmitted on a UL control channel. When transmitted on the UL control channel, the terminal may transmit only the URLLC SR and may not transmit the eMBB CSI on a UL control channel corresponding to the URLLC SR. In an exemplary embodiment, the terminal may multiplex the URLLC CSI and the URLLC SR, and transmit them on a UL data channel. However, when the eMBB CSI and the URLLC SR correspond to overlapping resources, only the URLLC SR may be transmitted on the UL control channel. On the other hand, when the field indicating presence or absence of a transport block in the UL grant indicates to the terminal that there is a transport block, although the eMBB CSI and the eMBB UL-SCH (i.e., transport block) are instructed to be multiplexed, the terminal may not transmit them. In this case, even if a buffer status of the terminal is reported through the UL data channel, an error rate experienced by the serving base station is not suitable for the URLLC. Accordingly, the terminal may transmit the URLLC SR and may not transmit the eMBB CSI and the eMBB UL-SCH. The terminal may transmit the URLLC SR using a UL control channel corresponding to the URLLC SR.

When multiplexed in the UL data channel, the terminal may use resources indicated by the UL grant to map the URLLC SR and the eMBB CSI. When the field indicating present or absence of a transport block in the UL grant indicates to the terminal that there is no transport block, the UL data channel may be configured with only encoded UCI. Channel code rates applied to the URLLC SR and the eMBB CSI may be identified from an index (i.e., beta offset) indicated by a specific filed of the UL grant or a vale configured by higher layer signaling. The index may indicate a beta offset applied to the URLLC SR and a beta offset applied to the eMBB CSI.

When the CSI is the periodic CSI, a UL control channel for the URLLC SR and a UL control channel for the periodic CSI may periodically overlap. This situation may occur with a periodicity of the least common multiple of a periodicity of the UL control channel for the URLLC SR and a periodicity of the UL control channel for the periodic CSI. Therefore, the serving base station may configure the terminal through higher layer signaling so that UL control channels do not overlap each other. Alternatively, when the UL control channels overlap each other, the terminal may transmit only the URLLC SR on the corresponding UL control channel without transmitting the CSI.

Alternatively, the serving base station may configure a separate UL control channel applied only to a time resource where the UL control channels overlap each other to the terminal through higher layer signaling. In the time resource where they do not overlap with each other, the URLLC SR and the periodic CSI may be transmitted periodically on the respective associated UL control channels. According to this method, since a time when the URLLC SR and the CSI are multiplexed and a time when they are not multiplexed are known to the terminal and the serving base station, a UL control channel in which the URLLC SR and the CSI are multiplexed may be used at the time when they are multiplexed. The URLLC SR and the CSI may be concatenated and encoded with the same code rate. This is simple in implementation of the terminal, but since the error rates required by the serving base station for the URLLC SR and the CSI are different, the URLLC SR and the CSI may be encoded with different code rates. In this case, it means that the encoded URLLC SR is mapped to some resource elements constituting the UL control channel and the encoded CSI is mapped to the remaining resource elements. The code rates applied to the URLLC SR and the CSI may be indicated to the terminal through higher layer signaling from the serving base station.

c) URLLC SR and URLLC PUSCH

A UL grant for a URLLC UL data channel may be received on a DL control channel. Alternatively, the UL grant for the URLLC UL data channel may be configured, activated, or deactivated using higher layer signaling (and UL grant). Since a buffer status of the terminal may be represented by a URLLC UL-SCH when the URLLC UL-SCH is mapped to the URLLC UL data channel, it is not necessary to transmit the URLLC SR. On the other hand, when the URLLC UL-SCH is not mapped to the URLLC UL data channel (i.e., when the UL grant indicates that there is no transport block (i.e., URLLC UL-SCH)), the URLLC SR should be transmitted on the UL data channel. In this case, since the UL grant triggers the URLLC CSI, the terminal may multiplex the URLLC SR and the URLLC CSI to map them to the UL data channel. Different code rates may be applied to the URLLC SR and the URLLC CSI, and these code rates may be obtained from a value of a specific index (i.e., beta offset) included in the UL grant or configured through higher layer signaling. The index may indicate a beta offset applied to the URLLC SR and a beta offset applied to the eMBB CSI.

d) eMBB SR and URLLC SR

The URLLC SR may be transmitted on a UL control channel. When the higher layer of the terminal can process a request for transmitting UL data, the higher layer of the terminal may select only the highest priority SR (i.e., URLLC SR), and transmit only a UL control channel corresponding to the corresponding SR.

However, in some cases, it may be necessary to transmit the URLLC SR while transmitting the eMBB SR on the UL control channel. Although the terminal is instructed by the higher layer of the terminal to transmit the eMBB SR, the terminal may not perform or stop transmission of the UL control channel corresponding to the eMBB SR in order to transmit the URLLC SR having a higher priority, and transmit the UL control channel corresponding o the URLLC SR instead of the eMBB SR.

After transmitting the SR, a counter (e.g., SR-prohibit timer according to the NR technical specification) may be operated by the higher layer of the terminal, and thus a new SR may not be transmitted until the counter expires. This may be applied to SRs corresponding to the same priority or lower priority, and the SR corresponding to the higher priority may be transmitted even when the counter does not expire.

e) eMBB HARQ-ACK and URLLC SR

An eMBB DL data channel may be assigned by a DL control channel or activated by higher layer signaling (and DL control channel). An HARQ-ACK for the eMBB DL data channel may be referred to as an eMBB grant-based (GB) HARQ-ACK or an eMBB grant-free (GF) HARQ-ACK.

① Selection Scheme According to Priorities

Since the priority of the URLLC service is higher than that of the eMBB service, the terminal may select only the URLLC SR. Accordingly, the terminal may transmit the URLLC SR and may not transmit the eMBB HARQ-ACK on a UL control channel corresponding to the URLLC SR. It is preferable that the serving base station instructs the terminal to retransmit a DL data channel that has not been transmitted due to the URLLC SR even though it was assigned by a DL control channel.

② Multiplexing Scheme According to Priorities

In order to multiplex the eMBB HARQ-ACK and the URLLC SR, a case when only the eMBB GF HARQ-ACK exists (that is, there is no eMBB GB HARQ-ACK) and a case when the eMBB GB HARQ-ACK exists (that is, a case when both the eMBB GF HARQ-ACK and the eMBB GB HARQ-ACK exist or a case when only the eMBB GB HARQ-ACK exists) may be distinguished.

First, when only the eMBB GF HARQ-ACK exists, the eMBB HARQ-ACK and the URLLC SR may be multiplexed and transmitted on a UL control channel corresponding to the URLLC SR or a UL control channel corresponding to the eMBB HARQ-ACK.

In an exemplary embodiment, the terminal may adjust a cyclic shift of a sequence representing the eMBB GF HARQ-ACK according to the URLLC SR in a resource of the UL control channel through which the eMBB GF HARQ-ACK is transmitted, by distinguishing a case when the URLLC SR occurs from a case when the URLLC SR does not occur. When the eMBB GF HARQ-ACK is represented by 1 bit, information on whether the URLCC SR occurs or not may be represented by the cyclic shift of the sequence. In this case, an error rate of the eMBB GF HARQ-ACK obtained at the serving base station is the same as that of the URLLC SR.

In another exemplary embodiment, since the UL control channel corresponding to the eMBB GF HARQ-ACK and the UL control channel corresponding to the URLLC SR periodically overlap in some time resources, a separate UL control channel applied only to the time resources in which the UL control channels overlap each other may be configured by the serving base station to the terminal through higher layer signaling. Since the URLLC SR and the eMBB GF HARQ-ACK have different error rates, their code rates may be different from each other. Therefore, the serving base station may indicate the terminal of the code rate applied to the URLLC SR and the code rate applied to the eMBB GF HARQ-ACK through higher layer signaling. In general, since a lower code rate is applied to the URLLC SR, when determining the amount of UCI to determine a format of the UL control channel, the amount of the URLLC SR may be regarded as 1 bit or 2 bits or more. In this case, even when the eMBB GF HARQ-ACK is 1 bit and only one URLLC SR occurs, the UCI should be channel-coded in the UL control channel because it is assumed that the URLLC SR is represented by 2 bits or more. For example, for the NR system, this means that the formats 2, 3, and 4 of the UL control channel are used.

Meanwhile, when the eMBB GB HARQ-ACK exists, the eMBB GB HARQ-ACK (and the eMBB GF HARQ-ACK) and the URLLC SR may be multiplexed in the resource of the UL control channel corresponding to the last received eMBB DL control channel. The serving base station may preferably indicate sufficient resources to multiplex both the eMBB HARQ-ACK and the URLLC SR in the eMBB DL control channel. The eMBB HARQ-ACK and the URLLC SR should have different error rates. Therefore, the URLLC SR should be represented with more bits than the eMBB HARQ-ACK. Therefore, even when the eMBB HARQ-ACK is represented by 1 bit, since the URLLC SR can be assumed to be 2 bits or more, the amount of UCI may be considered to be 3 bits or more. Therefore, it is preferable to use a format to which channel coding is applied for the UL control channel in which the URLLC SR and the eMBB HARQ-ACK are multiplexed. The URLLC SR and the eMBB HARQ-ACK may be multiplexed by applying different code rates. These code rates may be derived from an index (i.e., beta offset) indicated by a field of the last received eMBB DL control channel or configured through higher layer signaling.

f) eMBB PUSCH and URLLC SR

①  Selection Scheme According to Priorities

In an exemplary embodiment, according to priorities of the URLLC SR and the eMBB PUSCH, the URLLC SR may be transmitted and the eMBB PUSCH may not be transmitted. This is because the URLLC SR is for the terminal to urgently request UL resources to the serving base station, and the eMBB PUSCH can be retransmitted by the terminal by transmitting a UL grant even at a relatively late time. Accordingly, in terms of priority, the URLLC SR may be selected, and the terminal may transmit the URLLC SR on a UL control channel corresponding to the URLLC SR.

Meanwhile, if the eMBB UL data channel includes a UL-SCH, a buffer status of the terminal may be included, but even in this case, the URLLC SR should be transmitted. The reason is that because a relatively high error rate of the UL data channel may cause a decoding error at the serving base station and retransmission due to the decoding error, the buffer status report of the terminal through the eMBB UL data channel is not suitable in terms of delay time. In addition, when the UL-SCH is a retransmission rather than an initial transmission, since the buffer status of the terminal cannot be newly included in the UL-SCH (i.e., transport block), it is not suitable to transmit the URLLC SR for allocating a URLLC UL data channel on the eMBB UL data channel.

②  Multiplexing Scheme According to Priorities

The terminal may use a resource indicated by a UL grant in order to multiplex the URLLC SR to the eMBB UL data channel. In addition to the UL-SCH, UCI (e.g., HARQ-ACK, (trigger) CSI) may be multiplexed in the eMBB UL data channel, and the UCI may be generated for the eMBB service or the URLLC service.

The code rate applied to the URLLC SR (and other UCI) may be configured by an index (i.e., beta offset) indicated in a specific field of the UL grant or by higher layer. The index may indicate a beta offset applied to the URLLC SR and a beta offset applied to the UCI. If there is an eMBB UL-SCH (i.e., transport block), according to a modulation and coding scheme (MCS) indicated by the UL grant, the eMBB UL-SCH may be rate-matched to resource elements to which the URLLC SR and the UCI are not mapped.

③  Multiplexing and Selection Scheme

In order to multiplex the URLLC SR to the eMBB UL data channel, the terminal needs a predetermined processing time. When such the processing time is secured, the terminal may multiplex the URLLC SR with the UL-SCH in the eMBB UL data channel. Otherwise, since the terminal should select and transmit one of the URLLC SR and the eMBB UL data channel, the terminal may transmit the URLLC SR on a UL control channel and may no longer transmit the eMBB UL data channel.

In this case, the processing time required for the terminal may be given by the serving base station to the terminal through higher layer signaling. The serving base station may receive a report on the processing capability from the terminal, and may identify the time required for the terminal to process the URLLC SR according to the processing capability of the terminal.

g) URLLC HARQ-ACK and CSI

According to a transmission scheme, the CSI may be classified into a trigger CSI and a periodic CSI. In particular, the trigger CSI may be indicated by a URLLC UL grant or by an eMBB UL grant. A URLLC DL data channel may be assigned by a DL control channel or configured and activated by higher layer signaling. A URLLC HARQ-ACK may mean an HARQ-ACK for the URLLC DL data channel.

The terminal may use an RNTI, a search space, or a specific field of the DL control channel (i.e., DL control channel assigning the DL data channel or DL control channel assigning a UL data channel) to identify whether the DL control channel triggers a CSI for supporting the URLLC/eMBB, whether the DL control channel assigns a DL data channel for supporting the URLLC/eMBB, or whether the DL control channel is an HARQ-ACK therefor.

①  Selection Scheme According to Priorities

In an exemplary embodiment, since the priority of the URLLC HARQ-ACK is higher than the priority of the CSI, the terminal may transmit the URLLC HARQ-ACK and may not transmit the CSI. A URLLC HARQ-ACK for the URLLC DL data channel is urgently needed by the serving base station, but since the CSI is additional information used for DL transmission, the priority of the CSI may be low. Therefore, only the URLLC HARQ-ACK may be transmitted on a UL control channel corresponding to the URLLC HARQ-ACK.

In the above exemplary embodiment, when the eMBB CSI is triggered, it may be necessary to transmit the URLLC HARQ-ACK for the URLLC DL data channel. In this case, the terminal may map only the URLLC HARQ-ACK to the UL control channel corresponding to the HARQ-ACK without transmitting the CSI.

In the above exemplary embodiment, when a UL control channel for transmitting the periodic CSI is configured by higher layer signaling, the terminal may transmit the URLLC HARQ-ACK without transmitting the CSI. In this case, the terminal may use a UL control channel corresponding to the URLLC HARQ-ACK.

②  Multiplexing Scheme According to Priorities

In an exemplary embodiment, the URLLC HARQ-ACK and the CSI may be multiplexed.

When the URLLC CSI is a trigger CSI, the serving base station may request a CSI report to the terminal using a specific field of a UL grant. When the URLLC HARQ-ACK consists of several bits, a case where a DL data channel corresponding to at least one URLLC HARQ-ACK bit exists, and the DL data channel is dynamically indicated using a DL control channel may be considered. A DL control channel received earlier than the UL grant may assign the DL data channel and may instruct the terminal to transmit an HARQ-ACK. According to the UL grant received later in time, the terminal may multiplex the URLLC CSI and the URLLC HARQ-ACK and transmit them on the UL data channel indicated by the UL grant. For this, the serving base station should request the CSI to the terminal using a specific field of the UL grant. If the CSI is not requested to the terminal, it is preferable that a UL-SCH is present in the UL data channel indicated by the UL grant. Code rates applied to the URLLC CSI and the URLLC HARQ-ACK may be configured by an index indicated by the UL grant or through higher layer signaling, and may be different values.

A case where the URLLC HARQ-ACK is configured (and activated) using higher layer signaling (and DL control channel) may be considered. The trigger CSI and the URLLC HARQ-ACK may be multiplexed in the UL data channel indicated by the UL grant. Code rates applied to the trigger CSI and the URLL HARQ-ACK may be configured by an index indicated by the UL grant or through higher layer signaling.

When the eMBB CSI is a trigger CSI, the serving base station may request a CSI report to the terminal using a specific field of the UL grant. A case where the URLLC HARQ-ACK is dynamically indicated using the DL control channel may be considered. In this case, the terminal may compare a timing of receiving the UL grant with a timing of receiving the DL control channel assigning the URLLC DL data channel.

When the UL grant is received before the DL control channel, the terminal may transmit only the URLLC HARQ-ACK through the UL control channel without transmitting the CSI. In this case, the UL control channel means a resource indicated by a DL control channel assigning a DL data channel. However, it is preferable to be able to transmit the CSI and the URLLC HARQ-ACK together on the UL data channel.

In an exemplary embodiment, the trigger CSI may be rate-matched without being mapped to specific resource elements among resource elements indicated by the UL grant. In this case, the specific resource elements may be determined by higher layer signaling and correspond to the maximum resource elements to which the HARQ-ACK can be encoded and mapped. These resource elements may be composed of subcarriers spaced at equal intervals as well as successive subcarriers in order to obtain frequency multiplexing gain.

When the UL grant is received later than the DL control channel, if a specific field of the UL grant indicates a CSI request, the terminal may multiplex the HARQ-ACK and the CSI to map to the UL data channel indicated by the UL grant. The CSI and the HARQ-ACK may have different code rates, and the code rates may be configured by an index indicated by the UL grant or through higher layer signaling.

When the CSI is a periodic CSI, the multiplexing scheme may vary according to the transmission scheme of the URLLC HARQ-ACK. The URLLC HARQ-ACK may be classified into an HARQ-ACK for a semi-statically assigned DL data channel and an HARQ-ACK for a dynamically assigned DL data channel. Since the semi-statically assigned DL data channels are transmitted periodically, the corresponding HARQ-ACK may be also periodically transmitted on the UL control channel. Therefore, the UL control channel for the URLL HARQ-ACK and the UL control channel for the periodic CSI may periodically overlap. This situation may occur with a least common multiple periodicity of a periodicity of the UL control channel for the URLL HARQ-ACK and a periodicity of the control channel for the periodic CSI. Therefore, the serving base station may configure the terminal through higher layer signaling so that UL control channels do not overlap each other. Alternatively, when the UL control channels overlap each other, the terminal may transmit only the URLLC HARQ-ACK, and may not transmit the CSI on the UL control channel.

Alternatively, the serving base station may configure a separate UL control channel applied only to time resources where the UL control channels overlap each other through higher layer signaling to the terminal. In the time resources where they do not overlap each other, the URLLC HARQ-ACK and the periodic CSI may be periodically transmitted on the respective associated UL control channels. According to this scheme, since the time when the URLLC HARQ-ACK and the CSI are multiplexed and the time when the URLLC HARQ-ACK and the CSI are not multiplexed are known to the terminal and the serving base station, a UL control channel in which the URLLC HARQ-ACK and the CSI are multiplexed is used when the URLLC HARQ-ACK and the CSI are multiplexed. The URLLC HARQ-ACK and CSI may be concatenated and encoded with the same code rate. This is simple in implementation of the terminal, but since the error rates required by the serving base station for the URLLC HARQ-ACK and the CSI are different, the URLLC HARQ-ACK and the CSI may be encoded with different code rates. In this case, it means that the encoded URLLC HARQ-ACK is mapped to some resource elements constituting the UL control channel and the encoded CSI is mapped to the remaining resource elements. The code rates applied to the URLLC HARQ-ACK and the CSI may be indicated to the terminal through higher layer signaling from the serving base station. That is, the URLLC HARQ-ACK and the CSI may be concatenated and encoded with the same code rate. Alternatively, the code rates of the URLLC HARQ-ACK and the CSI may be indicated through higher layer signaling, respectively, and the URLLC HARQ-ACK and the CSI may be separately encoded.

Meanwhile, an HARQ-ACK for the dynamically assigned DL data channel is transmitted on a UL control channel indicated by the DL control channel. Therefore, a URLLC HARQ-ACK (and CSI) may be multiplexed and transmitted on a UL control channel indicated by the last DL control channel that the serving base station indicates to the terminal. When the URLLC HARQ-ACK (and the CSI) is multiplexed in the UL control channel, the URLLC HARQ-ACK and the CSI may be concatenated, and the same code rate may be applied to them, or different code rates may be applied to them. When different code rates are applied, the code rate of the URLLC HARQ-ACK and the code rate of the CSI may be indicated through higher layer signaling.

h) URLLC HARQ-ACK and URLLC PUSCH

When a URLLC UL data channel is assigned by a UL grant (i.e., DL control channel), a URLLC HARQ-ACK may be mapped to a resource indicated by the UL grant. A code rate applied to the URLLC HARQ-ACK may be indicated to the terminal by an index of a field included in the UL grant or through higher layer signaling. Since there may be a trigger CSI (or UL-SCH) and the UL grant is a UL grant for URLLC, the trigger CSI (or UL-SCH) may be rate-matched to resource elements to which the URLLC HARQ-ACK is not mapped among resource elements indicated by the UL grant. Therefore, the HARQ-ACK and the UL-SCH may be multiplexed onto the URLLC UL data channel.

Since a periodically transmitted URLLC UL data channel is configured and activated by higher layer signaling (and DL control channel), a code rate indicated to the terminal through higher layer signaling may be applied to an HARQ-ACK for a semi-statically or dynamically assigned URLLC DL data channel. The URLLC UL-SCH may be rate-matched to resource elements to which the URLLC HARQ-ACK is not mapped among resource elements indicated through higher layer signaling (and DL control channel). Through this, the HARQ-ACK and the UL-SCH may be multiplexed in the URLLC UL data channel.

i) URLLC HARQ-ACK and eMBB SR

① Selection Scheme According to Priorities

When comparing a priority of the URLLC DL data channel with a priority of the eMBB UL data channel, the URLLC DL data channel is more important. Therefore, the terminal may transmit the URLLC HARQ-ACK and may not transmit the eMBB SR on a UL control channel A URLLC UL control channel means a resource corresponding to the URLLC DL data channel. In case of a dynamically assigned DL data channel, the terminal may indicate scheduling of the DL data channel and a resource of the UL control channel in the DL control channel. For a semi-statically assigned DL data channel, a UL control channel indicated by higher layer signaling is used.

② Multiplexing Scheme According to Priorities

The URLLC DL data channel may be dynamically assigned. In this case, the URLLC HARQ-ACK and the eMBB SR may be multiplexed in a UL control channel indicated by the URLLC DL control channel. When the URLLC HARQ-ACK consists of 1 bit or 2 bits, the URLLC UL control channel may consist of a sequence and a spreading code. Therefore, information on whether an SR has occurred may be represented by a phase of the sequence. In an exemplary embodiment, the terminal may regard both the HARQ-ACK and the SR as equal UCI, and may represent the HARQ-ACK and the SR by 1 bit or 2 bits as combined. In another exemplary embodiment, the terminal may represent only the HARQ-ACK by 1 or 2 bits, and may calculate the amount of UCI by not including the SR. Meanwhile, when the UCI (i.e., HARQ-ACK, or HARQ-ACK and SR) is given more than 3 bits, the UCI may be encoded and mapped to the UL control channel. Here, different code rates may be applied to the URLLC HARQ-ACK and the eMBB SR, and the code rates may be configured through higher layer signaling.

The URLLC DL data channels may be assigned semi-statically. In order to multiplex the URLLC HARQ-ACK and the eMBB SR, a UL control channel indicated through higher layer signaling may be used. In this case, since the URLLC HARQ-ACK is also periodically transmitted, the URLLC HARQ-ACK should be periodically multiplexed with the eMBB SR. In an exemplary embodiment, the serving base station may configure another UL control channel. It is preferable that sufficient resources are allocated to the URLLC HARQ-ACK and the eMBB SR, which can obtain a sufficient error rate at the serving base station. When the amount of URLLC HARQ-ACK and the amount of eMBB SR are equally interpreted (e.g., when the URLLC HARQ-ACK is represented by 1 bit and the eMBB SR is represented by 1 bit), a format of the UL control channel may be configured in a form of spreading a sequence. Alternatively, when the amount of URLLC HARQ-ACK and the amount of eMBB SR are not equally interpreted, the URLLC HARQ-ACK and the eMBB SR may be interpreted as 3 bits or more, and the UL control channel may have a form including the encoded UCI. In this case, different code rates may be applied to the URLLC HARQ-ACK and the eMBB SR, and the code rates may be indicated through higher layer signaling.

j) URLLC HARQ-ACK and eMBB HARQ-ACK
① Selection Scheme According to Priorities

Since a priority of the URLLC DL data channel is higher than that of the eMBB DL data channel, the terminal may transmit only the URLLC HARQ-ACK on a UL control channel without transmitting the eMBB HARQ-ACK.

A URLLC UL control channel means a resource corresponding to the URLLC DL data channel. In case of a dynamically assigned DL data channel, the terminal may indicate scheduling of the DL data channel and a resource of a UL control channel in a DL control channel. For a semi-statically assigned DL data channel, a UL control channel indicated through higher layer signaling is used.

② Multiplexing Scheme According to Priorities

An HARQ-ACK may be multiplexed according to a priority of the corresponding traffic (e.g., eMBB and URLLC) and whether or not the serving base station dynamically indicates the corresponding traffic (i.e., whether the DL control channel is dynamically assigned, or configured through higher layer signaling and activated by a DL control channel).

Considering a case that the serving base station is not involved through the DL control channel (i.e., multiplexing of an HARQ-ACK for an eMBB GF DL data channel and an HARQ-ACK for a URLLC GF DL data channel), the terminal periodically multiplexes the eMBB GF HARQ-ACK and the URLLC GF HARQ-ACK. To this end, in an exemplary embodiment, the terminal may multiplex the URLLC GF HARQ-ACK and the eMBB GF HARQ-ACK in an eMBB UL control channel or a URLL UL control channel. In this case, when the amount of URLLC GF HARQ-ACK and eMBB GF HARQ-ACK is calculated as 2 bits or less (i.e., when importance of the URLLC HARQ-ACK and the eMBB HARQ-ACK are equal and each of them is generated as 1 bit), a format of the UL control channel consisting of a sequence and a spreading code may be used. In other cases that the amount of URLLC GF HARQ-ACK and eMBB GF HARQ-ACK is calculated as 3 bits or more, an encoding procedure should be performed. In this case, different code rates may be applied to the URLLC GF HARQ-ACK and the eMBB GF HARQ-ACK, and the code rates may be indicated through higher layer signaling. However, error rates of the URLLC GF HARQ-ACK and the eMBB GF HARQ-ACK at the serving base station are different when they are individually transmitted on respective UL control channels and when they are multiplexed and transmitted on one UL channel. In order to keep the error rates of the URLLC GF HARQ-ACK and the eMBB GF HARQ-ACK similar, another proposed method may be applied. The serving base station may configure a resource of a UL control channel for a case when the URLLC GF HARQ-ACK and the eMBB GF HARQ-ACK are transmitted as multiplexed to the terminal through higher layer signaling. Since the terminal can multiplex the URLLC GF HARQ-ACK and the eMBB GF HARQ-ACK by applying respective code rates thereto, it is preferable that a UL control channel having a sufficient amount of resource elements is configured.

Although the eMBB DL data channel is semi-statically assigned, when a part of the URLLC DL data channel(s) is dynamically indicated, the terminal may follow the indication of the URLLC DL control channel. The terminal may multiplex and transmit the eMBB GF HARQ-ACK and the URLLC GB HARQ-ACK in a resource of a UL control channel indicated by the last received URLLC DL control channel. In this case, when the amount of the eMBB GF HARQ-ACK and the URLLC GB HARQ-ACK is calculated as 2 bits or less (e.g., when importance of the eMBB HARQ-ACK and the URLLC HARQ-ACK are equal and they are represented by 1 bit respectively), a format of a UL control channel consisting of a sequence and a spreading code may be used. In other cases when the amount of eMBB GF HARQ-ACK and URLLC GF HARQ-ACK is calculated as 3 bits or more, an encoding procedure should be performed. Different code rates may be applied to the eMBB GF HARQ-ACK and the URLLC GB HARQ-ACK, and the code rates may be indicated by an index in a field of a DL control channel or through higher layer signaling.

When a part of the eMBB DL data channel(s) is dynamically indicated, but the URLLC DL data channel is semi-statically assigned, since the serving base station already knows the presence and amount of URLLC GF HARQ-ACK at the time of transmission of the eMBB DL control channel, the serving base station may reflect this and indicate a sufficient amount of UL control channel resources to the terminal. The terminal may multiplex and transmit the URLLC GF HARQ-ACK and the eMBB GB HARQ-ACK in the UL control channel indicated through the eMBB DL control channel. In this case, when the amount of the URLLC GF HARQ-ACK and the eMBB GB HARQ-ACK is calculated as 2 bits or less (e.g., when importance of the URLLC HARQ-ACK and the eMBB HARQ-ACK are equal and they are represented by 1 bit, respectively), a format of a UL control channel consisting of a sequence and a spreading code may be used. In other cases that the amount of URLLC GF HARQ-ACK and eMBB GB HARQ-ACK is calculated as 3 bits or more, an encoding procedure should be performed. Different code rates may be applied to the eMBB GF HARQ-ACK and the URLLC GB HARQ-ACK, and the code rates may be indicated by an index in a field of a DL control channel or through higher layer signaling.

When both a part of the eMBB DL data channel(s) and a part of the URLLC DL data channel(s) are assigned by DL control channels, the terminal may preferably follow the indication of the last transmitted DL control channel. In general, since a delay time of the URLLC DL data channel is required to be the shortest, the indication of the URLLC DL control channel may be followed. Accordingly, the terminal may multiplex and transmit the eMBB GB HARQ-ACK and the URLLC GB HARQ-ACK in the UL control channel indicated by the last transmitted URLLC DL data channel. In this case, when the amount of the URLLC GB HARQ-ACK and the eMBB GB HARQ-ACK is calculated as 2 bits or less (e.g., when importance of the URLLC HARQ-ACK and the eMBB HARQ-ACK are equal and they are represented by 1 bit, respectively), a format of a UL control channel consisting of a sequence and a spreading code may be used. In other cases that the amount of URLLC GB HARQ-ACK and eMBB GB HARQ-ACK is calculated as 3 bits or more, an encoding procedure should be performed. Different code rates may be applied to the eMBB GF HARQ-ACK and the URLLC GB HARQ-ACK, and the code rates may be indicated by an index in a field of a DL control channel or through higher layer signaling.

③ Multiplexing and Selection Scheme

The URLLC HARQ-ACK and the eMBB HARQ-ACK may occur for DL data channels assigned by different DL control channels. Here, the DL control channel may include DAI (i.e., counter DAI (and total DAI)).

In an exemplary embodiment, the number of assigned eMBB DL data channels and the number of assigned URLLC DL data channels may be indicated separately. For example, the URLLC DAI may indicate the number of assigned URLLC DL data channels, and the eMBB DAI may indicate the number of assigned eMBB DL data channels.

In another exemplary embodiment, the number of DL data channels may be indicated without discrimination between the eMBB and the URLLC. Accordingly, the terminal may know only a sum of the number of bits of the URLLC HARQ-ACK and the number of bits of the eMBB HARQ-ACK. However, since there is only one DL data channel transmitted by the serving base station, when the DAI is indicated through the DL control channel, the terminal may identify whether the eMBB DL data channel or the URLLC DL data channel is received.

k) URLLC HARQ-ACK and eMBB PUSCH

① Selection Scheme According to Priorities

Since a priority of the URLLC DL data channel is higher than that of the eMBB UL data channel, the terminal may select an HARQ-ACK (i.e., URLLC HARQ-ACK) for the URLLC DL data channel. Accordingly, the terminal may transmit only the URLLC HARQ-ACK in a UL control channel without transmitting the eMBB UL data channel.

A URLLC UL control channel means a resource corresponding to the URLLC DL data channel. In case of a dynamically assigned DL data channel, the terminal may indicate scheduling of the DL data channel and a resource of the UL control channel in the DL control channel. For a semi-statically assigned DL data channel, a UL control channel indicated by higher layer signaling may be used.

② Multiplexing Scheme According to Priorities

When configuring the HARQ-ACK, depending on whether there is a DL data channel dynamically assigned by the DL control channel or whether all DL data channels are semi-statically assigned, it may be determined whether the UL control channel is dynamically indicated or indicated through higher layer signaling. Also, a UL grant for the UL data channel may be given by the DL control channel, or may also be given by higher layer signaling. Therefore, the multiplexing scheme may vary depending on the combination thereof.

When the DL control channel is not involved (i.e., in case of the URLLC GF HARQ-ACK and the eMBB GF UL data channel), multiplexing should be performed periodically. In an exemplary embodiment, the URLLC GF HARQ-ACK may be mapped to the eMBB GF UL data channel, and an eMBB UL-SCH may be rate-matched to the remaining resource elements. Different code rates are applied to the HARQ-ACK and the UL-SCH, and the code rates may be indicated through higher layer signaling. Therefore, in the UL data channel in which the HARQ-ACK and the UL-SCH are multiplexed, an error rate of the UL-SCH may be different. In order to keep the error rate of the UL-SCH the same, in another exemplary embodiment, the serving base station may configure another resource (i.e., UL data channel) for the HARQ-ACK and the UL-SCH to the terminal through higher layer signaling, thereby multiplexing the HARQ-ACK and the UL-SCH. In this case, the UL data channel is preferably configured to have a sufficient amount of resources in which the HARQ-ACK and UL-SCH can have a sufficient code rate.

When the URLLC DL control channel is involved, but the eMBB UL grant is not involved, the terminal may map the URLLC HARQ-ACK to the eMBB UL data channel. The terminal may know the amount of URLLC HARQ-ACK to be reported from a field (e.g., DAI field and/or beta offset) included in the last received DL control channel among the URLLC DL control channels. The eMBB UL data channel is semi-statically configured and activated, and the corresponding resource is given. The code rate configured by higher layer signaling is applied to the URLLC HARQ-ACK, and the URLLC HARQ-ACK may be mapped to the UL data channel. The UL-SCH may be mapped to the UL data channel through rate matching to the remaining resource elements.

When the URLLC DL control channel is not involved, but the eMBB UL grant is involved, since the serving base station knows the amount of URLLC HARQ-ACK in advance, a sufficient amount of resources for the eMBB UL data channel may be indicated when the eMBB UL grant is indicated, so that the eMBB UL-SCH can have a sufficient error rate. The terminal may apply different code rates to the HARQ-ACK and the UL-SCH, and the code rates may be indicated by an index included in the UL grant or through higher layer signaling.

When the URLLC DL control channel is involved and the eMBB UL grant is indicated, the terminal may multiplex all or part of the URLLC HARQ-ACK with the UL-SCH and transmit them on the UL data channel. Meanwhile, the URLLC DL control channel transmitted from the serving base station to the terminal may be transmitted earlier or later than the eMBB UL grant. According to the conventional method, in order for the URLLC HARQ-ACK to be multiplexed with the eMBB UL-SCH, the URLLC DL control channel may always be received before the eMBB UL grant. This increases latency because it limits scheduling of the URLLC DL data channel. Accordingly, in an exemplary embodiment, an HARQ-ACK corresponding to the URLLC DL control channel received earlier than the eMBB UL grant and an HARQ-ACK corresponding to the URLLC DL control channel received later than the eMBB UL grant may be processed in different ways. The URLLC HARQ-ACK corresponding to the URLLC DL control channel received earlier may be mapped to resource elements first, the UL-SCH may be mapped through rate matching to the remaining resource elements, and the URLLC HARQ-ACK corresponding to the URLLC DL control channel received later may be mapped through puncturing to a part of the region to which the UL-SCH is mapped. Here, the code rates applied to the URLLC HARQ-ACKs are all the same, and may be indicated through the eMBB UL grant or higher layer signaling. In another exemplary embodiment, the amount of puncturing the UL-SCH may be limited in advance. The amount of puncturing the UL-SCH may be predetermined according to the technical specification or may be indicated to the terminal through higher layer signaling.

③ Multiplexing and Selection Scheme

When receiving a UL grant for the UL-SCH, the UL grant should be received before the DL control channels (i.e., DL control channel assigning the DL data channel). In this case, the terminal may generate the UL data channel based only on the UL grant. In order to multiplex the UL-SCH and the HARQ-ACK, a predetermined time (i.e., a time between the last symbol of the DL control channel and the first symbol of the UL channel) for generating the UL data channel is required, and when such time is not secured, the terminal may not transmit the UL data channel according to the UL grant. The terminal may transmit the HARQ-ACK in a UL control channel, and a resource of the UL control channel in this case may be indicated by the last received DL control channel.

l) CSI and URLLC PUSCH

① Selection Scheme According to Priorities

The CSI may be triggered by a UL grant. When the CSI is triggered by the eMBB UL grant, the terminal should compare the priority of the URLLC UL data channel with the priority of the eMBB CSI. Since the priority of the eMBB service is higher than that of the URLLC service, the terminal may transmit the URLLC UL data channel and may not transmit the CSI. When the CSI is triggered by the URLLC UL grant, the terminal should compare the priority of the URLLC CSI and the priority of the URLLC UL data channel. However, since the URLLC UL-SCH can be assigned by the URLLC UL grant while triggering the CSI, the terminal may follow the last received URLLC UL grant. That is, the last received URLLC UL grant may trigger only the CSI without mapping the UL-SCH (i.e., URLLC UL-SCH), and conversely, it may map the UL-SCH (i.e., URLLC UL-SCH) without triggering the CSI.

Since the priority of the CSI periodically reported is lower than that of the URLLC UL data channel, the terminal may transmit only the URLLC UL data channel.

② Multiplexing Scheme According to Priorities

When the CSI is triggered by the URLLC UL grant, the terminal may multiplex the URLLC UL-SCH and the CSI. Since the CSI can be triggered and the URLLC UL-SCH can be assigned by the URLLC UL grant that the terminal received last, the terminal may transmit the UL data channel based on the URLLC UL grant. Here, the URLLC UL-SCH may be assigned by the DL control channel or configured through higher layer signaling and activated through the DL control channel. Different code rates may be applied to the CSI and the UL-SCH, and the code rates may be indicated by the DL control channel (i.e., UL grant) or through higher layer signaling.

When the CSI is triggered by the eMBB UL grant, if the URLLC UL-SCH has been assigned by the URLLC UL grant, the terminal may transmit the UL data channel based on the URLLC UL grant. However, if the URLLC UL-SCH is configured through higher layer signaling and activated by the DL control channel, since the DL control channel is not dynamically given, the terminal may transmit the UL data channel based on the eMBB UL grant.

That is, the URLLC UL grant may trigger the CSI while assigning the URLLC UL-SCH. However, since the trigger of the CSI has been repeatedly indicated, the terminal may follow the CSI trigger of the URLLC UL grant and may not follow the CSI trigger of the eMBB UL grant. The CSI and the UL-SCH may be transmitted on a UL data channel based on the URLLC UL grant, and code rates thereof may be indicated through the UL grant or higher layer signaling.

Meanwhile, the semi-statically assigned URLLC UL-SCH may be multiplexed with the CSI in the resource indicated by the eMBB UL grant. The serving base station may allocate a sufficient amount of resources to the UL data channel in consideration of the amount of URLLC UL-SCH. Different code rates are applied to the CSI and the URLLC UL-SCH, and the code rates may be indicated through the UL grant or higher layer signaling.

When the CSI is transmitted periodically, if the URLLC UL data channel is dynamically assigned, the CSI and the URLLC UL-SCH may be multiplexed based on the URLLC UL grant. However, when the URLLC UL-SCH is semi-statically assigned, the CSI and the URLLC UL-SCH may be multiplexed periodically. In an exemplary embodiment, a new UL data channel may be configured and the CSI and the UL-SCH may be multiplexed in the new UL data channel. The serving base station preferably allocates sufficient resources for the new UL data channel so that the CSI and the UL-SCH can maintain sufficient error rates. In this case, different code rates may be applied to the CSI and the UL-SCH, and the code rates may be indicated through higher layer signaling.

m) CSI and eMBB SR

① Selection Scheme According to Priorities

When the CSI is triggered, the priority of the CSI may vary according to the type of the UL grant that triggered the CSI. If the CSI is triggered by the URLLC UL grant, since the priority of the URLLC service is higher than the priority of the eMBB service, the terminal may transmit CSI on the UL data channel indicated by the URLLC UL grant. Meanwhile, if the CSI is triggered by the eMBB UL grant, since the priority of the CSI is lower than the priority of the SR, the terminal may transmit the eMBB SR in the UL control channel without transmitting the CSI. Alternatively, since the SR has an opportunity to transmit periodically, the terminal may not transmit the SR at the corresponding time. In this case, the terminal may transmit the CSI triggered by the eMBB UL grant based only on the UL grant.

② Multiplexing Scheme According to Priorities

When the CSI is triggered by the URLLC UL grant, the eMBB SR may be multiplexed with the CSI. Since the UL control channel corresponding to the eMBB SR occurs periodically, the serving base station knows that the eMBB SR exists when transmitting the UL grant. In an exemplary embodiment, when an eMBB SR is generated (i.e., a positive SR), it may be included in the URLLC UL grant as a payload and transmitted on the URLC UL data channel. On the other hand, when no eMBB SR is generated (i.e., negative SR), it may not be included in the URLLC UL grant. When the eMBB SR does not occur, since the terminal does not need to transmit the eMBB SR, the serving base station may allocate less resources for the UL data channel. However, since the serving base station should always perform decoding on the eMBB SR (i.e., blind decoding), an error may occur. Therefore, in another exemplary embodiment, regardless of whether the eMBB SR is generated, the serving base station may configure the amount of resources of the UL data channel to always include resources corresponding to the eMBB SR in the payload.

Different code rates may be applied to the eMBB SR and the CSI, and the code rates may be indicated through an index of a field of a UL grant or higher layer signaling.

When the CSI is periodically transmitted, the terminal may encode the eMBB SR by including it in the payload of the UL control channel. Here, the terminal may add a certain number of bits for the eMBB SR to the payload of the UL data channel regardless of whether the eMBB SR is generated. Therefore, the serving base station does not need to decode several times during the decoding process.

n) CSI and eMBB HARQ-ACK

① Selection Scheme According to Priorities

The CSI may be triggered by the URLLC UL grant. The priority of the CSI triggered by the URLLC UL grant is higher than the priority of HARQ-ACK (i.e., eMBB HARQ-ACK) for the eMBB DL data channel. Accordingly, the terminal may transmit only the CSI on the UL data channel without transmitting the eMBB HARQ-ACK.

In case of the CSI periodically transmitted, the terminal may transmit the HARQ-ACK of the eMBB DL data channel according to the eMBB DL control channel without transmitting the CSI.

② Multiplexing Scheme According to Priorities

When the CSI is triggered by the UL grant (i.e., URLLC UL grant and eMBB UL grant), since the serving base station knows the amount of HARQ-ACK for the eMBB DL data channel in advance, the serving base station may allocate a sufficient amount of resources in the UL grant. In this case, the terminal may multiplex the CSI and the HARQ-ACK in the same UL data channel. Here, the UL data channel used by the terminal may be indicated by the UL grant. Comparing a timing of receiving the DL control channel assigning the DL data channel and a timing of receiving the UL grant, the UL grant should be received later. Different code rates may be applied to the CSI and the HARQ-ACK, and the code rates may be indicated by an index of a field included in the UL grant or may be indicated through higher layer signaling. This may apply to both the CSI triggered by the URLLC UL grant and the CSI triggered by the eMBB UL grant.

In case of the CSI transmitted periodically, the operation of the terminal may vary according to the configuration of the eMBB HARQ-ACK. When the eMBB DL data channel corresponding to the eMBB HARQ-ACK is a dynamically assigned DL data channel, the CSI and the eMBB HARQ-ACK may be multiplexed and transmitted in a resource of a UL control channel indicated by the DL control channel. Here, different code rates may be applied to the CSI and the eMBB HARQ-ACK, and the code rates may be indicated by an index of a field included in the UL grant or may be indicated through higher layer signaling.

Meanwhile, when all of the eMBB DL data channels corresponding to the eMBB HARQ-ACK are DL data channels that are configured and activated by higher layer signaling, in the UL control channel configured for transmission of the CSI, the CSI and the eMBB HARQ-ACK may be concatenated and encoded or may be separately encoded at different code rates. In this case, in order to maintain the error rates of the eMBB HARQ-ACK and CSI which are periodically multiplexed and transmitted, the serving base station may configure a new UL control channel through higher layer signaling. When the serving base station allocates a sufficient amount of resources, even if the eMBB HARQ-ACK and the CSI are multiplexed, the quality of any one UCI may not be degraded.

o) CSI and eMBB PUSCH

① Selection Scheme According to Priorities

When the CSI is triggered by the URLLC UL grant, since the priority of the URLLC CSI triggered by the URLLC UL grant is higher than that of the eMBB PUSCH, the terminal may map only the URLLC CSI to the UL data channel. Accordingly, in an exemplary embodiment, even if the eMBB UL data channel is indicated by the eMBB UL grant, the terminal may follow the URLLC UL grant. Although the eMBB UL grant may be received later and the URLLC UL grant may be received earlier, the terminal may derive the priorities of the URLLC and the eMBB as an RNTI, a search space, or a value of a specific field of the DL control channel, and perform only the URLLC transmission based on the derived priority.

When the CSI is transmitted periodically, the CSI may overlap in time with the eMBB GF UL data channel. In this case, the terminal may transmit the eMBB UL-SCH on the UL data channel configured to transmit the eMBB UL-SCH without transmitting the CSI.

② Multiplexing Scheme According to Priorities

When the CSI is triggered by the eMBB UL grant, the terminal may multiplex both the CSI and the eMBB UL-SCH in the eMBB UL data channel. Both the assignment for the eMBB UL-SCH and the CSI trigger may be indicated using different fields belonging to one UL grant. According to an example, if the last received UL grant triggers the CSI and includes an assignment for the UL-SCH, the terminal may multiplex the CSI and the UL-SCH and transmit them on the UL data channel. In addition, the terminal may receive a UL grant that triggers the CSI but does not include an assignment for the UL-SCH at a certain timing, and may receive a UL grant that does not trigger the CSI but includes an assignment for the UL-SCH at another timing. In this case, the terminal may follow the last received UL grant.

When the CSI is transmitted periodically, the CSI may be multiplexed periodically in an eMBB UL data channel that is semi-statically assigned. In an exemplary embodiment, the terminal may first map the CSI to resource elements of the eMBB UL data channel, and perform rate-matching of the UL-SCH only to the remaining resource elements. The UL data channel may use resources configured and activated to transmit the eMBB UL-SCH. Different code rates may be applied to the CSI and the UL-SCH, and values indicated by higher layer signaling may be applied to the code rates. However, since the CSI is periodically mapped to the eMBB GF UL data channel, the error rate of the UL-SCH may be affected because the effective code rate of the UL-SCH is changed. Accordingly, the serving base station may configure another UL data channel to the terminal, and instruct the terminal to use the another UL data channel when the CSI and the UL-SCH are multiplexed. The another UL data channel is preferably composed of as much resources as the eMBB UL-SCH and the CSI can obtain an appropriate code rate.

p) URLLC PUSCH and eMBB SR

When a URLLC UL data channel includes a UL-SCH, since the terminal can report a buffer status to the serving base station, the necessity of transmitting an eMBB SR is low. Accordingly, the terminal may transmit only the URLLC UL data channel.

The URLLC UL data channel may not include the UL-SCH, and the URLLC UL data channel may trigger only CSI. In this case, the terminal may multiplex the eMBB SR to the URLLC UL data channel in order to request scheduling, or transmit only the URLLC UL data channel without transmitting the eMBB SR.

When the eMBB SR is multiplexed, the terminal may derive a code rate to be applied to the eMBB SR from an index indicated by a field of a UL grant assigning the URLLC UL data channel. In case of transmitting a semi-statically assigned URLLC UL data channel, the terminal may derive a code rate to be applied to the eMBB SR from a value indicated by higher layer signaling.

q) URLLC PUSCH and eMBB HARQ-ACK

①Selection Scheme According to Priorities

Since the priority of the URLLC UL data channel is higher than that of the eMBB DL data channel, the terminal may transmit the URLLC UL data channel without transmitting an eMBB HARQ-ACK for the eMBB DL data channel.

②Multiplexing Scheme According to Priorities

In case of a UL data channel transmitted without a URLLC UL grant (i.e., a semi-statically assigned UL data channel), an HARQ-ACK for an eMBB DL data channel may be multiplexed in the UL data channel. In this case, the amount of eMBB HARQ-ACK is known to the terminal. For example, it may be indicated by a value of a field in the last received eMBB DL control channel or given by higher layer signaling.

When the eMBB DL data channel is dynamically indicated, the eMBB HARQ-ACK may be mapped to a part of resource elements of the UL data channel, and a UL-SCH may be mapped to the remaining resource elements through rate matching. Here, the eMBB HARQ-ACK and the URLLC UL-SCH may have different code rates, and the code rates may be indicated by a DL control channel or higher layer signaling.

When the eMBB DL data channel is semi-statically assigned, the eMBB HARQ-ACK may be periodically multiplexed in the UL data channel. In an exemplary embodiment, the serving base station may configure a new UL data channel to the terminal through higher layer signaling so that the eMBB HARQ-ACK and the URLLC UL-SCH are multiplexed in the new UL data channel. In this case, it is preferable that the new UL data channel has sufficient resources so that the code rates configured by higher layer signaling can be applied to the eMBB HARQ-ACK and the URLLC UL-SCH. Therefore, the eMBB HARQ-ACK and the URLL UL-SCH can maintain error rates.

In case of the UL data channel dynamically indicated by the URLLC UL grant, the terminal may multiplex the eMBB HARQ-ACK in the UL data channel according to the URLLC UL grant. The terminal may be instructed to multiplex the eMBB HARQ-ACK by a field (e.g., DAI and/or beta offset) included in the URLLC UL grant, or by another field (e.g., beta offset) of the URLLC UL grant. In this case, the terminal may apply different code rates to the eMBB HARQ-ACK and the UL-SCH, and the code rates may be indicated by higher layer signaling or the UL grant.

r) URLLC PUSCH and eMBB PUSCH

When the URLLC GF UL data channel overlaps with the eMBB GF UL data channel in time, since the priority for the URLLC service is higher than the priority for the eMBB service, the terminal may transmit only the URLLC UL data channel. In case that the eMBB UL data channel is being already transmitted, the terminal may no longer transmit the eMBB UL data channel after a specific time, and may transmit the URLLC UL data channel after another specific time. Here, the specific times may be values determined according to the processing capability of the terminal, and may be configured in units of symbols.

When the URLLC GF UL data channel and the eMBB GB UL data channel overlap in time, the terminal may not follow a UL grant even though the terminal has received the UL grant. The reason is to transmit a URLLC UL-SCH having a higher priority than the eMBB UL-SCH. Accordingly, when the terminal generates the URLLC UL-SCH, the terminal may transmit the URLLC GF UL data channel. However, since the terminal does not always generate the URLLC UL-SCH, if there is no URLLC UL-SCH, the terminal may follow a UL grant for transmitting the eMBB UL-SCH. If it is determined that the terminal has transmitted the eMBB UL data channel, the serving base station may determine that a URLLC UL-SCH has not occurred in the terminal.

When the URLLC GB UL data channel and the eMBB GF UL data channel overlap in time, the terminal may follow a UL grant. When the URLLC GB UL data channel and the eMBB GB UL data channel overlap in time, the terminal may follow a UL grant received later or a UL grant for the URLLC service. If the terminal receives a URLLC UL grant while transmitting the UL data channel based on an eMBB UL grant, the terminal may cancel the transmission of the eMBB UL data channel before transmitting the eMBB UL data channel. Alternatively, in case that the terminal is transmitting the eMBB UL data channel, the terminal may no longer transmit the eMBB UL data channel from a certain symbol thereof. The terminal may transmit the URLLC UL data channel instead of the eMBB UL data channel.

s) URLLC SR and eMBB HARQ-ACK

In an exemplary embodiment, the priority of the URLLC SR may be higher than the priority of the eMBB HARQ-ACK. Therefore, when the URLLC SR is repeatedly transmitted, priorities may be defined as the priority of the URLLC SR>the priority of the eMBB HARQ-ACK>the priority of the eMBB SR. Therefore, when the UL control channel through which the URLLC SR is transmitted is repeatedly transmitted, the UL control channel through which the eMBB HARQ-ACK or the eMBB SR is transmitted may not be transmitted in a time resource in which the UL control channel of the URLLC SR is transmitted. Also, in the opposite case, when the eMBB HARQ-ACK or the eMBB SR is repeatedly transmitted on the UL control channel, if some time resources thereof overlap with the UL control channel through which the URLLC SR is transmitted, the UL control channel for the URLLC SR may be transmitted and the UL control channel for the eMBB HARQ-ACK or the eMBB SR may not be transmitted.

t) URLLC SR and URLLC HARQ-ACK t-1) When the URLLC SR and the URLLC HARQ-ACK have the Same Priority In an exemplary embodiment, the priority of the URLLC HARQ-ACK may be configured equally to that of the URLLC SR. That is, a DL data channel of the URLLC service and a UL data channel of the URLLC service may be interpreted as having the same priority.

Since the URLLC HARQ-ACK and the URLLC SR have the same priority, when transmission resources of the UL control channels for them overlap in time, the URLLC HARQ-ACK and the URLLC SR may be multiplexed in one UL control channel. In case that the URLLC HARQ-ACK is transmitted two or more times and the URLLC SR is transmitted once, the URLLC HARQ-ACK and the URLLC SR may be multiplexed if they overlap in some time resources. As the opposite case, in case that the URLLC SR is transmitted two or more times and the URLLC HARQ-ACK is transmitted once, the URLLC HARQ-ACK and the URLLC SR may be multiplexed if they overlap in some time resources.

When the URLLC HARQ-ACK and the URLLC SR are multiplexed, the URLLC HARQ-ACK and the URLLC SR may be included in the encoding process as a payload of a UL control channel for transmitting the URLLC HARQ-ACK. Alternatively, if the UL control channel is composed of a sequence and a spreading code, whether or not the URLLC SR has occurred may be represented as a phase of the sequence. Alternatively, when the URLLC SR is encoded as a payload, the URLLC SR may be encoded in concatenation with the URLLC HARQ-ACK. When the URLLC SR is delivered as a phase of the sequence, the URLLC SR may be represented by changing the phases of sequences that constitute the UL control channel for the URLLC HARQ-ACK. When the terminal requests scheduling (i.e., positive SR), the terminal may transmit the URLLC HARQ-ACK on a UL control channel corresponding to the URLLC SR. On the other hand, when the terminal does not request scheduling (i.e., negative SR), the terminal may transmit the URLLC HARQ-ACK on a UL control channel corresponding to the URLLC HARQ-ACK instead of the UL control channel corresponding to the URLLC SR.

① A Scheme of Starting at Different Symbols

In an exemplary embodiment, even though the priority of the URLLC HARQ-ACK and the priority of the URLLC SR are the same, in a slot where a time resource of the UL control channel including the URLLC HARQ-ACK and a time resource of the UL control channel including the URLLC SR overlap each other, the UL control channel including the URLLC HARQ-ACK and the UL control channel including the URLLC SR may start from different symbols. Therefore, when the UL control channel including the URLLC HARQ-ACK is repeatedly transmitted, the symbol at which the UL control channel including the URLLC SR starts is not the same as the symbol at which the UL control channel including the URLLC HARQ-ACK starts. On the other hand, in the opposite case, when the UL control channel including the URLLC SR is repeatedly transmitted, the symbol at which the UL control channel including the URLLC HARQ-ACK starts is not the same as the symbol at which the UL control channel including the URLLC SR starts.

② Scheme of Starting at the Same Symbol

In an exemplary embodiment, the UL control channel including the URLLC HARQ-ACK and the UL control channel including the URLLC SR may start from the same symbol. In this case, the URLLC HARQ-ACK and the URLLC SR may be multiplexed and transmitted on the UL control channel.

t-2) When the Priorities of the URLLC SR and the URLLC HARQ-ACK are Different

In an exemplary embodiment, the priority of the URLLC HARQ-ACK may be set higher than the priority of the URLLC SR. That is, the priority of the DL data channel of the URLLC service may be interpreted as higher than the priority of the UL data channel of the URLLC service. The reason is that since the URLLC HARQ-ACK is an HARQ-ACK for the URLLC DL data channel that has already been transmitted, if the priority of the URLLC SR is set higher than that of the URLLC HARQ-ACK, the URLLC HARQ-ACK may not be transmitted. Accordingly, the serving base station should instruct the terminal to retransmit the URLLC DL data channel, and thus the delay time may become long. However, the delay required for transmitting the URLLC SR on the UL control channel in the next transmission instance corresponds to one cycle of the URLLC SR, which may not be a very large delay time. In addition, since the terminal may use a URLLC GF UL data channel without necessarily receiving a UL grant from the serving base station, the priority of the URLLC SR may be set lower than that of the URLLC HARQ-ACK.

Therefore, when the UCI is repeatedly transmitted, priorities may be defined as the priority of URLLC HARQ-ACK>the priority of URLLC SR>the priority of eMBB HARQ-ACK>the priority of eMBB SR. Therefore, when the UL control channel on which the URLLC HARQ-ACK is transmitted is repeatedly transmitted, the UL control channel on which the URLLC SR, the eMBB HARQ-ACK, or the eMBB SR is transmitted may not be transmitted in a time resource in which the UL control channel of the URLLC HARQ-ACK is transmitted. Also, in the opposite case, when the URLLC SR, eMBB HARQ-ACK, or eMBB SR is repeatedly transmitted on the UL control channel, if a time resource thereof overlaps with the UL control channel on which the URLLC HARQ-ACK is transmitted, the UL control channel for the URLLC HARQ-ACK may be transmitted and the UL control channel for the URLLC SR, eMBB HARQ-ACK, or eMBB SR may not be transmitted.

u) Repeated eMBB UCI and Repeated URLLC UL-SCH

Consider a case that the terminal transmits the UL control channel two or more times, transmits the UL data channel, and the UL control channel and the UL data channel overlap in one or more slots. According to the conventional method, the terminal transmits only the UL control channel in such the slot without transmitting the UL data channel. However, considering the characteristics of URLLC service and eMBB service, this priority needs to be improved.

In an exemplary embodiment, considering the priorities of the UCI and UL data channel, when the UL control channel and the UL data channel overlap in time, the UL data channel may be transmitted. This is because when the UL control channel corresponds to the eMBB UCI (i.e., eMBB HARQ-ACK, CSI, or eMBB SR), the URLLC UL data channel may have a higher priority than the priority of the UL control channel. In this case, the UL control channel may not be transmitted and the UL data channel may be transmitted.

① Multiplexing Scheme for eMBB UCI and URLLC UL-SCH

The URLLC UL-SCH and the eMBB UCI may be multiplexed and mapped to the UL data channel. Since the eMBB UCI is transmitted on the UL data channel, it may have a different code rate than when the eMBB UCI is transmitted on the UL control channel. Accordingly, the serving base station may receive the eMBB UCI through the UL control channel, or may also receive the eMBB UCI through the UL data channel. In this case, even if the eMBB UCI is transmitted on the UL data channel, the UL control channel may be counted as transmitted.

② Selection Scheme for eMBB UCI and URLLC UL-SCH

Under determination that that the priority of the URLLC UL-SCH is higher than that of the eMBB UCI, not the eMBB UCI but only the URLLC UL-SCH may be mapped to the URLLC UL data channel. In this case, the eMBB UCI may not be transmitted, but the UL control channel may be counted as transmitted. Alternatively, since the UL control channel was not transmitted, the eMBB UCI may not be counted as transmitted.

Meanwhile, when the eMBB UCI is an SR, an operation performed by the terminal after the URLLC UL data channel has been (repeatedly) transmitted may be considered.

In an exemplary embodiment, after a slot in which the URLLC UL data channel is transmitted instead of the eMBB UL control channel, the terminal may transmit the UL control channel that has not been transmitted. This scheme may be applied regardless of the type of eMBB UCI (i.e., CSI, HARQ-ACK, or SR) when the eMBB UCI is repeated.

In another exemplary embodiment, after the slot in which the URLLC UL data channel is transmitted instead of the eMBB UL control channel, the terminal may not transmit the UL control channel that has not been transmitted. However, according to the transmission of the URLLC UL data channel, since the serving base station can receive a buffer status from the terminal in implementation, it is not necessary to receive the eMBB SR thereafter.

When the eMBB UCI is an SR, if the entire eMBB UL control channel has been transmitted (i.e., according to the proposed method, a case, in which the eMBB UL control channel has been retransmitted or not after all or part of the transmission of the eMBB UL control channel was canceled, is included), the PHY layer of the terminal may indicate to the MAC layer of the terminal that the eMBB UL control channel has been transmitted. Alternatively, even without a separate indication, the MAC layer of the terminal may consider that the PHY layer of the terminal has transmitted the eMBB UL control channel (i.e., SR). Accordingly, in the MAC layer of the terminal, SR_COUNTER may be increased by 1. Therefore, the number of times the terminal actually transmits the eMBB UL control channel for transmission of the eMBB SR may be the same as the number of times configured by higher layer signaling in case that the canceled eMBB UL control channel is transmitted later again. Alternatively, the number of times the terminal actually transmits the eMBB UL control channel for transmission of the eMBB SR may be smaller than the number of times configured by higher layer signaling in case that the canceled eMBB UL control channel is not transmitted again.

v) URLLC SR and eMBB SR

The SR corresponds to one LCG, has a one-to-one relationship with a resource of a UL control channel, and may be configured to the terminal through higher layer signaling from the serving base station. The URLLC SR and the eMBB SR may be distinguished at the physical layer of the terminal, and the physical layer of the terminal may request transmission of the SR to the higher layer of the terminal. The URLLC SR and the eMBB SR have different UL control channel resources, and the different UL control channel resources may have different periodicities and different numbers of symbols.

For example, when the URLLC SR and the eMBB SR occur in the terminal at the same time or at the similar time, the higher layer of the terminal may instruct the physical layer of the terminal to transmit only the URLLC SR determined to have a high priority. The physical layer of the terminal may transmit a UL control channel for the indicated SR. In this case, the UL control channel corresponding to the eMBB SR and the UL control channel corresponding to the URLLC SR may not overlap each other in time, but the URLLC SR may be selected based only on the priorities at the higher layer.

However, the terminal may wish to transmit the URLLC SR while transmitting the UL control channel corresponding to the eMBB SR. In this case, the terminal may cancel the UL control channel (i.e., the UL control channel corresponding to the eMBB SR) in transmission (or with impending transmission), and transmit the UL control channel corresponding to the URLLC SR.

Although the UL control channel corresponding to the eMBB SR is configured by higher layer signaling to be repeatedly transmitted, the UL control channel corresponding to the URLLC SR may be configured by higher layer signaling not to be repeatedly transmitted. In this case, although the terminal has not yet transmitted all the UL control channels by repeatedly transmitting the eMBB SR, the terminal may wish to transmit the URLLC SR.

According to the conventional technical specification, in the process of repeatedly transmitting the eMBB SR N times, if the UL control channels overlap in time in a specific slot while transmitting the URLLC SR once, the URLLC SR may be transmitted in the corresponding slot. This is because the priority of URLLC SR is higher than that of eMBB SR. Only the eMBB SR is transmitted in the remaining slots.

Although the serving base station has not received all of the UL control channels corresponding to the eMBB SR, by receiving the URLLC SR, the serving base station may assign the UL data channel even if the eMBB SR is no longer received. This is because the serving base station may request a buffer status of the terminal in implementation. Therefore, since the conventional technical specification specifies that the eMBB SR is repeatedly transmitted the remaining number of times, it is inefficient.

In an exemplary embodiment, the terminal may no longer transmit the eMBB SR after the corresponding slot (i.e., the slot in which the URLLC SR is transmitted). That is, the transmission of the SR having a lower priority may be canceled by the SR having a higher priority. In this case, the PHY layer of the terminal may indicate to the MAC layer of the terminal that the transmission of the SR having a low priority is canceled. For example, in the MAC layer of the terminal, an SR_COUNTER for the SR having a low priority may be initialized. Alternatively, since the SR is not transmitted to the serving base station, the terminal may maintain the SR COUNTER for the SR having a low priority as it is (i.e., the value of the SR_COUNTER before transmitting the eMBB SR).

A transmission resource of the UL control channel to which the eMBB SR is mapped and a transmission resource of the UL control channel to which the URLLC SR is mapped may be indicated to be located in the same slot. In this case, consider a case where the UL control channel to which the eMBB SR is mapped and the UL control channel to which the URLLC SR is mapped do not overlap each other in time.

In case that the UL control channel corresponding to the eMBB SR is instructed to be transmitted once, a UL control channel corresponding to the URLLC SR may be transmitted while or after the UL control channel for the eMBB SR is transmitted, and transmission of the UL control channel corresponding to the eMBB SR may be canceled. The PHY layer of the terminal may inform it to the MAC layer of the terminal.

Consider a case where the UL control channel corresponding to the eMBB SR is instructed to be transmitted repeatedly two or more times. According to the conventional technical specification, in order to transmit the UL control channel corresponding to the URLLC SR, the UL control channel corresponding to the eMBB SR is first transmitted at least once in time, and the UL control channel corresponding to the URLLC SR is transmitted. Thereafter, the UL control channel corresponding to the eMBB SR may be transmitted one or more times. Here, the UL control channel corresponding to the URLLC SR and the UL control channel corresponding to the eMBB SR may be transmitted in the same slot, and the UL control channel corresponding to the URLLC SR and the UL control channel corresponding to the eMBB SR do not overlap in time.

However, in this case, the UL control channel corresponding to the eMBB SR no longer needs to be transmitted. The reason is that since the terminal transmits the UL control channel corresponding to the URLLC SR, the serving base station may request a buffer status to the terminal based on the URLLC SR.

According to the proposed method, even when the UL control channel corresponding to the eMBB SR does not overlap in time with the UL control channel corresponding to the URLLC SR, the remaining number of times of transmission of the eMBB SR may be cancelled. Therefore, the number of times that the terminal transmits the UL control channel corresponding to the eMBB SR may be less than the number of times configured by higher layer signaling. The PHY layer of the terminal may inform it to the MAC layer of the terminal.

Method for Performing Pairwise Comparisons in Order

The selection schemes and multiplexing schemes for the two UCIs (and UL-SCH) having different priorities described so far may be easily extended even for three or more UCIs (and UL-SCH).

One UCI may be characterized by a supported service type (e.g., URLLC or eMBB) and its type (e.g., CSI, HARQ-ACK, SR), and may have a one-to-one correspondence with one UL control channel resource. In addition, the UL-SCH may be characterized by a service type and a transmission scheme (e.g., a scheme of being dynamically assigned by a DL control channel or a scheme of being configured by higher layer signaling (e.g., RRC signaling) (and activated by a DL control channel)), and may have a one-to-one correspondence with one UL data channel resource. If two or more UL channels are to be transmitted within a slot and they overlap in some symbols, these UL channels may be referred to as a set.

In an exemplary embodiment, the terminal may determine the selection and multiplexing for the UL channels by comparing two UL channels belonging to one set with each other.

If the terminal decides to transmit a specific UCI (or UL-SCH), the terminal may multiplex the specific UCI (or UL-SCH) and UCI (or UL-SCH) that has already been selected for transmission, and the terminal should determine which UL resource to transmit the specific UCI multiplexed with the UCI that has already been selected for transmission. When an existing UL channel and UCI (and/or UL-SCH) to be transmitted is given, the terminal may compare a priority of the existing UL channel and UCI (and/or UL-SCH) to be transmitted and a priority of a new UL channel and UCI (and/or UL-SCH). That is, it is assumed that the existing UL channel to be transmitted and the newly considered UL channel partially overlap in time, and these UL channels may be expressed as a subset.

There may be DL control channels indicating resources of the UL channels belonging to the subset. Among the DL control channels, the DL control channel received last by the terminal is considered. Therefore, the DL control channel indicating the resource for the existing UL channel to be transmitted and the DL control channel indicating the resource for the newly considered UL channel are compared.

In another exemplary embodiment, all or part of UCI (and/or UL-SCH) belonging to the subset may be assigned to the UL channel resource indicated by the DL control channel received later among the DL control channels indicating the resources of the UL channels belonging to the subset.

In this case, the terminal checks whether the UCI (and/or UL-SCH) can maintain a sufficient code rate. When a code rate for the part of UCI (and/or UL-SCH) is indicated by higher layer signaling, the indicated code rate should be applied as it is. If the indicated code rate is not applicable, the corresponding UCI (and/or UL-SCH) may not be transmitted in the UL channel resource derived by the terminal. However, if the code rate of the part of UCI (and/or UL-SCH) is dynamically indicated, rate matching can be performed, so that the corresponding UCI (and/or UL-SCH) may be transmitted in the UL channel resource derived by the terminal.

Meanwhile, all of the UL channels belonging to the subset may not be indicated by the DL control channel but may be indicated by higher layer signaling. In this case, the serving base station may know in advance at which time resource the UCI (and/or UL-SCH) collide with each other.

In an exemplary embodiment, the serving base station may indicate the new UL channel to the terminal through higher layer signaling. The new UL channel preferably has more resource elements, so that all of the UCI (and/or UL-SCH) can be multiplexed.

In another exemplary embodiment, the terminal may select one of two UL channels (i.e., the existing UL channel and the newly considered UL channel). In this case, the UL channel selected by the terminal may be a UL channel having more resource elements among the two, and it is preferable that all UCI (and/or UL-SCH) can be multiplexed in the selected UL channel.

Meanwhile, the prioritization and multiplexing may be performed on the URLLC service first, and then prioritization and multiplexing may be performed on the eMBB service.

In an exemplary embodiment, UCI (and/or UL-SCH) related to the URLLC service may be selectively mapped or multiplexed to one UL channel according to the conventional technical specification to generate a combined UL channel. Then, for the obtained combined UL channel, UCIs (and/or UL-SCHs) related to the eMBB service may be considered one by one. Therefore, although the UCIs (and/or UL-SCHs) related to the URLLC service may be located later in time than the UCIs (and/or UL-SCHs) related to the eMBB service, the multiplexing/selection procedure for the UCIs (and/or UL-SCHs) related to the URLLC service may be performed first. In this case, a resource of the combined UL channel may be a resource indicated by the DL control channel last received by the terminal among DL control channels related to the URLLC service, or a resource indicated to the terminal by higher layer signaling.

In another exemplary embodiment, for the combined UL channel, the terminal may consider the UCIs (and/or UL-SCHs) related to the eMBB service in order of time. If the UCI (and/or UL-SCH) related to the eMBB service in the combined UL channel can achieve the code rate indicated in advance from the serving base station, the corresponding UCI (and/or UL-SCH) may be multiplexed in the corresponding combined UL channel. Otherwise, the UL channel through which the UCI to be multiplexed with the UCI (and/or UL-SCH) related to the URLLC is transmitted may be a UL channel through which the corresponding UCI is assumed to be transmitted.

In yet another exemplary embodiment, for the combined UL channel, the terminal may consider the UCIs (and/or UL-SCHs) related to the eMBB service in order of priority. For example, priorities of the UCIs may be given as HARQ-ACK>SR>CSI. When a high priority UCI that is already multiplexed and the same type of UCI not yet multiplexed/selected are considered (i.e., when URLLC SR and eMBB SR are compared, when URLLC ACSI and eMBB ACSI are compared, or when URLLC HARQ-ACK and eMBB HARQ-ACK are compared), if a sufficient code rate can be achieved by the combined UL channel (i.e., UL control channel or UL data channel), the corresponding UCI can be multiplexed onto the corresponding combined UL channel. However, in case of the SR, only the URLLC SR having a higher priority may be selected. The UL resource to which the multiplexed/selected UCI (and/or UL-SCH) will be included may be determined among the combined UL channel or a UL channel through which the newly considered UCI (and/or UL-SCH) is assumed to be transmitted. If the high priority UCI (and/or UL-SCH) and the corresponding UCI (and/or UL-SCH) can be multiplexed to achieve a code rate indicated by the serving base station, the terminal may transmit them on the combined UL channel. If not, the terminal may transmit the high priority UCIs (and/or UL-SCHs) and the corresponding UCI (and/or UL-SCH) on the UL channel through which the corresponding UCI (and/or UL-SCH) is assumed to be transmitted.

Hereinafter, a method of determining priority when repeatedly performing UL transmission will be described. The serving base station may request repeated UL transmissions (i.e., UL control channels or UL data channels) to the terminal through higher layer signaling. Such the repeated UL transmissions may overlap each other in time. That is, two or more UL channels in which some symbols overlap in the same slot may be assigned.

According to the conventional technical specification, when UCI is repeatedly transmitted, several types of UCI are not multiplexed and repeatedly transmitted. That is, only SR is repeated, only CSI is repeated, or only HARQ-ACK is repeated. This means that the UL control channel is repeatedly transmitted. The UL control channel is transmitted in consecutive or discontinuous slots.

When two or more UCIs are repeated, i.e., the first UCI is repeatedly transmitted two or more times, and the second UCI is repeatedly transmitted one or more times, time resources of the UL control channels of the first UCI and the second UCI may partially overlap. In this case, UCI having a high priority may be selected based on the priority according to the type of UCI. According to the technical specification, priorities of UCI are defined as HARQ-ACK>SR>high priority CSI>low priority CSI. Therefore, only the UCI having the highest priority among the first UCI and the second UCI is transmitted in the overlapped time resource. The priority of CSI may be given as a function defined in the technical specification. Meanwhile, the terminal assumes that UCIs having the same priority do not start in the same slot when they are mapped to the UL control channel. If UCIs having the same priority are transmitted on UL control channels from different timings, the terminal first transmits the UL control channel that is being transmitted and does not transmit the remaining UL control channels. In case of UL control channels for different types of UCIs, the terminal transmits only the UL control channel for the UCI having a higher priority.

It is assumed that the serving base station assigns a UL control channel to the terminal so that the terminal does not select the type of UCI too early when the terminal transmits the UL control channel. If the terminal fails to transmit the UL control channel in some slots due to the transmission of other UCI during repeated transmissions of the UL control channel, it is counted as transmitted. Accordingly, the terminal may transmit the UL control channel as many times as the number less than or equal to the number of times that the UL control channel is configured to repeat.

When the terminal transmits the UL data channel while transmitting the UL control channel two or more times, a case where the UL control channels and the UL data channel overlap in one or more slots may be considered. The terminal transmits only the UL control channel in these slots without transmitting the UL data channel.

UL Transmission Priority (Out-of-Order PUSCH)

The conventional technical specification may be applied to single type of traffic or service. However, different priorities may be applied to more than one type of traffic or services (e.g., URLLC and eMBB).

Consider a case where the terminal receives a DL control channel from the serving base station and transmits a UL data channel. The terminal determines a size of a transport block according to the amount of resource elements that can be utilized as the UL data channel, and assigns a HARQ process identifier to the transport block.

The serving base station may configure one terminal to support two or more traffic having different requirements (e.g., URLLC traffic and eMBB traffic). The requirements may include at least an error rate or delay time. According to these requirements, the traffic has a priority, and the terminal may identify the priority through a technical specification (TS), higher layer signaling (e.g., RRC signaling), an index of a search space in which the DL control channel is transmitted, a radio identifier (RNTI) with which the DL control channel is scrambled, or a value of a specific field of the DL control channel.

Data Channel Reassignment

In an exemplary embodiment, when receiving a DL control channel instructing to transmit the same or a different transport block two or more times, the terminal may follow instruction of the last received DL control channel without following instruction of the previously received DL control channel.

For example, the terminal may be instructed to transmit one transport block by a DL control channel #1, and may map the transport block to a UL data channel #1. If information assigning the same or a different transport block is indicated by a DL control channel #2 after the DL control channel #1, the terminal may not follow the instruction of the DL control channel #1 and follow the instruction of the DL control channel #2.

The above method may be applied when the terminal performs slot-based transmission and when the terminal performs mini-slot based transmission. The DL control channel #2 may instruct the terminal to map the transport block to a resource different from a resource indicated by the UL data channel #1, or to transmit the transport block in a slot and symbol different from a slot and symbol indicated by the UL data channel #1.

Even when the terminal is configured to receive multiple layers, the above method may be applied. The terminal may receive one or two transport blocks on one DL control channel, and the terminal may follow an indication of the last DL control channel among DL control channels for assigning or reassigning two transport blocks.

Figure 40:
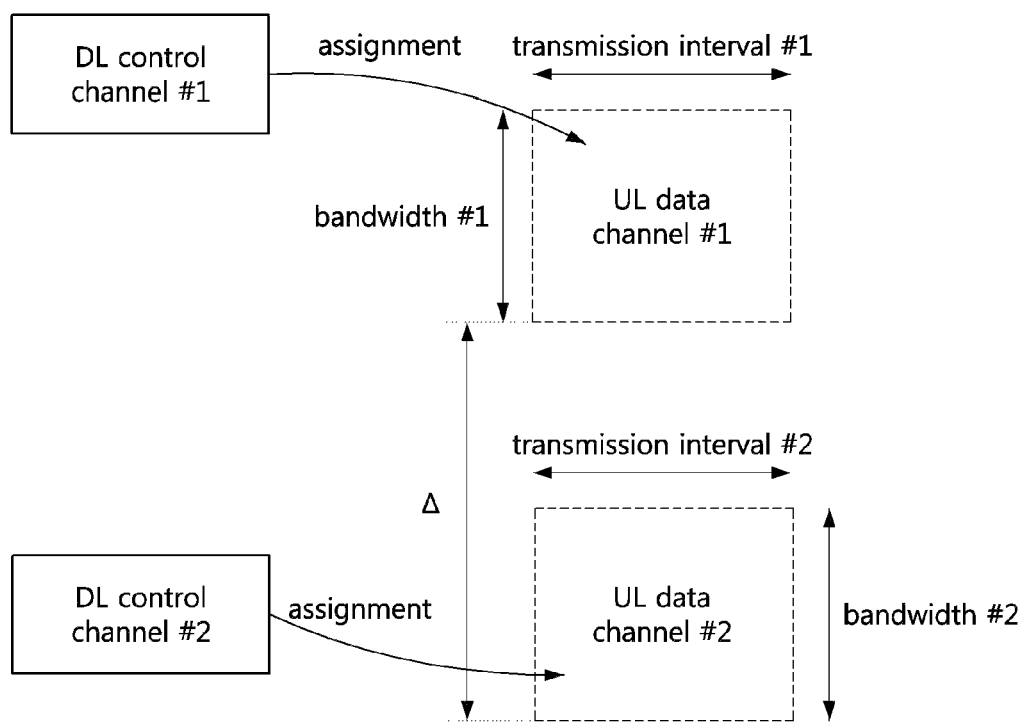
FIG. 40 is a conceptual diagram illustrating a first exemplary embodiment of a method of reassigning an UL data channel using a DL control channel.

FIG. 40 is a conceptual diagram illustrating a first exemplary embodiment of a method of reassigning an UL data channel using a DL control channel.

Referring to FIG. 40, the terminal may receive a DL control channel #1 and a DL control channel #2 for assigning a transport block from the serving base station. In this case, a position of a frequency resource allocated to the transport block by the DL control channel #1 and a position of a frequency resource allocated to the transport block by the DL control channel #2 may be changed by A. According to the above-described method, the terminal may transmit the UL data channel #2 without transmitting the UL data channel #1.

In FIG. 40, a transmission interval #1, which is a time resource of the DL data channel #1, and a transmission interval #2, which is a time resource of the DL data channel #2, may be the same or different, and a bandwidth #1 of the DL data channel #1 and a bandwidth #2 of the DL data channel #2 may be the same or different. The serving base station may transmit the DL data channel #2 to change the frequency resource of the UL data channel #1 so that the corresponding frequency resource can be used for other purposes.

Figure 41:
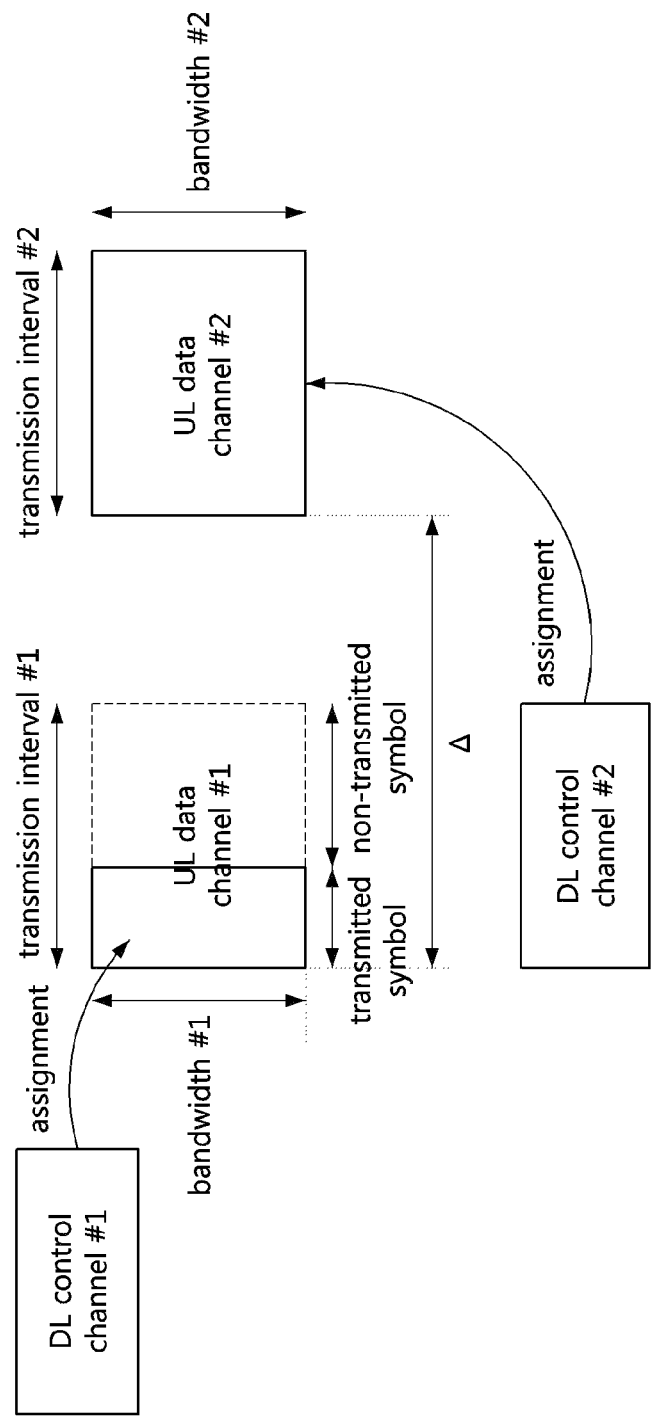
FIG. 41 is a conceptual diagram illustrating a second exemplary embodiment of a method of reassigning an UL data channel using a DL control channel.

FIG. 41 is a conceptual diagram illustrating a second exemplary embodiment of a method of reassigning an UL data channel using a DL control channel.

Referring to FIG. 41, the terminal may change a transmission time of a transport block allocated from the serving base station by a DL control channel #1 by A according to reception of a DL control channel #2.

According to the above-described method, when the terminal finishes demodulating the DL control channel #2 before transmitting a UL data channel #1, the terminal may transmit only a UL data channel #2 without transmitting the remaining part of the UL data channel #1. When the terminal finishes demodulating the DL control channel #2, it may take time to prepare for transmitting the UL data channel #1 according to the implementation of the terminal, the operation of transmitting the UL data channel #1 may not be started. In this case, the terminal may transmit only the UL data channel #2 without transmitting the entire UL data channel #1. Meanwhile, when the terminal receives the DL control channel #2 while partially transmitting the UL data channel #1 or transmits a part of the UL data channel #1 before finishing decoding the DL control channel #2, the terminal may not transmit the remaining part of the UL data channel #1. Thereafter, the terminal may transmit the UL data channel #2.

In an exemplary embodiment, a resource of the UL data channel #2 may be allocated by the DL control channel #2 without any limitation. Since the serving base station can adaptively reallocate the resource, it is effective for dynamic resource allocation (e.g., dynamic TDD and URLLC services). Unlike the resource allocation of FIGS. 40 and 41 illustrated above, both the time resource and the frequency resource of the UL data channel #2 may be changed.

The terminal may transmit the UL data channel in a slot in which the UCI is to be transmitted (i.e., the slot in which the UL control channel is to be transmitted). If the serving base station configures the UL control channel through higher layer signaling or a DL control channel, but the UL data channel starts in the same symbol, the terminal may not transmit the configured UL control channel, and may transmit the UL data channel by mapping the UCI to the UL data channel. Thus, the UL data channel may include both the transport block and the UCI.

Hereinafter, consider a case where the terminal transmits the UCI through the UL data channel. The terminal transmits the transmission block and the UCI by mapping them to the UL data channel #1 based on the DL control channel #1 indicating the UL transmission. Before or during the transmission of the DL control channel #1, when the terminal receives the DL control channel #2 indicating the UL transmission for the same transport block, the terminal may follow not the DL control channel #1 but the DL control channel #2.

Figure 42:
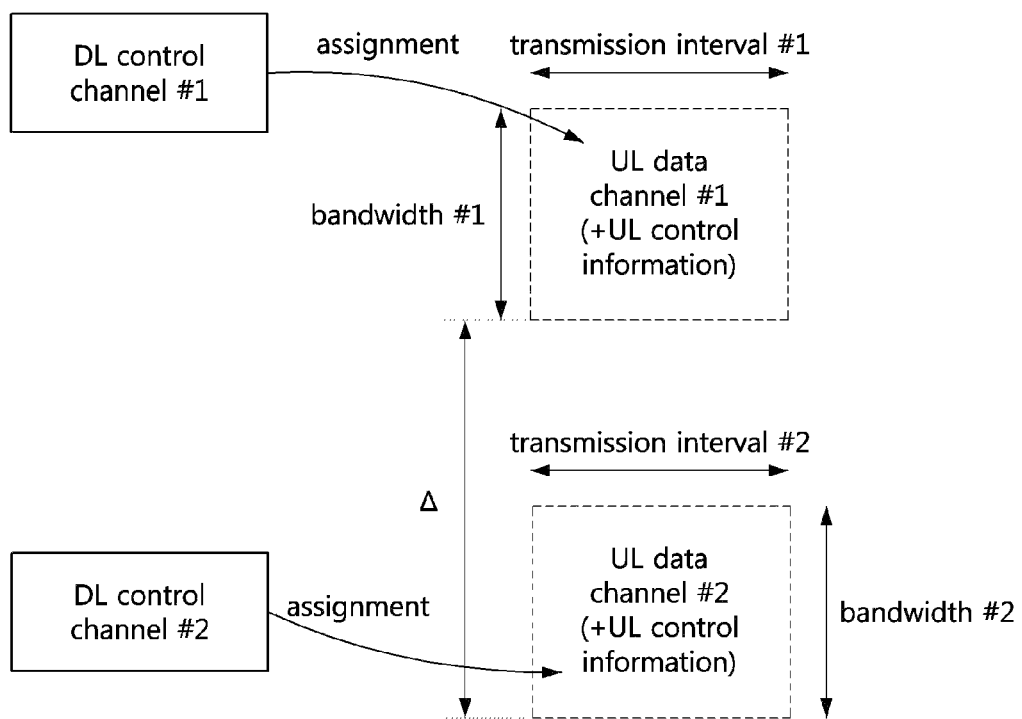
FIG. 42 is a conceptual diagram illustrating a third exemplary embodiment of a method of reassigning an UL data channel using a DL control channel.

FIG. 42 is a conceptual diagram illustrating a third exemplary embodiment of a method of reassigning an UL data channel using a DL control channel.

FIG. 42 shows a case in which at least a start symbol among time resources of a reassigned UL data channel #2 is identical to a start symbol of the UL data channel #1. In this case, the terminal maps UL control information also to the UL data channel #2.

However, the serving base station may assign the UL data channel #2 so that the UL data channel #2 has a time resource (e.g., a symbol or a slot at which the transmission starts) different from that of the UL data channel #1. In this case, unlike the case of FIG. 42, it may be difficult for the terminal to map the UCI to the UL data channel #2. This is because when a method in which the terminal maps the UCI while transmitting the UL data channel #2 is applied, the time for feeding back the UCI to the serving base station becomes different. If the UCI is fed back at an earlier time, the processing time of the terminal should be shorter, and if the UCI is fed back at a later time, the delay time of the traffic is consumed longer. Therefore, the UCI is preferably fed back at the time indicated by the terminal.

An exemplary embodiment for this case is that the terminal does not transmit both the UL data channel #1 and the UCI.

In another exemplary embodiment for this case, the terminal generates a UL control channel to which the UCI is mapped, and transmits the UL control channel without transmitting the UL data channel.

Figure 43:
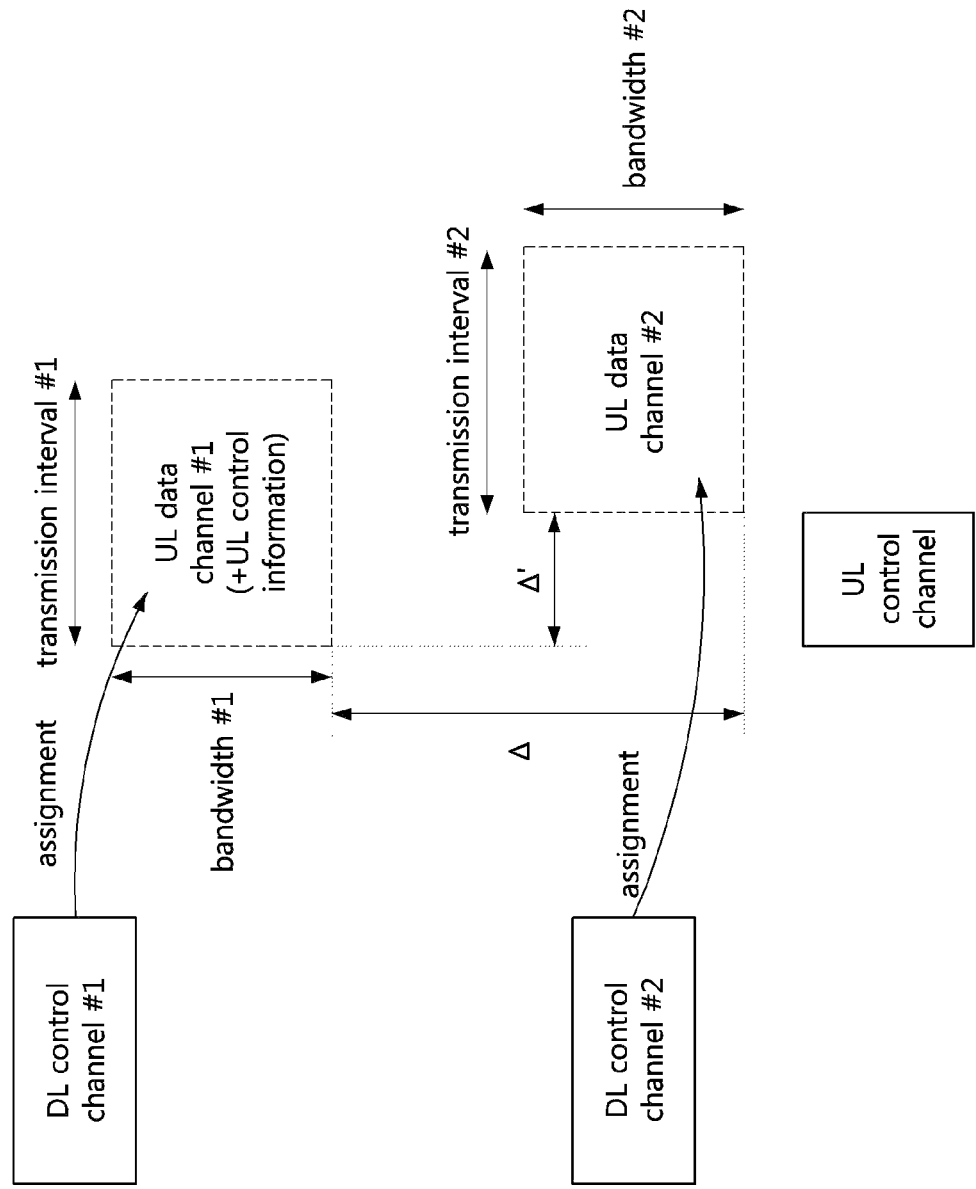
FIG. 43 is a conceptual diagram illustrating a fourth exemplary embodiment of a method of reassigning an UL data channel using a DL control channel.
Figure 44:
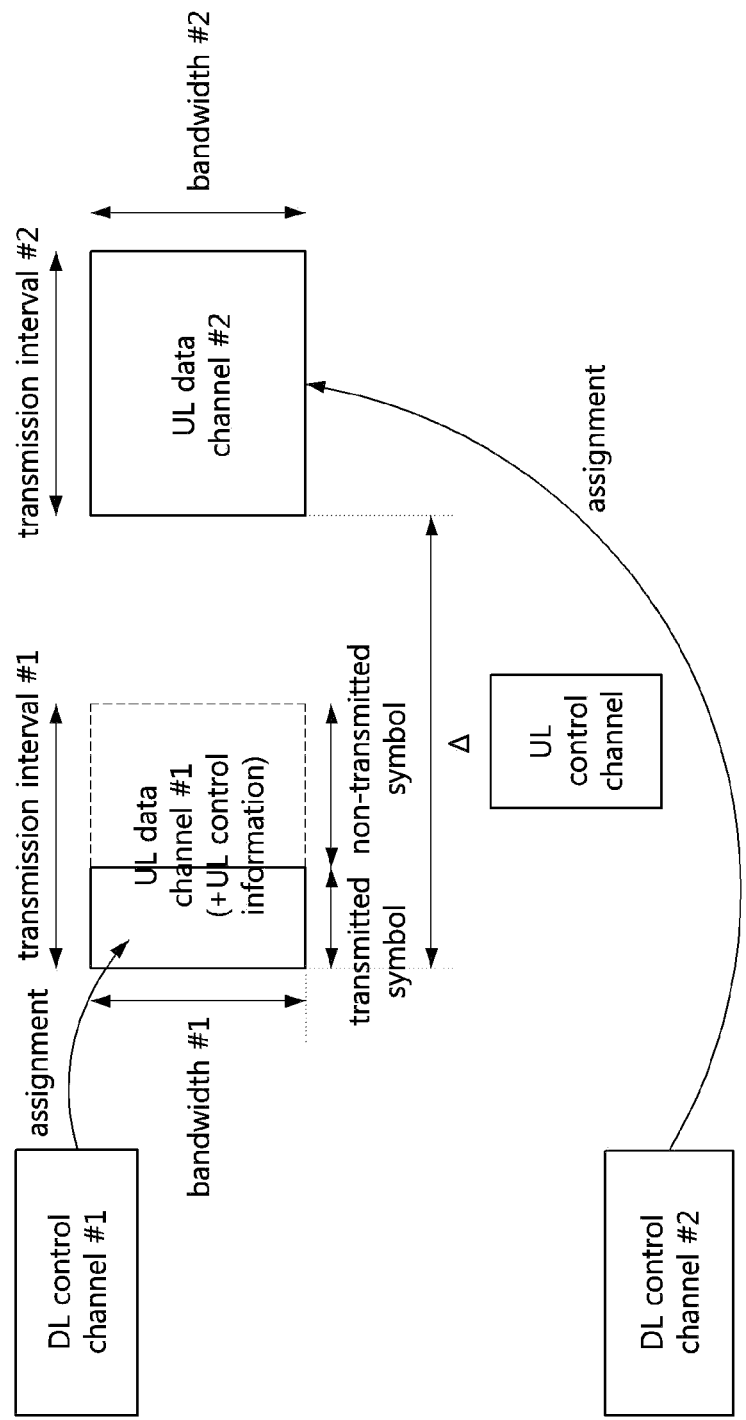
FIG. 44 is a conceptual diagram illustrating a fifth exemplary embodiment of a method of reassigning an UL data channel using a DL control channel.

FIG. 43 is a conceptual diagram illustrating a fourth exemplary embodiment of a method of reassigning an UL data channel using a DL control channel, and FIG. 44 is a conceptual diagram illustrating a fifth exemplary embodiment of a method of reassigning an UL data channel using a DL control channel.

FIGS. 43 and 44 show a case in which a UL data channel #2 that changes a part (e.g., a start symbol) of time resources of a UL data channel #1 is reassigned by a DL control channel #2. In this case, the terminal may not map UCI, which was supposed to be mapped to the UL data channel #1, to the UL data channel #2. The terminal may generate a separate UL control channel to which the corresponding UCI is mapped, and transmit the separate UL control channel in the same slot. FIG. 43 shows a case in which the entire UL data channel #1 is not transmitted as in FIG. 41, and FIG. 44 shows a case in which some symbols of the UL data channel #1 are transmitted and other symbols are not transmitted as in FIG. 42.

In order to determine resources (e.g., start symbol, interval of symbols, frequency position, bandwidth, sequence information, etc.) of the UL control channel, the terminal may use a control channel element (CCE) or resource index (PRI) included in the most recently received DL control channel (e.g., DL control channel #2) and information configured by higher layer signaling, or only information configured by higher layer signaling.

Meanwhile, in an exemplary embodiment, the terminal may recalculate the amount of UCI that was supposed to be mapped to the UL data channel #1 and map the UCI to the UL data channel #2. If the amount of resource elements of the UL data channel #2 is increased as compared to the UL data channel #1, a larger amount of UCI may be mapped to the UL data channel #2. The terminal may increase the amount of UCI reported to the serving base station, but may derive the amount of UCI that can maintain the configured code rate. For example, the terminal may map channel state information part 2 (i.e., CSI part 2), which could not be mapped to the UL data channel #1, to the UL data channel #2 since it satisfies a reference code rate $c_T$. Since the proposed method should assume the amount of the CSI part 2 differently depending on the presence of the DL control channel #2, the terminal may not delete the CSI part 2 from a storage device even after calculating the amount of CSI part 2.

On the other hand, when the amount of resource elements of the UL data channel #2 is reduced as compared to the UL data channel #1, a smaller amount of UCI may be mapped to the UL data channel #2. The terminal may reduce the amount of UCI reported to the serving base station, but may derive the amount of UCI capable of maintaining the configured code rate. For example, the terminal may not map a part of CSI part 2 that could be mapped to the UL data channel #1 to the UL data channel #2 since it exceeds the reference code rate $c_T$.

Meanwhile, if frequency hopping is performed on the UL data channel, the terminal may classify the UCI by type to map a part of the UCI to the first frequency hop of the UL data channel and a part of the UCI to the second frequency hop of the UL data channel. As described above, when the amount of CSI part 2 is changed, in consideration of this, it is necessary to perform mapping of the transport block.

An equation for calculating the amount of UCI may follow the technical specification. In this case, the reference code rate may vary for each type of UCI. For example, in case of the NR system, the amount of HARQ-ACK may be calculated according to Equation 4 below. According to the technical specification, the amounts of other type UCIs are specified to be calculated based on equations similar to Equation 4.

$$Q'_{ACK} = \min\left(\left\lceil \frac{A}{B} \cdot C \right\rceil, \lceil \alpha \cdot D \rceil\right), \quad \text{[Equation 4]}$$

where $A = (O+L)\cdot \beta$, $B = \sum_r K_r$, $C = \sum_s M(s)$, $$D = \sum_s N(s)$$

Here, M(s) and N(s) correspond to the number of subcarriers of the s-th symbol. Therefore, when the amount of resource elements of the UL data channel #2 is changed, $Q'_{ACK}$, which means the amount of HARQ-ACK, needs to be recalculated. When the amount of resource elements of UL data channel #2 is changed, $Q'_{CSI-1}$ and $Q'_{CSI-2}$, which mean the amounts of CSI part 1 and CSI part 2, respectively, also need to be recalculated. Rate matching for the UL data channel is performed after determining resource elements that are not occupied by the UCI. Rate matching of UCI may use the recalculated $Q'_{ACK}$, $Q'_{CSI-1}$ and $Q'_{CSI-2}$.

In another exemplary embodiment, the terminal may map the coded UCI derived when mapping the UCI to the UL data channel #1 to the UL data channel #2 without newly calculating the amount of UCI and the amount of resource elements corresponding thereto. In the above-described exemplary embodiment, the terminal encodes the UCI based on the UL data channel #2. However, in another exemplary embodiment, the terminal may map the UCI encoded based on the UL data channel #1 to the transport block.

For example, a value of C in Equation 4 is determined from the UL data channel #1. This may be applied to an equation for determining the code rate of HARQ-ACK. D determining $Q'_{ACK}$ may be determined from the UL data channel #1 or may be determined from the UL data channel #2. This scheme may be applied to all types of UCI (e.g., HARQ-ACK, CSI part 1, CSI part 2).

When calculating D, if allocation information of the UL data channel #1 is used, the terminal may map the UCI that was mapped to the UL data channel #1 to the UL data channel #2 without newly encoding the UCI. However, when resource allocation of the UL data channel becomes different, an upper limit derived from the DL control channel #1 and an upper limit derived from the DL control channel #2 are different from each other. In this case, the mapping of UCI may occupy too many resource elements in the UL data channel #2. Therefore, when calculating D, the assignment information of the UL data channel #2 may be used to ensure the amount of resource elements occupied by the transport block. However, if the upper limit of $Q'_{ACK}$ is changed, the terminal may newly encode the UCI. A portion of the CSI part 2 may be mapped to the UL data channel #2 without being mapped to the UL data channel #1, depending on its upper limit. Alternatively, the CSI part 2 may be mapped to the UL data channel #2 but not to the UL data channel #1 according to its upper limit.

When the terminal maps the transport block to the UL data channel #2, the terminal may follow indication of the UL control channel #2. The serving base station should allocate a sufficient amount of resources to the UL data channel #2 so that the transport block and the UCI can have an appropriate code rate.

The three proposed methods above may be applied also to a case when the DL control channel #1 instructs to map only the UCI to the UL data channel #1 without assigning the transport block. The equation for deriving the amount of UCI follows the technical specification, and the amount of resource elements that the UL data channel has may be kept to be the same or different in the UL data channel #1 and the UL data channel #2.

Processing Time

In order to apply the above methods, a time for the terminal to perform a process such as decoding of the DL control channel and encoding of the transport block. Therefore, when the serving base station allocates too short a time to the terminal, the terminal may not be able to perform all procedures according to the processing capability of the terminal. The serving base station may identify the processing capability of the terminal from the initial access procedure with the terminal. For example, in the technical specification, the minimum time required for transmitting an HARQ-ACK for a DL data channel on a UL control channel from a time when the terminal receives the DL data channel, which is represented in units of slots or symbols according to a subcarrier spacing, may be considered as an indicator of the processing capability.

The proposed methods below may be applied separately or together with the reassignment methods proposed above.

In an exemplary embodiment, the serving base station may not perform reassignment of (the same or a different)

transport block when a time shorter than the processing time of the terminal remains until a timing at which the transmission of the UL data channel #2 is required. In this case, the terminal may not perform any operation.

In another exemplary embodiment, in case of the reassignment for the same transport block, the serving base station may reassign the transport block when a time shorter than the processing time of the terminal remains until the timing at which the transmission of the UL data channel #2 is required.

When the serving base station transmits two or more DL control channels for the same transport block, since they are the same transport block, all the procedures of encoding may not need to be performed again, and some procedures such as rate matching may be omitted. Therefore, the reassignment of the same transport block and the reassignment of another transport block may be distinguished, and whether or not reassignment is performed may be applied differently.

The terminal may receive a new DL control channel corresponding to the DL control channel instructing the terminal to multiplex the UCI and the transport block. In this case, the terminal may map the UCI and the transport block to different physical channels (i.e., the UCI to the UL control channel, and the transport block to the UL data channel) according to the proposed methods described above, or may transmit only the transport block on the UL data channel without transmitting the UCI. It is necessary to distinguish between the above cases because the time required for each procedure is different.

In an exemplary embodiment, the time required to process the UCI and the time required to process the transport block may be distinguished. Only when the terminal is given enough time to process the UCI, the terminal may map the UCI to the UL control channel or multiplex the UCI to the UL data channel.

Different procedures may be applied to the case where the terminal maps the UCI to the UL control channel and the case where the terminal maps the UCI to the UL data channel. However, for simplicity, the same processing time required for processing the UCI may be assumed. Therefore, the minimum processing time may mean a longer time among the times required for the two procedures (i.e., the procedure for the case of mapping the UCI to the UL control channel and the procedure for the case of mapping the UCI to the UL data channel).

Alternatively, the processing time for the terminal to map the UCI to the UL control channel and the processing time for the terminal to map the UCI to the UL data channel may be separately applied. The reason is that the terminal can multiplex the UCI with the transport block in the UL data channel #2 or can generate a new UL control channel and map the UCI to the new UL control channel according to the DL control channel #2 after the terminal starts the operation of multiplexing the UCI in the UL data channel #1 according to the DL control channel #1. If the terminal still transmits the UCI on the UL data channel (i.e., the UL data channel #2), the process of encoding the UCI and the process of rate matching, which have already been performed, may be reused. However, if the terminal transmits the UCI on the UL control channel, the process of encoding the UCI and the process of rate matching should be performed again.

Hereinafter, consider a case where the UL data channel is repeatedly transmitted. The serving base station may configure the number of repeated transmissions to the terminal through higher layer signaling or by a DL control channel. The serving base station may assign a UL data channel using a DL control channel, and the terminal may repeatedly transmit the UL data channel by the indicated repetition number. In this case, all repeated UL data channels may be transmitted using the same resource (e.g., allocated resource block, start symbol, number of allocated symbols, transmission power, and HARQ process identifier).

As described above, consider a case in which the terminal receives a DL control channel #1 assigning a UL data channel, and then receives a DL control channel #2 to reassign transmission for the same or different transport block. The following description and proposed methods may be easily applied to a different transport block as well as the same transport block.

Consider a case where the terminal finishes demodulation of the DL control channel #2 after the terminal has already transmitted the UL data channel #1. In addition, a case where the terminal finishes demodulation of the DL control channel #2 while transmitting the UL data channel #1 may be considered. After receiving the DL control channel #2, the terminal may demodulate the DL control channel #2 by consuming a predetermined time (e.g., a few symbol times) according to the capability of the terminal.

In an exemplary embodiment, only when all of the assigned UL data channel #1 or the (re)assigned UL data channel #2 is transmitted, the terminal may count this as transmitted. In case of transmitting the same transport block, the terminal may perform repeated transmissions until a sum of the number of transmissions of the UL data channel #1 and the number of transmissions of the UL data channel #2 becomes the number of times configured by the serving base station. On the other hand, in case of transmitting a different transport block, the terminal may count this as transmitted even though the UL data channel #1 is not transmitted.

If the terminal is still transmitting the UL data channel #1 at the time when the terminal demodulates the DL control channel #2, the terminal may no longer transmit the UL data channel #1. In this case, the terminal may not count the UL data channel #1 as transmitted. The serving base station should determine whether the terminal transmits the UL data channel #1 or the UL data channel #2 by predicting the time when the terminal finishes demodulation of the DL control channel #2. Therefore, depending on the implementation, the serving base station may have to perform both the operation of detecting the UL data channel #1 and the operation of detecting the UL data channel #2 in at least one slot. It is difficult to predict whether the serving base station will receive the UL data channel #1 because the transmission timing (i.e., timing advance) as well as the processing time of the terminal should be taken into consideration.

Hereinafter, a case in which the serving base station configures the terminal to perform a HARQ response by dividing one transport block into two or more code block groups (CBGs) through higher layer signaling. According to the DL control channel #1 assigning the transport block, the terminal may transmit the UL data channel #1. If the serving base station reallocates the corresponding transport block, the entire amount of resources occupied by the UL data channel #2 is large because the entire transport block is reallocated. However, since a case where the terminal can transmit some CBGs exists, allowing this case may consume a small amount of resources.

In an exemplary embodiment, if one transport block is configured with several (e.g., K) CBGs, the terminal is allowed to transmit some of the CBGs on the UL data channel #1, and the serving base station reassigns the remaining CBGs in the UL data channel #2. Here, it is assumed that there are no CBGs whose transmission is not instructed to the terminal or which are not reassigned to the terminal.

Figure 45:
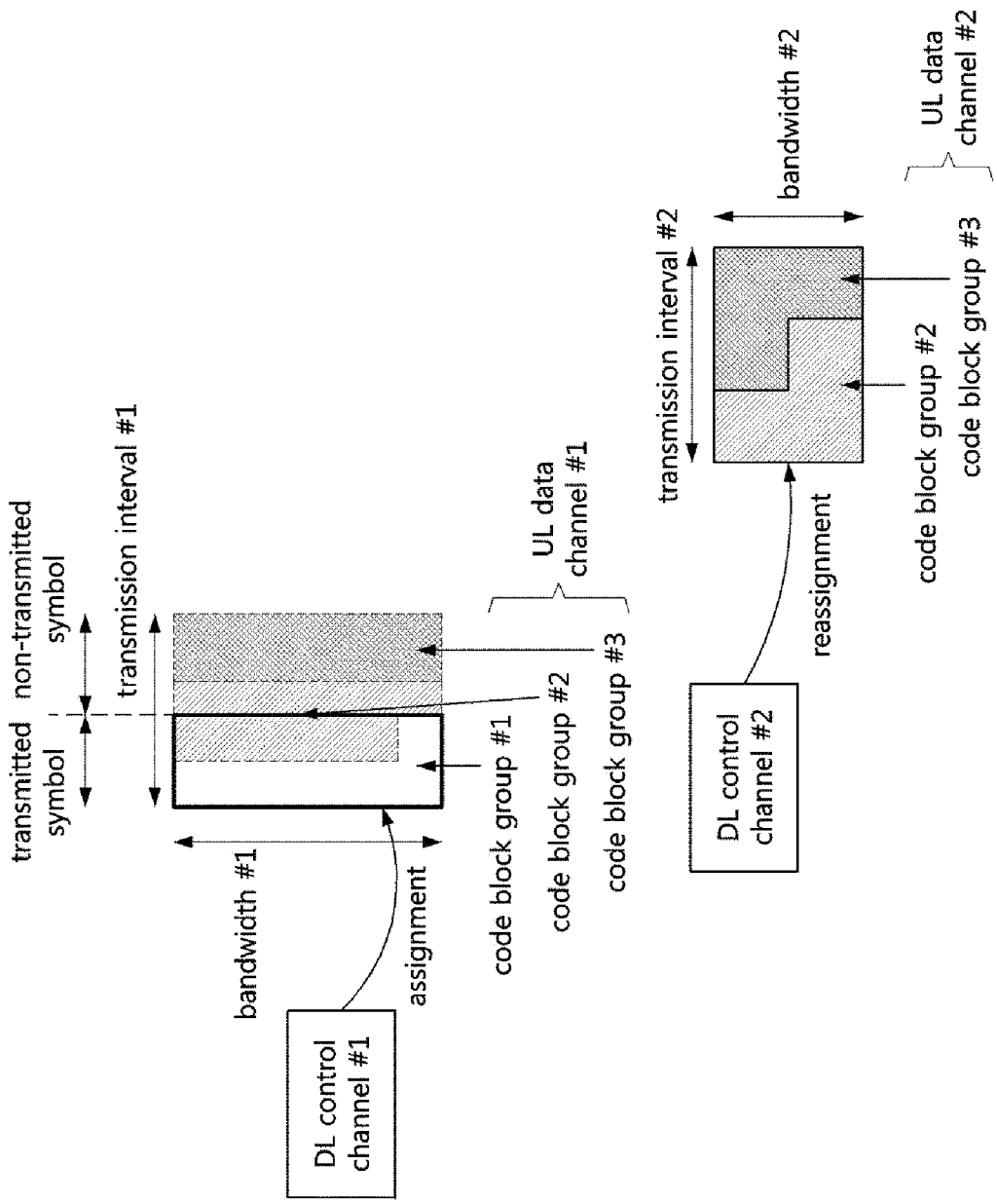
FIG. 45 is a conceptual diagram illustrating an exemplary embodiment considering CBG transmission in reassignment of a UL data channel using a DL control channel.

FIG. 45 is a conceptual diagram illustrating an exemplary embodiment considering CBG transmission in reassignment of a UL data channel using a DL control channel.

Referring to FIG. 45, an example of one transport block composed of three CGBs is shown. DM-RS is not shown for simplicity. The serving base station may reassign some CBGs constituting the same transport block, and the terminal may transmit only the reassigned CBGs. When the transport block is first transmitted on the UL data channel #1, the DL control channel #1 should instruct the terminal to transmit all the CBGs constituting the corresponding transport block on the UL data channel #1. Thereafter, the DL control channel #2 indicating reassignment may instruct the terminal to transmit only some of the CBGs. On the other hand, when the transport block is retransmitted on the UL data channel #1, the terminal may be instructed to transmit the entire transport block.

The DL control channel #1 instructs the terminal to divide the transport block into three CBGs and map the three CBGs to the UL data channel #1 for transmission. Then, the DL control channel #2 may instruct the terminal to transmit only the CBG #2 and the CBG #3, which are a portion of the CBGs, to the UL data channel #2. Since the terminal does not received any indication from the UL data channel #2 for the CBG #1, the terminal may transmit only the CBG #1 on the UL data channel #1 according to the indication of the DL control channel #1. The terminal may allocate resources for the CBG #2 and the CBG #3 according to the DL control channel #2. The resources allocated to the CBG #2 and the CBG #3 according to the DL control channel #2 may be different from the resources indicated by the DL control channel #1.

In an exemplary embodiment, when the terminal transmits a portion of the CBGs (e.g., CBG #1), the terminal may transmit all symbols to which the part of CBGs (e.g., CBG #1) are mapped on the UL data channel #1. Referring to FIG. 45, the CBG #1 and the CBG #2 may be mapped to the same symbol in the UL data channel #1. In this case, a portion of the CBG #2, a meaningless value, or a value previously promised with the serving base station (e.g., a specific sequence) is mapped to the corresponding symbol so that all subcarriers included in the symbol have data. If the subcarriers to which the CBG #2 is mapped are transmitted as being empty, a problem that power control varies from symbol to symbol may occur, and thus, it is difficult to generate a waveform of appropriate quality when the terminal transmits the UL data channel #1.

In another exemplary embodiment, the serving base station may instruct the terminal through the DL control channel #2 not to transmit all CBGs mapped to symbols from the part of CBG #2 on the UL data channel #1. Considering a case where the serving base station instructs the terminal to map the CBG #1 and the CBG #3 to the UL data channel #1 and map the CBG #2 to the UL data channel #2, the UL data channel #1 has a transmission power of zero in some symbols in the middle of a transmission interval (i.e., symbols to which the CBG #2 is mapped) and has a transmission power greater than zero in subsequent symbols (i.e., symbols to which the CBG #3 is mapped). Such the power control scheme is difficult for the terminal to process, and it is difficult to generate a waveform of appropriate quality.

Therefore, in the above exemplary embodiment, the serving base station determines a specific time to classify the symbols included in the UL data channel #1 into symbols transmitted before the specific time and symbols not transmitted after the specific time. The serving base station may generate the DL control channel #2 so that the terminal transmits all CBGs, which can be fully mapped to symbols classified into the symbols transmitted, on the UL data channel #1. The terminal may transmit a DM-RS of the UL data channel #1, which is mapped to the symbols transmitted on the UL data channel #1, but the terminal may not transmit a DM-RS of the UL data channel #1, which is mapped to the symbols not transmitted. For example, the terminal may be configured with a reference signal (i.e., front-loaded DM-RS) located in the front part and a reference signal (i.e., additional DM-RS) located in the middle part by higher layer signaling from the serving station. However, the terminal may not transmit the reference signal (i.e., additional DM-RS) located in the middle part according to the indication of the DL control channel #2.

Meanwhile, when the terminal is configured to perform frequency hopping for the UL data channel by higher layer signaling from the serving base station, a case in which CBGs exist over two frequency hops may occur. Therefore, depending on the scheduling of the serving base station, some or all of CBGs may exist in the first frequency hop. In order for the serving base station to configure the terminal to transmit the CBGs transmitted by the terminal after a specific timing in the second frequency hop, the corresponding CBGs may be preferably reassigned also to the second frequency hop. That is, this method is equivalent to the above-described method of reassigning the data channel to the terminal on a transport block basis. However, if one CBG exists only in one frequency hop, when the serving base station indicates CBGs transmitted by the terminal after a specific timing, the serving station may indicate the frequency hop which is the target of the retransmission in order to inform the terminal which CBGs are reassigned.

Hereinafter, consider a case where the UCI is mapped to the UL data channel #1.

If the terminal does not perform frequency hopping while transmitting the UL data channel #1 (or in the first frequency hop), the terminal may map all UCIs to front symbols of the UL data channel #1 (or the first frequency hop). In this case, the transport block or CBGs may be mapped to the UL data channel (or the first frequency hop) after the UCI is mapped. When the DM-RS is allocated to the additional location or even when the DM-RS is not allocated thereto, a rule for the terminal to map the UCI and the transport block or the CBGs may be the same. Meanwhile, the transport block or CBGs may be reassigned to the UL data channel #2 (or second frequency hop) by the DL control channel #2. Alternatively, all or all CBGs of the transport block may be reassigned by the DL control channel #2. According to the above method, the terminal may transmit the UCI using the UL control channel instead of the UL data channel #2.

Meanwhile, the terminal may map the DM-RS and the UCI to the UL data channel #1 and transmit necessary symbols (e.g., symbols including the DM-RS and symbols including all of UCI). In this case, since the remaining subcarriers may exist after mapping of the UCI in the symbols transmitted by the terminal, the terminal may select arbitrary values, values obtained from the transport block or CBG, or values previously indicated with the serving base station (e.g., specific sequence) to the remaining subcarriers.

Meanwhile, the terminal may receive a UL preemption indicator (i.e., UL PI) on the DL control channel. The UL PI is a specific format of a DL control channel, which the serving base station may transmit to an unspecified number of terminals. The terminals may receive information for receiving the UL PI through higher layer signaling. This information may include at least a format of the DL control channel, an identifier (RNTI), or an index of a search space, and may further include a position that the corresponding terminal should decode in a payload of the DL control channel.

The terminal decoding the UL PI from the DL control channel may not transmit all or part of the UL data channel if the terminal is transmitting the UL data channel.

The terminal may not transmit the UL data channel after a predetermined time from when the DL control channel (including the UL PI) is received. Here, the predetermined time may be indicated to the terminal through higher layer signaling, and the serving base station may determine the predetermined time in consideration of the processing capability of the terminal.

By using the UL PI, the serving base station may prevent terminals transmitting UL signals and UL channels having lower priorities from transmitting the corresponding UL signals and UL channels any more. As a result, terminals transmitting UL signals and UL channels having higher priorities may experience low interference. In order to determine the priorities of the UL signal and the UL channel, the serving base station may indicate them to the terminal using higher layer signaling, a format of the DL control channel, a search space, a radio identifier (RNTI), or the like.

Meanwhile, signals and channels that can be canceled by the UL PI may be limited to UL transmission. For example, the serving base station may dynamically multiplex UL and sidelink (SL) transmissions on the same carrier. When the terminal is configured to operation in a specific mode by higher layer signaling, the terminal may be instructed to transmit a UL signal and a UL channel, and may also be instructed to transmit a SL signal and a SL channel. In this case, the SL signal and the SL channel of the terminal may not be canceled by the UL PI. When the terminal transmits the SL signal and the SL channel, the terminal may not receive the UL PI or may not reflect it to the SL transmission even when receiving the UL PI.

The UL signal and the UL channel, whose transmission are stopped by reception of the UL PI, may be defined, and other UL signals and the UL channel may be transmitted even when the UL PI is received. That is, a low priority classified as the eMBB service and a high priority classified as the URLLC service may be distinguished.

When a resource is dynamically allocated by the DL control channel, the priority may be determined by a radio identifier scrambling the DL control channel, a search space of the DL control channel, a format of the DL control channel, or a value of a specific field of the DL control channel. When a resource is configured by higher layer signaling, the priority may be determined based on a logical channel group (LCG) determined by the higher layer, or the priority may be indicated by higher layer signaling. That is, in the above-described manner, transmission of the UL signal and the UL signal having a lower priority than the priority determined based on the DL control channel or LCG or indicated through higher layer signaling may be stopped.

The priorities for the DL signal and the DL channel may be applied to the UL signal and the UL channel corresponding to the DL signal and the DL channel as they are. For example, when a DL data channel is assigned by a DL control channel and a HARQ-ACK response thereto is fed back to the serving base station as a UL control channel, the priority of the UL control channel may follow the priority of the DL control channel. Further, if a priority for a transport block mapped to a semi-statically assigned DL data channel is derived by higher layer signaling, even when the HARQ-ACK response for the corresponding DL data channel is fed back to the serving base station through the UL control channel, the priority of the UL control channel may follow the priority of the DL control channel.

The UL data channel indicated by the UL grant may include the transport block and/or the CSI trigger. The priority of the transport block and the priority of the CSI may be given by a scrambling identifier (or RNTI), a search space, a format, or a value of a specific field of the UL grant (i.e., DL control channel). Therefore, the priority of the CSI may follow the priority of the DL control channel.

The transport block is also mapped to the UL data channel transmitted periodically, and which transport block the terminal should map to the UL data channel is indicated by higher layer signaling. Therefore, depending on the configuration by higher layer signaling of the serving base station (and activation using the DL control channel), the corresponding UL data channel may have a high priority or a low priority.

For an SRS triggered by the UL grant or the DL control channel, the priority of the SRS may be given by a scrambling identifier (or RNTI), a search space, a format, a value of a specific field, etc. of the UL grant or DL control channel. Therefore, the priority of the SRS may follow the priority of the DL control channel.

A UL physical random access channel (i.e., PRACH) may be transmitted according to the indication of the DL control channel. The priority of the UL random access channel may be given by a scrambling identifier (or RNTI), a search space, a format, a value of a specific field, etc. of the DL control channel. Therefore, the priority of the UL random access channel may follow the priority of the DL control channel.

The scheduling request has a correspondence with the LCG indicated by higher layer signaling. Therefore, the priority of the scheduling request is determined by higher layer signaling.

Therefore, when the terminal receives the UL PI, transmission of some HARQ-ACK response, some CSI, some SRS, some UL random access channel, and some transport blocks is canceled, but the remaining UL channels and UL signals may be transmitted without being canceled.

Figure 46:
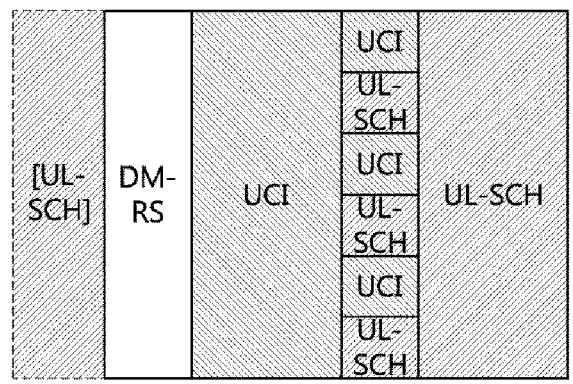
FIG. 46 is a conceptual diagram illustrating an example of a UL data channel in which UL-SCH and UCI are multiplexed.
Figure 46:
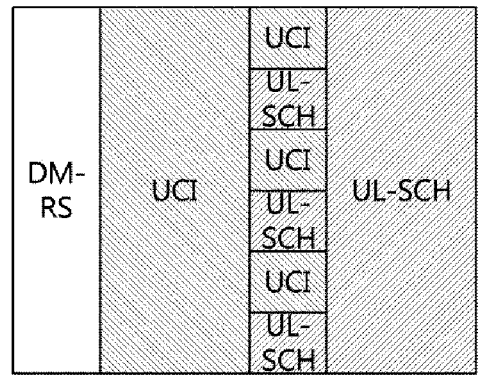

FIG. 46 is a conceptual diagram illustrating an example of a UL data channel in which UL-SCH and UCI are multiplexed.

Referring to FIG. 46, a case where UCI and a transport block (i.e., UL-SCH) are multiplexed in a UL data channel is shown. According to the conventional technical specification, if resources are allocated such that the UL data channel and the UL control channel overlap each other in some symbols, when the terminal has a sufficient processing time, the terminal may multiplex the UCI and the UL-SCH in the UL data channel. If either UL-SCH or UCI is allocated, it may be mapped to the UL data channel.

In (a) of FIG. 46, a first frequency hop (when frequency hopping is configured) of a UL data channel or the UL data channel (when frequency hopping is not configured) is illustrated. When the UL data channel is indicated to a mapping type A, the UL-SCH may be mapped to symbols preceding the symbol to which the DM-RS is mapped or the same symbol as the symbol to which the DM-RS is mapped. When the UL data channel is indicated to a mapping type B, the UL-SCH may be mapped to symbols after the symbol to which the DM-RS is mapped or the same symbol as the symbol to which the DM-RS is mapped. The UCI may be mapped from the next symbol of the symbol to which the DM-RS is mapped.

In (b) of FIG. 46, a second frequency hop (when frequency hopping is configured) of the UL data channel is shown. The DM-RS may be mapped to the first symbol constituting the second frequency hop.

Meanwhile, the UCI may occupy all or part of the next symbol of the symbol to which the DM-RS is mapped. If the UCI occupies only a part of the symbol, the UL-SCH may be mapped to the remaining subcarriers in the symbol. Here, the subcarriers occupied by the UCI may be mapped with a predetermined distance. In this case, frequency diversity gain can be obtained in the UL data channel.

When the terminal performs multiplexing of the UCI and the transport block in the UL data channel, the terminal may consider the low priority UCI (i.e., HARQ-ACK or CSI), the high priority UCI, and/or the transport block. Upon receipt of the UL PI, the terminal may identify a time and frequency region of a resource indicated by the UL PI. Therefore, the terminal compares the region of the resource indicated by the UL PI with the region of the resource through which the UL data channel is transmitted, and if some or all of the resources overlap, a method for solving this is needed.

The terminal should transmit only the UCI and/or transport block corresponding to the high priority without transmitting the UCI and/or transport block corresponding to the lower priority. If the terminal can acquire enough time to generate the UL data channel after the receiving the UL PI, the terminal may map only the UCI and/or transport block corresponding to the high priority to the UL data channel. However, if not (i.e., when the timing of receiving the UL PI is during the transmission of the UL data channel or after the UL data channel has already been generated), it may be difficult for the terminal to perform the mapping operation on the UL data channel. In this case, the terminal may not transmit a part of the UL data channel, and may transmit the remaining part of the UL data channel.

In an exemplary embodiment, the terminal may not transmit a symbol consisting of only the low priority UCI among the symbols constituting the UL data channel. Therefore, the terminal may transmit a symbol composed of the low priority UCI and the high priority UCI and/or the transport block as it is. In case of being configured by higher layer signaling to perform frequency hopping, the terminal may transmit only the UCI and/or transport block having the high priority with DM-RS for each frequency hop in the UL data channel.

For example, when the low priority HARQ-ACK and the high priority HARQ-ACK and/or the transport block are mapped to the UL data channel, the terminal may not transmit a symbol consisting of only the HARQ-ACK having the low priority.

For example, when the low priority HARQ-ACK and the high priority CSI and/or HARQ-ACK and/or the transport block are mapped to the UL data channel, the terminal may not transmit a symbol consisting of only the HARQ-ACK having the low priority.

For example, when the low priority transport block and/or CSI and/or HARQ-ACK and the high priority HARQ-ACK are mapped to the UL data channel, the terminal may not transmit a symbol consisting of only the low priority transport block and/or CSI and/or HARQ-ACK.

The terminal may repeatedly transmit the UL data channel or the UL control channel. In this case, upon detecting the UL PI, the terminal may cancel some UL transmissions. However, even though UL transmission is canceled since the UL transmission belongs to the UL reference resource indicated by the UL PI, the terminal may resume the UL transmission in a time resource (i.e., slot or mini-slot) thereafter. In this case, the number of transmissions is counted as including the UL transmission canceled by the UL PI, and the number of times the terminal actually transmits the UL channel may be smaller than the number of times indicated to the terminal.

Hereinafter, a case in which HARQ-ACK is mapped to the UL data channel will be described. The HARQ-ACK and UL-SCH may be mapped and multiplexed to the UL data channel. However, for the HARQ-ACK multiplexed to the eMBB UL data channel, when the UL PI is received, the eMBB UL data channel may be canceled without being transmitted. That is, the terminal may not transmit both the UL-SCH and the HARQ-ACK. Here, HARQ-ACK may be obtained from an eMBB DL data channel, or may be obtained from a URLLC DL data channel.

This canceled HARQ-ACK codebook(s) may be difficult to be transmitted even in the UL control channel. Thus, the serving base station may reassign all of the DL data channels, but this has a longer delay. Therefore, a method for transmitting the canceled HARQ-ACK codebook(s) is needed.

In an exemplary embodiment, feedback timing of the canceled HARQ-ACK codebook(s) may be changed to a UL data channel or a UL control channel that the terminal first transmits.

In case of a codebook whose size is dynamically changed (e.g., type 2 codebook), DCI (i.e., UL grant or DL assignment) may include a DAI. The DAI may be indicated in the DCI in consideration of the size of the codebook that has been already cancelled. By including a UL control channel resource index in the DCI transmitted to the terminal, the serving base station may preferably indicate the terminal of a resource having a size obtaining a sufficient error rate even when the size of the previously canceled codebook is taken into account.

If the size of the codebook is configured by higher layer signaling (e.g., type 1 codebook), the size of the HARQ-ACK codebook included in the UL control channel (or UL data channel) transmitted by the terminal may or may not be changed.

In an exemplary embodiment, the terminal may transmit the HARQ-ACK codebook(s) that could be transmitted on the canceled UL control channel (or UL data channel) by including it again in a new UL data channel (or UL control channel). In this case, when the terminal is assigned the new UL data channel, the DAI of the UL grant is used to map the canceled HARQ-ACK codebook(s) to the UL data channel. Here, the terminal may multiplex not only the canceled HARQ-ACK codebook but also the HARQ-ACK codebook transmitted when transmitting the UL data channel, and may map them to the UL data channel. In this case, the number of HARQ-ACK bits included in the UL data channel may be larger than the number indicated by higher layer signaling.

In another exemplary embodiment, according to a value of a specific field of the UL grant, the terminal may map the canceled HARQ-ACK codebook or the HARQ-ACK codebook transmitted when the corresponding UL data channel is transmitted to the corresponding UL data channel. Here, the specific field of the UL grant may indicate one or two HARQ-ACK codebooks in form of a bitmap or one or two HARQ-ACK codebooks in form of a code point (or index). That is, a certain index may indicate one specific HARQ-ACK codebook and another index may indicate two specific HARQ-ACK codebooks.

In yet another exemplary embodiment, the terminal may transmit only the canceled HARQ-ACK codebook on the UL data channel. The serving base station may transmit the UL grant so that the terminal transmits the UL data channel in a time resource through which the terminal does not feed back the HARQ-ACK codebook. That is, when the terminal knows not to feed back the HARQ-ACK codebook at the time of transmitting the UL data channel (i.e., slot, subslot, or mini-slot), the terminal may map not the new HARQ-ACK codebook but the canceled HARQ-ACK codebook to the UL data channel.

The terminal may cancel all or part of the UL transmission after a predetermined time from the time when the UL PI is received on the DL control channel. The UL transmission may mean a UL data channel or a UL control channel including either UL-SCH or UCI. If resources of the UL data channel and the UL control channel associated with the UCI overlap each other in time, the UCI may be multiplexed with the UL-SCH and mapped to the UL data channel.

When the terminal cancels the transmission of the UL data channel by the UL PI, both the UCI and the UL-SCH may be cancelled. However, the UL PI may not cancel transmission of the UL control channel. Therefore, when decoding of the UL PI is completed, the terminal may perform the multiplexing process of the UCI and the UL-SCH again using a predetermined time.

Hereinafter, a timing at which the UL PI is applied when the UCI and the UL-SCH are multiplexed will be described.

Figure 47:
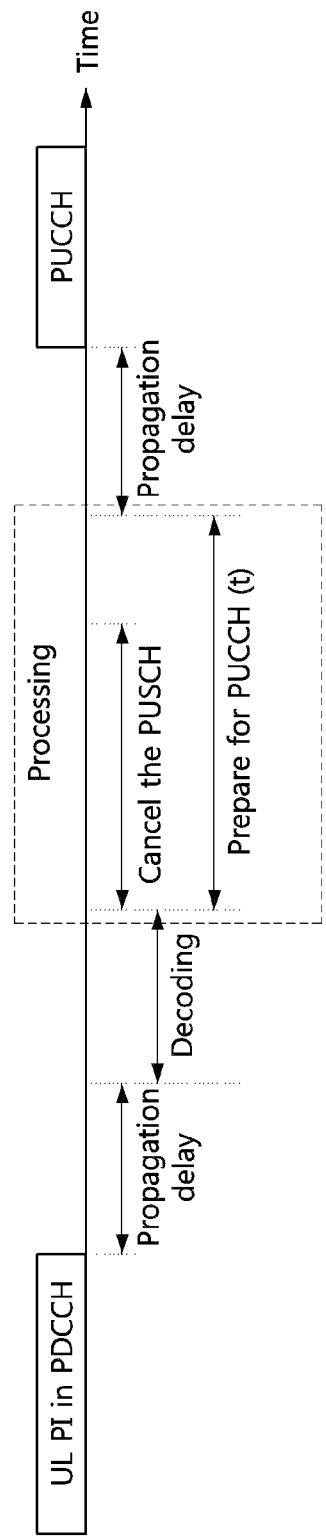
FIG. 47 is a timing diagram when a UL data channel is canceled by a UL PI and a UL control channel is transmitted.

FIG. 47 is a timing diagram when a UL data channel is canceled by a UL PI and a UL control channel is transmitted.

Referring to FIG. 47, a timing for which the terminal receives a UL PI, cancels transmission of a UL data channel, and prepares and transmits a UL control channel is illustrated. From the timing at which the UL PI is received, a predetermined time is required for the terminal to cancel transmission of the UL data channel including the UCI and to transmit the UCI by map the UCI to the UL control channel.

In an exemplary embodiment, after completing the multiplexing procedure of the UCI and the UL-SCH, the terminal may identify a time/frequency resource in which a UL reference resource indicated by the UL PI and the UL data channel overlap with each other. If the UL reference resource indicated by the UL PI has a time/frequency resource overlapping the UL data channel, the terminal may not transmit all or part of the UL data channel.

In this case, the terminal may determine whether to transmit the UL data channel by checking the position of the resource indicated by the UL PI. However, since the UCI may be transmitted not only on the UL data channel but also on a UL control channel, even if the UL data channel is not transmitted by the UL PI, it is preferable to check whether the UCI can be transmitted on the UL control channel instead.

In another exemplary embodiment, before completing the multiplexing procedure of the UCI and the UL-SCH, the terminal may identify whether the UL reference resource indicated by the UL PI and the UL data channel have a time/frequency resource in which they overlap each other. That is, the terminal may identify whether the resource of the UL data channel to be transmitted by the terminal and the UL reference resource indicated by the UL PI overlap each other in time/frequency resources. If it is determined that the resource of the UL data channel and the UL reference resource indicated by the UL PI overlap each other, the terminal may not consider the UL data channel any longer in the multiplexing procedure and may consider only the UCI in the multiplexing procedure. Therefore, the UCI may be mapped to the UL control channel, and the terminal may not need to perform the encoding and mapping procedure of the UL-SCH any longer.

Meanwhile, consider a case in which the terminal does not transmit the UL data channel any longer because the time/frequency resource of the UL data channel and the UL reference resource indicated by the UL PI overlap each other while the terminal transmits the UL data channel in which the UCI and the UL-SCH are multiplexed.

Figure 48:
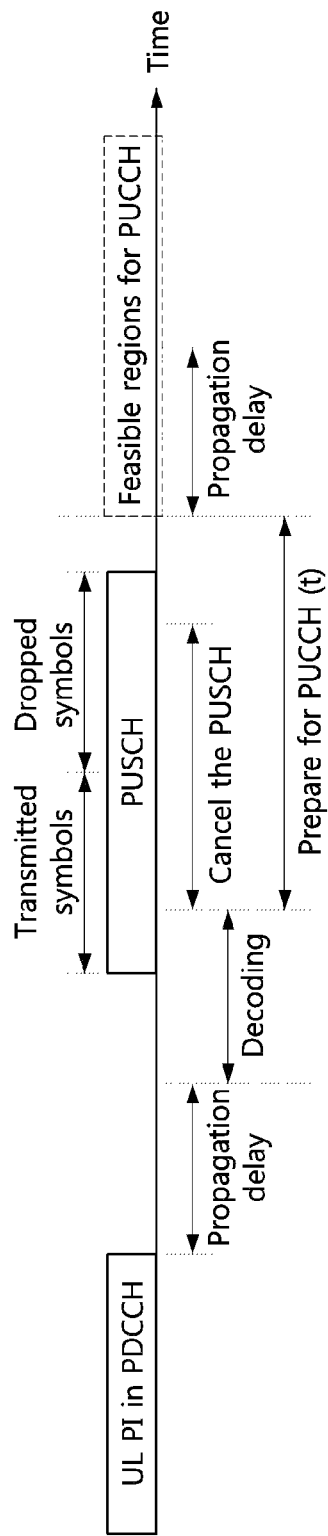
FIG. 48 is a conceptual diagram illustrating a time domain of a UL control channel that can be transmitted when a UL data channel is canceled by a UL PI and a UL control channel is transmitted.

FIG. 48 is a conceptual diagram illustrating a time domain of a UL control channel that can be transmitted when a UL data channel is canceled by a UL PI and a UL control channel is transmitted.

Referring to FIG. 48, when the terminal transmits the UL control channel without transmitting all or part of the UL data channel, a valid time domain in which the UL control channel can be transmitted is illustrated.

In an exemplary embodiment, the terminal may retransmit the UL control channel associated with the UCI, which the terminal considered before mapping the UCI to the UL data channel. After canceling the UL data channel, the terminal may identify whether the UL control channel can be transmitted within a predetermined time.

Consider a case in which the terminal cannot transmit the UL control channel. Like a case in which a time resource of the UL control channel has already started or a timing according to timing advance for transmitting the UL control channel has already passed, there may be a case in which the resource is invalidated and the terminal cannot transmit the UL control channel. For example, the terminal cannot transmit the UL control channel because the terminal needs a predetermined processing time to generate the UL control channel. Except in this case, the terminal may transmit the UL control channel.

In order for the terminal to cancel transmission of the UL data channel and to map the UCI mapped to the UL data channel to the UL control channel again, a predetermined time is required. This is because the code rate when the UCI is mapped to the UL data channel and the code rate when the UCI is mapped to the UL control channel may be different. For example, when the UCI is mapped to the UL data channel, the code rate of polar coding and rate matching scheme is determined according to a MCS or beta offset indicated by the UL grant. For example, when the UCI is mapped to the UL control channel, the code rate of polar coding and rate matching scheme is indicated by higher layer signaling. However, for each type of UCI (i.e. SR, CSI, or HARQ-ACK) or a combination thereof, only a required amount of coded bits from one long codeword generated through polar encoding may be mapped to the UL data channel or the UL control channel. Therefore, since it is not necessary to perform new polar encoding for the same UCI, the predetermined time required for the terminal is short.

This predetermined time may be given as the number t of symbols for a given subcarrier spacing. In the technical specification, a value of t is fixed so that the terminal and the serving base station generate the UL control channel by using the same t.

As described above, when sufficient time is not given to the terminal, the terminal may not perform the procedure for generating the UL control channel. That is, in some cases, the terminal may not need to generate the UL control channel.

In another exemplary embodiment, when transmission of all or part of the UL data channel is canceled for application of the UL PI, there may be a case where all of the UCI has been transmitted through some symbols already transmitted by the terminal. This case may occur when the UCI is mapped to the front part of the UL data channel if frequency hopping is not performed in the UL data channel. In this case, the terminal may not need to generate the UL control channel.

2-Step RACH Procedure

According to the conventional method, the terminal performs a random access procedure consisting of four or more steps with the base station to access the base station. The base station periodically transmits a synchronization signal block (SSB) and system information to a plurality of unspecified terminals. In particular, the system information (i.e., system information block 1 (SIB1)) includes a position and transmission parameters of radio resources required when the terminal performs random access for initial access.

In the first step of the initial access procedure, the terminal transmits a PRACH preamble to the base station. In the second step of the initial access procedure, the base station transmits a random access response (RAR) to the terminal(s) using a PDSCH. In the third and fourth steps of the initial access procedure, the terminal and the base station may perform the remaining procedures (random access data transmission and contention resolution procedure, etc.).

Meanwhile, according to configuration of the serving base station, the terminal may perform the random access in four conventional steps or may perform the random access in two steps. In the procedure of performing the random access in two steps, a UL message and a DL message exchanged between the terminal and the base station are classified into a message A and a message B, respectively. The terminal may transmit the message A to the base station, and the base station may transmit the message B in response thereto. Here, the base station may be a serving base station or another base station (e.g., a target base station in handover).

When the random access is performed in two steps, the random access may be performed more quickly than in the case of performing random access in the conventional four steps. This approach may be used in an unlicensed band, when transmitting small data with a very long periodicity, or in the process of handover.

The message A is configured with a random access preamble (PRACH preamble) multiplexed with PUSCH(s). The PUSCH belonging to the message A may be repeatedly transmitted several times. The message B is composed of a PDSCH (and PDCCH).

In an exemplary embodiment, the terminal may transmit the message A regardless of a UL PI.

When the terminal receives the DL control channel carrying the UL PI from the serving base station, although the terminal receives and decodes the UL PI and is indicated that another terminal transmits a URLLC PUSCH, the terminal may transmit the message A. This is because information transmitted in the message A may be judged to be more important. That is, the message A is not affected by the UL PI and is not canceled by the UL PI.

On the other hand, when the UL PI is not configured to the terminal, or even when the UL PI is configured to the terminal, the terminal may not receive the UL PI. The terminal may observe the UL PI for a predetermined time before performing UL transmission (e.g., all or part of PUSCH, PUCCH, SRS, etc.) that can be cancelled. However, the terminal may not observe the UL PI before performing UL transmission (e.g., all or part of PUSCH, PUCCH, SRS, etc.) that cannot be cancelled. Therefore, the terminal may not observe the UL PI before transmitting the message A, and may transmit the message A regardless of the UL PI. That is, the message A may correspond to the UL transmission that cannot be cancelled.

In another exemplary embodiment, the terminal may not transmit all or part of the message A according to the UL PT.

If the terminal receives the UL PI and determines that the position of the resource of the UL data channel indicated by the received UL PI overlaps all or part of the message A, the terminal may not transmit the message A. This is because the priority of the URLLC PUSCH may be determined to be higher than the message A.

The PRACH preamble constituting the message A may be canceled by the UL PI. In this case, in order to transmit the PRACH preamble, the terminal should wait for a resource allocated in the next period. In this case, since the PRACH preamble has not been transmitted, the counter counting the number of times of transmitting the PRACH preamble may be returned to the previous value. In addition, when the terminal retransmits the PRACH preamble, a transmission power used immediately before may be applied. The reason is that the two-step (or four-step random access procedure has not been started because the first resource constituting the message A was canceled.

Alternatively, the PRACH preamble constituting the message A may not be canceled, and only the UL data channel (i.e., PUSCH) constituting the message A may be canceled by the UL PT.

The terminal may receive the UL PI before or during transmission of one or more PUSCHs constituting the message A, and the PUSCH allocated to the corresponding resource may be canceled by the UL PI. If the transmission of the PUSCH constituting the message A is canceled, the terminal may normally transmit the remaining PUSCHs constituting the message A (i.e., in case of repetitive transmission), or cancel all the remaining PUSCHs.

The PUSCH constituting the message A may be canceled by the UL PI or may always not be canceled according to an RNTI used by the terminal. For example, a PUSCH indicated by a DL control channel scrambled with a common RNTI (e.g., RA-RNTI, Message A-RNTI) may not be canceled by the UL PI, but all or part of a PUSCH indicated by a DL control channel scrambled with a C-RNTI may be canceled by the UL PI.

In an exemplary embodiment, the terminal may transmit or cancel all the PUSCHs constituting the message A according to the UL PI.

When the terminal performs cancellation according to the UL PI while transmitting the PUSCH constituting the message A, a part of the corresponding PUSCH and all of the subsequent PUSCHs may also be cancelled. That is, after the terminal transmits the PRACH preamble constituting the message A and transmits a part of the PUSCH constituting the message A, if the part of the PUSCH is canceled by the UL PI, the terminal may not transmit the remaining part of the corresponding PUSCH (i.e., the remaining symbols of the corresponding PUSCH and the remaining PUSCHs to be repeatedly transmitted. In this case, the terminal may count the message A as not transmitted according to the UL PI. Therefore, the terminal may re-adjust a transmission counter for the canceled message A (i.e., a counter that counts the number of transmissions of the PUSCH). In addition, the terminal may maintain a transmission power just before, without increasing a power for transmitting the message A (i.e., the transmission power of the PUSCH).

Thereafter, the terminal may perform a new 2-step random access procedure, or may perform a 4-step random access procedure.

The terminal may select (repeated) transmission resources of a new PUSCH in order to perform a new 2-step random access procedure. Then, the terminal may select a PUSCH resource associated with the previously-transmitted PRACH preamble to (repeatedly) transmit the PUSCH. Alternatively, the terminal may select a time resource of a new PRACH preamble. The terminal may transmit the message A from the step of newly transmitting the PRACH preamble.

In order to perform the 4-step random access procedure, since the terminal canceled the PUSCH transmission, the terminal should observe a random access response (RA response) to be transmitted by the base station.

In an exemplary embodiment, the terminal may cancel only part of the message A according to the UL PI.

The PRACH preamble may be transmitted without being canceled, and only the transmission corresponding to the resource indicated by the UL PI among the time resources constituting the (repeated) transmissions of the PUSCH constituting the message A may be canceled. For example, when the terminal is instructed to repeatedly transmit the PUSCH constituting the message A, the terminal may perform transmission of PUSCHs that do not overlap with the resource indicated by the UL PI.

The terminal may re-adjust a transmission counter for the canceled message A (i.e., a counter that counts the number of transmissions of the PUSCH). That is, the terminal may repeatedly transmit the PUSCH as many times as previously indicated.

On the other hand, the terminal may not adjust the transmission counter for the canceled message A. In this case, the terminal may repeatedly transmit the PUSCH less than the number of times previously indicated. In this case, since the number of times of reception of the PUSCH is reduced, the base station may fail to decode the PUSCH even if the remaining transmissions of the PUSCH are used.

In an exemplary embodiment, if all or part of the PUSCH constituting the message A is canceled, the terminal may fall back to a 4-step random access procedure.

After transmitting the PRACH preamble to the base station, the terminal may transmit the PUSCH constituting the message A and may not transmit some PUSCHs according to the UL PI.

Thereafter, the terminal may perform a 4-step random access procedure without retransmitting the message A (i.e., PUSCH belonging to the message A). That is, since the base station received the PRACH preamble from the corresponding terminal, but did not succeed in decoding the PUSCH constituting the message A, the base station may transmit a random access response to the terminal.

In order to support this, even though the terminal has not transmitted all the PUSCHs constituting the message A to the base station, if the terminal receives the UL PI and cancels all or part of the PUSCHs, the terminal may observe the message B from the base station. The random access response belonging to the message B corresponds to a message 2 (Msg2) in the 4-step random access procedure. In order to receive the message B, the terminal may observe a DL control channel (i.e., PDCCH) by using an RNTI (e.g., RA-RNTI) used in the 4-step random access procedure or an RNTI used in the 2-step random access procedure. If the base station transmits the message B, the terminal may decode the PDCCH scrambled with a predetermined RNTI, and may decode a PDSCH (i.e., the message B or the random access response belonging to the message B) in a resource indicated by the PDCCH.

A time interval for the terminal to receive the message B (i.e., time interval for performing observation for reception) (i.e., RAR window) may be started in a slot in which the UL PI is received. The reason is that because the 2-step random access procedure is switched to the 4-step random access procedure from the timing at which the terminal could not transmit the message A (i.e., the slot in which the UL PI is received), the terminal can receive the message 2 (i.e., random access response) of the 4-step random access procedure from the corresponding timing.

Alternatively, the time interval in which the terminal performs the observation for receiving the message B may be started in the slot in which the terminal transmits the PRACH preamble. Since the terminal performs the 4-step random access procedure by the UL PI, a window for receiving the message 2 (i.e., random access response) of the 4-step random access procedure according to the conventional method may be started from the slot in which the PRACH preamble is transmitted.

If a search space (and CORESET) for receiving the DL PI is not configured, the terminal may not observe the DL PI. This case may occur when the terminal performs the 2-step random access procedure with a base station other than the serving base station, when the terminal transitions from an RRC inactive state to an RRC active state, or the like. In this case, the terminal may not receive the message B regardless of the DL PI.

On the other hand, if a search space (and CORESET) for receiving the DL PI is configured, the terminal may receive the DL PI from the serving base station, and when the resource indicated by the DL PI overlaps with all or part of the resource of the PDSCH already received, the terminal may delay decoding of the PDSCH or cancel the decoding of the PDSCH. This case may occur when the terminal performs the 2-step random access procedure with the serving base station.

In an exemplary embodiment, the terminal may receive the message B regardless of the DL PI.

The terminal may not receive the DL PI while performing the 2-step random access procedure. Alternatively, the terminal may determine that the priority of the PDSCH including the message B is high, and even when the resource indicated by the DL PI overlaps all or part of the PDSCH including the message B, the terminal may not reflect this.

In this case, the DL PI has no effect on reception of the message B. The terminal predicts that the message B will be received in the RAR window.

In another exemplary embodiment, the terminal may not receive a part of the message B according to the DL PI.

The terminal may not receive (or decode) a part of the message B when all or part of the resource indicated by the DL PI and the resource of the PDSCH to which the message B is mapped overlap. Since the terminal determines that the priority of the PDSCH constituting the message B is low, the terminal may cancel reception (or decoding) of a part of the PDSCH constituting the message B by the DL PI.

The PDSCH constituting the message B may be canceled by the DL PI or may always not be canceled according to an RNTI used by the terminal. For example, the PDSCH indicated by the DL control channel scrambled with a common RNTI (e.g., RA-RNTI, TC-RNTI, Message B-RNTI) may not be canceled by the DL PI, but all or part of the PDSCH indicated by the DL control channel scrambled with C-RNTI may be canceled by the DL PI.

In this case, the DL PI has a great influence on the reception of the message B, and the RAR window may change according to the DL PI.

In an exemplary embodiment, the RAR window for receiving the message B may be changed according to the DL PI.

Since the base station and the terminal know that the PDSCH constituting the message B has been canceled by the DL PI, the base station and the terminal may increase the size of the RAR window. For example, the size of the RAR window may be increased by one slot. The reason is that although the base station should deliver the message B to the terminal within the RAR window, it should be reflected that the corresponding PDSCH has been canceled due to the transmission of the DL PI.

In another exemplary embodiment, the RAR window for receiving the message B may be maintained regardless of the DL PI.

Although the base station did not transmit the message B due to the DL PI, the base station may not change the size of the RAR window. Accordingly, the base station (or technical specification) may configure the size of the RAR window to be large enough so that the message B can be delivered within the RAR window even if the DL PI cancels the message B (multiple times). In this case, the terminal may not need to observe the DL PI in the process of receiving the message B.

In the message B, responses to one or more terminals are multiplexed and transmitted on one DL-SCH. The response is classified into the RAR or a backoff indicator, and the RAR is further classified into a success RAR and a fallback RAR. The success RAR includes identification information of the terminal that has successfully resolved contention in the 2-step random access procedure, and the fallback RAR includes the RAR according to the conventional 4-step random access procedure so that the 4-step random access procedure can be performed.

The terminal receives and decodes the message B, and searches for the RAR associated with the terminal from a MAC subheader in the DL-SCH.

The success RAR includes at least identification information (i.e., contention resolution ID) of the terminal which has successfully resolved the contention, and further includes a physical resource used by the terminal to transmit a HARQ-ACK (ACK or ACK/NACK). Therefore, the success RAR may include information on an index (i.e., PRI) of a resource through which a PUCCH can be transmitted and a feedback timing (i.e., slot offset, mini slot offset, or subslot offset) at which the PUCCH is transmitted. However, not all terminals use the PUCCH resource indicated by the success RAR. Some terminals may derive a PUCCH resource from a DL control channel (PDCCH) indicating transmission of the message B by using a combination of an index of a CCE to which the DCI is mapped and a PRI indicated by the DCI.

On the other hand, since the terminal receiving the fallback RAR falls back to the 4-step random access procedure, it is not necessary to transmit a separate HARQ-ACK to the base station. In addition, the terminal receiving the backoff indicator may not need to transmit a separate HARQ-ACK to the base station.

The terminal may transmit the HARQ-ACK (or ACK when the success RAR corresponding to the message B is found in the message B) to the base station using the PUCCH. The resource of the PUCCH is indicated by the base station that has received the message A. Such the resource (or, resource set) may be indicated to the terminal by system information or (dedicated) RRC signaling.

In an exemplary embodiment, the terminal may use a PUCCH resource set defined in a SIB 1.

The SIB 1 corresponds to RRC information transmitted from the base station to a plurality of unspecified terminals in a broadcast form. The SIB 1 includes one index (PRI) among a set of PUCCH resources defined in the technical specification. The terminal may determine one PUCCH resource using an index (PRI) (and/or an index of CCE of the PDCCH) received through the SIB1 assigning the message B.

Since the terminal can receive SIB1 from an arbitrary base station, the terminal may not necessarily receive the message B only from the serving base station. For example, when the terminal performs handover, the random access procedure may be performed with a target base station (not source base station or serving base station) using the 2-step random access procedure. This is because information on the PUCCH resource set for the message B is given to the terminal from the target base station. Information on a base station (or cell) from which the terminal should receive the SIB1 may be notified when the serving base station instructs the terminal to perform the 2-step random access procedure.

In the process that the terminal decodes the message B, the above-described method may be applied when an RNTI (e.g., RA-RNTI) is commonly given to two or more terminals.

In another exemplary embodiment, the terminal may use a PUCCH resource set configured by (dedicated) RRC signaling.

The serving base station may configure a PUCCH resource set used when the terminal feeds back a HARQ-ACK for a PDSCH through RRC signaling. The terminal may determine one PUCCH resource from an index of a CCE to which the PDCCH (i.e., DCI) which assigns the message B is mapped and a PRI of the DCI.

In the above-described method, since the terminal should receive dedicated RRC signaling from the base station, the message B should be received from the serving base station. For example, when the terminal performs beam failure detection (and recovery) or RRC state transition (e.g., from the RRC inactive state to the RRC active state), the terminal may use the 2-step random access procedure to recover a beam. This is because the PUCCH resource set for the message B is given to the terminal from the serving base station.

When a unique RNTI (e.g., C-RNTI) is given in the process of decoding the message B by the terminal, the above-described method may be applied.

In an exemplary embodiment, when the 2-step random access procedure is configured for the terminal, SIB1 or RRC signaling may be selected, and the terminal may feed back the HARQ-ACK for the message B by using the PUCCH resource set derived from the SIB1 or RRC signaling.

The serving base station may identify an entity indicating the PUCCH resource set when configuring the 2-step random access procedure to the terminal. That is, the entity indicating the PUCCH resource set may be configured to the terminal as the serving base station or another base station by higher layer signaling. Accordingly, the terminal may be informed of the PUCCH resource set by the serving base station or another base station. The PUCCH resource set may be indicated to the terminal through dedicated RRC signaling or system information.

In this method, the serving base station may distinguish between a case of the random access procedure between the serving base station and the terminal (e.g., beam failure recovery or RRC state transition) and a case of the random access procedure between another base station and the terminal (e.g., handover).

Figure 49:
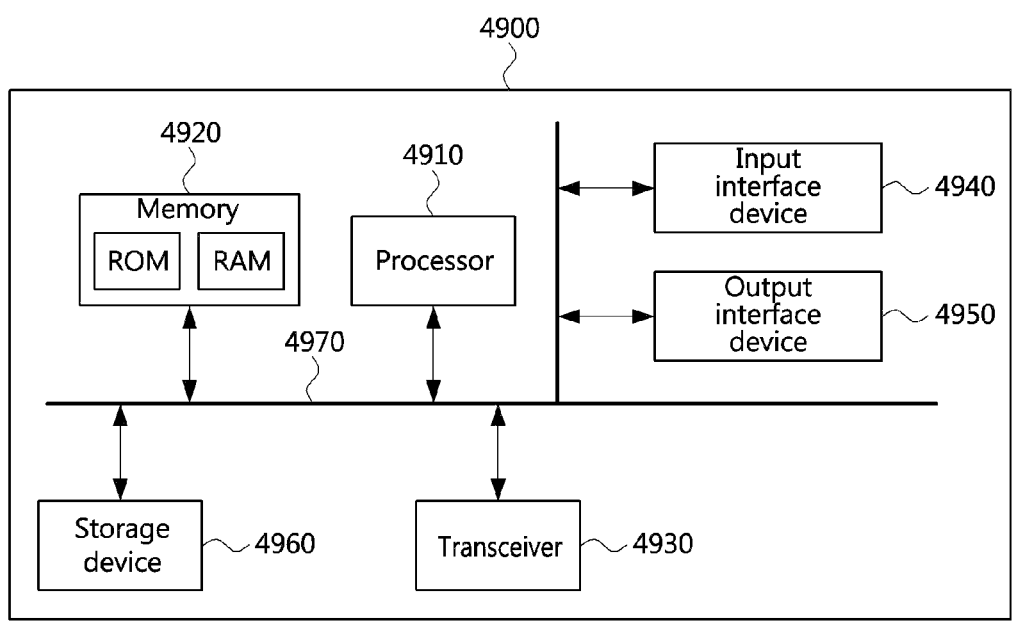
FIG. 49 is a block diagram illustrating an apparatus for performing methods according to exemplary embodiments of the present invention.

FIG. 49 is a block diagram illustrating an apparatus for performing methods according to exemplary embodiments of the present invention.

The apparatus illustrated in FIG. 49 may be a communication node (terminal or base station) for performing the methods according to an exemplary embodiment of the present invention.

Referring to FIG. 49, a communication node 4900 may include at least one processor 4910, a memory 4920, and a transceiver 4930 connected to a network to perform communications. In addition, the communication node 4900 may further include an input interface device 4940, an output interface device 4950, a storage device 4960, and the like. The components included in the communication node 4900 may be connected by a bus 4970 to communicate with each other.

The processor 4910 may execute at least one instruction stored in at least one of the memory 4920 and the storage device 4960. The processor 4910 may refer to a central processing unit (CPU), a graphics processing unit (GPU), or a dedicated processor on which the methods according to the exemplary embodiments of the present invention are performed. Each of the memory 4920 and the storage device 4960 may be configured as at least one of a volatile storage medium and a nonvolatile storage medium. For example, the memory 4920 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A random access method performed by a first terminal, the random access method comprising:
    transmitting a message A to a base station;
    receiving a message B from the base station; and
    in response to that a success random access response (RAR) corresponding to the message A is found in the message B, transmitting a hybrid automatic repeat request-acknowledgement (HARQ-ACK) to the base station by using a physical uplink control channel (PUCCH),
    wherein the HARQ-ACK is transmitted when a physical downlink control channel (PDCCH) scheduling the message B is indicated by a radio network temporary identifier (RNTI) commonly applied to two or more terminals including the first terminal.

2. The random access method according to claim 1, wherein a resource set of the PUCCH is indicated by the base station through system information or dedicated radio resource control (RRC) signaling.

3. The random access method according to claim 1, wherein the message B is in a physical downlink shared channel (PDSCH) scheduled by the physical downlink control channel (PDCCH), and the HARQ-ACK is transmitted to the base station when the success RAR corresponding to the message A is included in the PDSCH.

4. The random access method according to claim 3, further comprising:
    receiving a downlink preemption indicator (DLPI) from the base station; and
    in response to that a resource indicated by the DL PI fully or partially overlaps with a resource of the PDSCH, cancelling reception or decoding of at least part of the PDSCH.

5. The random access method according to claim 1, wherein the message A includes a physical random access channel (PRACH) preamble and a physical uplink shared channel (PUSCH).

6. The random access method according to claim 5, wherein the PUSCH is transmitted regardless of reception of an uplink preemption indicator (ULPI).

7. A random access method performed by a base station, the random access method comprising:
    receiving a message A from a first terminal;
    transmitting a message B to the first terminal; and
    receiving a hybrid automatic repeat request-acknowledgement (HARQ-ACK) from the first terminal by using a physical uplink control channel (PUCCH),
    wherein the HARQ-ACK is received when a success random access response (RAR) is decoded by the first terminal, and a physical downlink control channel (PDCCH) scheduling the message B is indicated by a radio network temporary identifier (RNTI) commonly applied to two or more terminals including the first terminal.

8. The random access method according to claim 7, wherein a resource set of the PUCCH is indicated by the base station through system information or dedicated radio resource control (RRC) signaling.

9. The random access method according to claim 7, wherein the message B is in a physical downlink shared channel (PDSCH) scheduled by the physical downlink control channel (PDCCH), and the HARQ-ACK is received from the first terminal when the success RAR corresponding to the message A is included in the PDSCH.

10. The random access method according to claim 9, further comprising:
    transmitting a downlink preemption indicator (DLPI) to the first terminal; and
    in response to that a resource indicated by the DL PI fully or partially overlaps with a resource of the PDSCH, cancelling transmission of at least part of the PDSCH.

11. The random access method according to claim 7, wherein the message A includes a physical random access channel (PRACH) preamble and a physical uplink shared channel (PUSCH).

12. The random access method according to claim 11, wherein the PUSCH is received regardless of transmission of an uplink preemption indicator (ULPI).

* * * * *